United States Patent
Kume et al.

(10) Patent No.: US 7,385,660 B2
(45) Date of Patent: Jun. 10, 2008

(54) LIQUID CRYSTAL DISPLAY DEVICE FOR TRANSFLECTOR HAVING OPENING IN A FIRST ELECTRODE FOR FORMING A LIQUID CRYSTAL DOMAIN AND OPENINGS AT FIRST AND SECOND CORNERS OF THE DOMAIN ON A SECOND ELECTRODE

(75) Inventors: Yasuhiro Kume, Kawachinagano (JP);
Nobukazu Nagae, Suwa (JP);
Kazuhiko Tamai, Nabari (JP); Noriaki Onishi, Nara (JP); Takashi Kurihara, Ikoma (JP)

(73) Assignee: Sharp Kabushiki Kaisha, Osaka (JP)

( * ) Notice: Subject to any disclaimer, the term of this patent is extended or adjusted under 35 U.S.C. 154(b) by 513 days.

(21) Appl. No.: 11/005,322

(22) Filed: Dec. 7, 2004

(65) Prior Publication Data
US 2005/0140916 A1    Jun. 30, 2005

(30) Foreign Application Priority Data

| Dec. 8, 2003 | (JP) | ............................... 2003-409400 |
| Dec. 8, 2003 | (JP) | ............................... 2003-409401 |
| Feb. 27, 2004 | (JP) | ............................... 2004-053745 |
| Mar. 26, 2004 | (JP) | ............................... 2004-091227 |

(51) Int. Cl.
*G02F 1/1335* (2006.01)

(52) U.S. Cl. .................................................... 349/114

(58) Field of Classification Search ................ 349/114, 349/119
See application file for complete search history.

(56) References Cited

U.S. PATENT DOCUMENTS 5,408,345 A    4/1995    Mitsui et al.   ................. 359/59

(Continued)

FOREIGN PATENT DOCUMENTS

JP    9-90426    4/1997

(Continued)

OTHER PUBLICATIONS

KR Notice of Reasons for Rejection and English translation thereof mailed Apr. 25, 2006 in corresponding Korean application No. 10-2004-0102958.

*Primary Examiner*—David Nelms
*Assistant Examiner*—John Heyman
(74) *Attorney, Agent, or Firm*—Nixon & Vanderhye P.C.

(57) ABSTRACT

The liquid crystal display device includes a first substrate 1110*a*, a second substrate 1110*b* placed to face the first substrate, and a liquid crystal layer 1120 interposed between the first substrate and the second substrate. The liquid crystal display device has a plurality of pixels each including a first electrode 1111 formed on the first substrate, a second electrode 1131 formed on the second substrate, and the liquid crystal layer interposed between the first electrode and the second electrode. The second electrode 1131 has at least one opening 1114 formed at a predetermined position in the pixel, the first substrate has a shading region in gaps between the plurality of pixels, and a wall structure 1115 is placed regularly on the surface of the first substrate facing the liquid crystal layer in the shading region. The liquid crystal layer has at least one liquid crystal domain having axisymmetric alignment formed when at least a predetermined voltage is applied, and the center axis of the axisymmetric alignment of the at least one liquid crystal domain is formed in or near the at least one opening.

25 Claims, 37 Drawing Sheets

U.S. PATENT DOCUMENTS

| | | | |
|---|---|---|---|
| 5,666,179 A | 9/1997 | Koma | 349/143 |
| 5,673,092 A * | 9/1997 | Horie et al. | 349/86 |
| 6,166,791 A * | 12/2000 | Mitsui et al. | 349/112 |
| 6,195,140 B1 | 2/2001 | Kubo et al. | 349/44 |
| 6,384,889 B1 | 5/2002 | Miyachi et al. | 349/143 |
| 6,433,852 B1 | 8/2002 | Sonoda et al. | |
| 6,466,296 B1 | 10/2002 | Yamada et al. | 349/160 |
| 6,753,939 B2 | 6/2004 | Jisaki et al. | 349/114 |
| 6,900,869 B1 * | 5/2005 | Lee et al. | 349/129 |
| 6,967,702 B2 * | 11/2005 | Ishii et al. | 349/123 |
| 6,985,198 B2 * | 1/2006 | Kume et al. | 349/119 |
| 7,106,404 B2 * | 9/2006 | Okumura et al. | 349/114 |
| 2001/0004274 A1 | 6/2001 | Sakamoto et al. | |
| 2001/0024257 A1 | 9/2001 | Kubo et al. | 349/138 |
| 2002/0015125 A1 | 2/2002 | Kim et al. | |
| 2002/0080312 A1 | 6/2002 | Yamaguchi et al. | |
| 2002/0149728 A1 | 10/2002 | Ogishima et al. | 349/129 |
| 2005/0057704 A1 | 3/2005 | Ootake et al. | |

FOREIGN PATENT DOCUMENTS

| | | |
|---|---|---|
| JP | 11-337903 | 12/1999 |
| JP | 2000-075302 | 3/2000 |
| JP | 2002-55347 A | 2/2002 |
| JP | 2002-55374 | 2/2002 |
| JP | 2003-315803 | 11/2003 |
| JP | 2003-344840 | 12/2003 |
| KR | 2003-058012 A | 7/2003 |

* cited by examiner

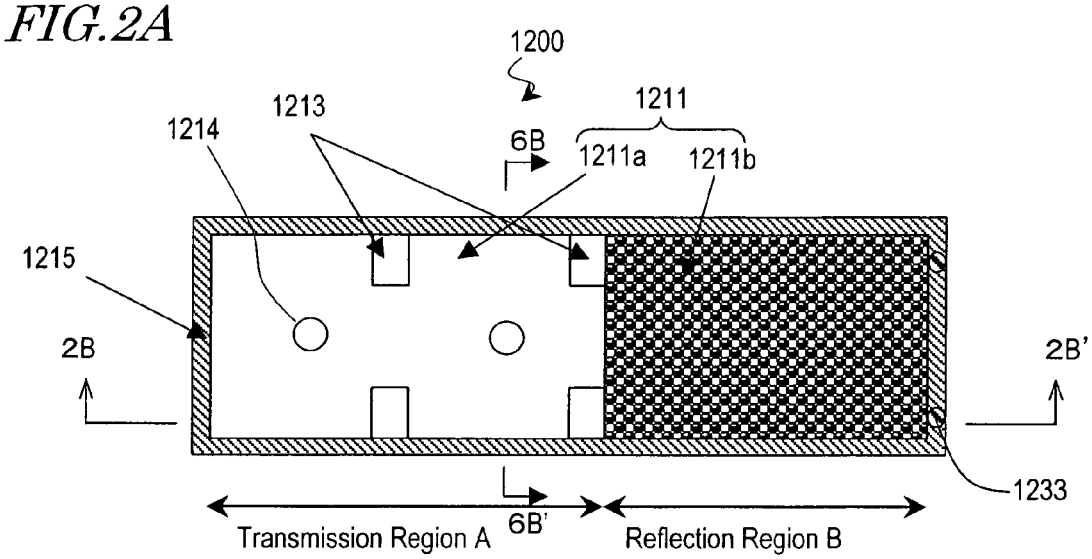
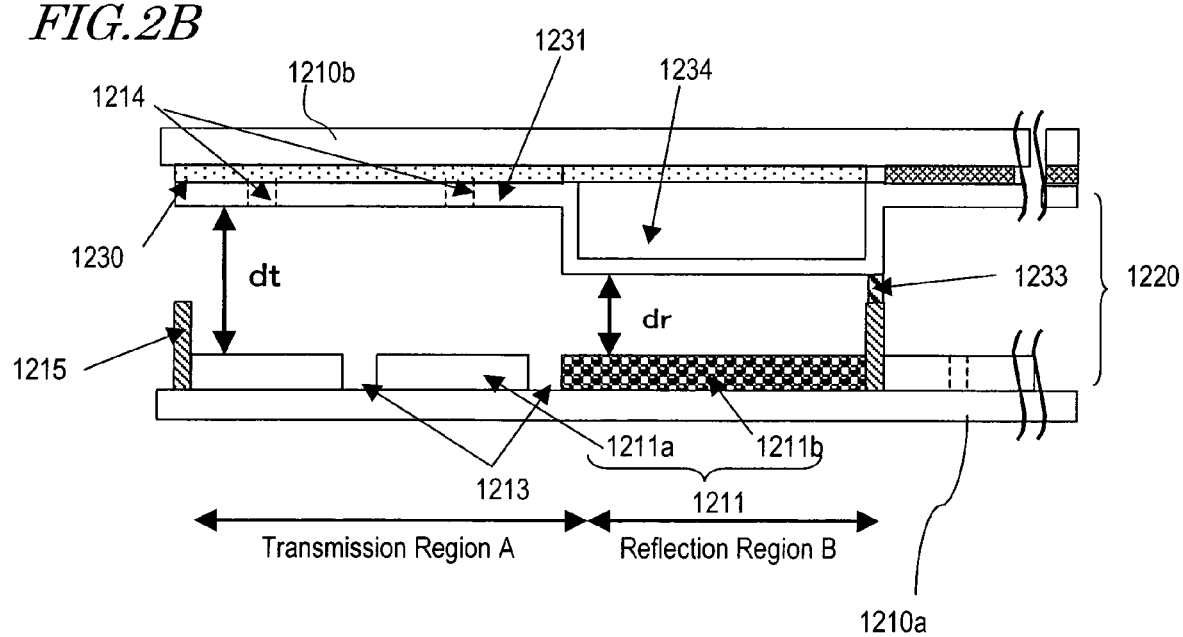

Liquid Crystal Domain

Equal contrast ratio contour

Liquid Crystal Domain

LIQUID CRYSTAL DISPLAY DEVICE FOR TRANSFLECTOR HAVING OPENING IN A FIRST ELECTRODE FOR FORMING A LIQUID CRYSTAL DOMAIN AND OPENINGS AT FIRST AND SECOND CORNERS OF THE DOMAIN ON A SECOND ELECTRODE

BACKGROUND OF THE INVENTION

The present invention relates to a liquid crystal display device and a fabrication method for the same, and more particularly, to a liquid crystal display device suitably used for portable information terminals (for example, PDAs), mobile phones, car-mounted liquid crystal displays, digital cameras, PCs, amusement equipment, TVs and the like.

The information infrastructure is advancing day to day, and equipment such as mobile phones, PDAs, digital cameras, video cameras and car navigators has penetrated deeply into people's lives. Liquid crystal display (LCD) devices have been adopted in most of such equipment. With increase of the information amount handled with the bodies of the equipment, LCD devices are requested to display a larger amount of information, and are demanded by the market for higher contrast, a wider viewing angle, higher brightness, multiple colors and higher definition.

A vertical alignment mode using a vertically aligned liquid crystal layer has increasingly received attention as a display mode enabling high contrast and a wide viewing angle. A vertically aligned liquid crystal layer is generally obtained using a vertical alignment film and a liquid crystal material having negative dielectric anisotropy.

For example, Japanese Laid-Open Patent Publication No. 6-301036 (Literature 1) discloses an LCD device in which a tilt electric field is generated around an opening formed in a counter electrode that faces a pixel electrode via a liquid crystal layer, so that liquid crystal molecules surrounding liquid crystal molecules existing in the opening, which are in the vertically aligned state, are aligned in tilt directions around the opening as the center, to thereby improve the visual angle characteristics.

However, in the device described in Literature 1, it is difficult to generate a tilt electric field over the entire region of each pixel. Therefore, each pixel has a region in which liquid crystal molecules delay in response to a voltage, and this causes a problem of occurrence of an afterimage phenomenon.

Japanese Laid-Open Patent Publication No. 2002-55347 (Literature 2) discloses a technology in which slit electrodes (an opening pattern) are provided in both pixel electrodes and a counter common electrode and, in at least either the pixel electrodes or the common electrode, steps are provided in regions having the slit electrodes to allow an electric field to tilt in four directions in uniform distribution using the opening pattern, to thereby attain a wide viewing angle.

Japanese Laid-Open Patent Publication No. 2003-167253 (Literature 3) discloses a technology in which a plurality of projections are provided regularly in each pixel to stabilize the aligned state of liquid crystal domains having radially inclined alignment formed around the projections. This literature also discloses using a tilt electric field generated at openings formed in an electrode, together with the alignment regulating force of the projections, to regulate the alignment of liquid crystal molecules, and thus improve the display characteristics.

In recent years, a type of LCD device providing high-quality display both outdoors and indoors has been proposed (see Japanese Patent Gazette No. 2955277 (Literature 4) and U.S. Pat. No. 6,195,140 (Literature 5), for example). In this type of LCD device, called a transflective LCD device, each pixel has a reflection region in which display is done in the reflection mode and a transmission region in which display is done in the transmission mode.

The currently available transflective LCD devices adopt an ECB mode, a TN mode and the like. Literature 3 described above discloses adoption of the vertical alignment mode for a transflective LCD device, not only for a transmissive LCD device. Japanese Laid-Open Patent Publication No. 2002-350853 (Literature 6) discloses a technology in which in a transflective LCD device having a vertically aligned liquid crystal layer, the alignment (multi-axis alignment) of liquid crystal molecules is controlled with depressions formed on an insulating layer that is provided to double the thickness of the liquid crystal layer in a transmission region compared with that in a reflection region. According to this literature, the depressions are in the shape of a regular octagon, for example, and projections or slits (electrode openings) are formed at positions opposing the depressions via the liquid crystal layer (see FIGS. 3 and 16 of Literature 6, for example).

To improve the display quality in the reflection mode, a technique of forming a diffuse reflection layer excellent in diffuse reflection characteristics has been examined. For example, Japanese Laid-Open Patent Publication No. 6-75238 (Literature 7) discloses a technique in which fine projections and depressions are formed randomly on the surface of a reflection electrode in a photolithography step using a two-layer photosensitive resin film to thereby obtain good diffuse reflection characteristics. Japanese Laid-Open Patent Publication No. 9-90426 (Literature 8) discloses a technique in which a reflection electrode having fine projections and depressions is formed by exposing a one-layer photosensitive resin film to light via a photomask for formation of contact holes and fine projections and depressions and developing the resin, for simplification of the fabrication process.

The technology disclosed in Literature 3 has the following problems. Projections are provided in each pixel to form a plurality of liquid crystal domains in the pixel (that is, divide the pixel into domains), to thereby strengthen the alignment regulating force on liquid crystal molecules. According to examinations conducted by the inventors of the present invention, however, to obtain sufficient alignment regulating force, an alignment control structure made of projections regularly placed inside each pixel must be formed, and this complicates the fabrication process. The contrast ratio may decrease due to light leakage occurring in the peripheries of the projections in the pixel. If a light-shading portion is provided to prevent decrease in contrast ratio, the effective aperture ratio may possibly decrease.

In the technology disclosed in Literature 6, it is necessary to provide projections or electrode openings at positions opposite to the depressions formed for control of the multi-axis alignment. This technology therefore has the same problems as those described above.

In view of the above, an object of the present invention is providing a liquid crystal display device having at least one axisymmetrically aligned domain (also called a "radially inclined alignment domain") in each pixel, which can sufficiently stabilize the alignment of liquid crystal molecules and suppress decrease in contrast ratio or effective aperture ratio.

The fabrication process will be complicated if the methods disclosed in Literature 7 and 8 are employed to form reflection electrodes to improve the display quality in the reflection mode of a transflective LCD device, for example. That is, it is necessary to form fine projections and depressions for improving the diffuse reflection characteristics, in addition to the projections for alignment regulation, and this increases the cost of the LCD device.

In view of the above, another object of the present invention is providing a liquid crystal display device that can sufficiently stabilize the alignment of liquid crystal molecules with a comparatively simple construction and for which the fabrication process is simple compared with the conventional ones, and a fabrication method for such a liquid crystal display device.

Yet another object of the present invention is providing a liquid crystal display device having at least one axisymmetrically aligned domain in each pixel, which can sufficiently stabilize the alignment of liquid crystal molecules with a comparatively simple construction having an alignment regulating structure for the axisymmetric alignment only on one substrate of the device, to provide display quality equal to or higher than that conventionally obtained.

SUMMARY OF THE INVENTION

The liquid crystal display device in the first aspect of the present invention includes a first substrate, a second substrate placed to face the first substrate, and a liquid crystal layer interposed between the first substrate and the second substrate, wherein the liquid crystal display device has a plurality of pixels each including a first electrode formed on the first substrate, a second electrode formed on the second substrate, and the liquid crystal layer interposed between the first electrode and the second electrode, the second electrode has at least one opening formed at a predetermined position in the pixel, the first substrate has a shading region in gaps between the plurality of pixels, and a wall structure is placed regularly on the surface of the first substrate facing the liquid crystal layer in the shading region, and the liquid crystal layer has at least one liquid crystal domain having axisymmetric alignment formed when at least a predetermined voltage is applied, and the center axis of the axisymmetric alignment of the at least one liquid crystal domain is formed in or near the at least one opening.

In one embodiment, when a voltage giving a relative transmittance of 10% is applied across the liquid crystal layer interposed between the first electrode and the second electrode, the potential at the at least one opening in the second electrode is lower than a threshold voltage of the liquid crystal layer. When a plurality of liquid crystal domains are formed, the opening is preferably formed to correspond to the center axis of each of the liquid crystal domains, but the opening may be omitted for some of the plurality of liquid crystal domains.

In one embodiment, the size Wh of the at least one opening preferably satisfies the condition 2 µm≦Wh≦20 µm. The size Wh is expressed by the diameter when the at least one opening is a circle or by the length of the longest diagonal line when the opening is a polygon.

In one embodiment, the first electrode has at least one cut.

In one embodiment, a support for defining the thickness of the liquid crystal layer is formed in the shading region located in gaps between the plurality of pixels.

In one embodiment, the first electrode includes a transparent electrode defining a transmission region and a reflective electrode defining a reflection region, and the thickness dt of the liquid crystal layer in the transmission region and the thickness dr of the liquid crystal layer in the reflection region preferably satisfy the relationship 0.3 dt<dr<0.7 dt.

In one embodiment, the first electrode includes a transparent electrode defining a transmission region and a reflective electrode defining a reflection region, the at least one liquid crystal domain includes a liquid crystal domain formed in the transmission region, the at least one opening includes an opening corresponding to the center axis of the liquid crystal domain formed in the transmission region, and the first electrode has a plurality of cuts formed point-symmetrically with respect to the opening. Formation of the opening may be omitted for the liquid crystal domain formed in the reflection region.

In one embodiment, a transparent dielectric layer is selectively formed on the second substrate in the reflection region.

In one embodiment, the transparent dielectric layer has a function of scattering light.

In one embodiment, the liquid crystal display device further includes a color filter layer formed on the second substrate, wherein the optical density of the color filter layer in the reflection region is lower than that in the transmission region.

In one embodiment, the liquid crystal display device further includes: a pair of polarizing plates placed to face each other via the first substrate and the second substrate; and at least one biaxial optical anisotropic medium layer placed between the first substrate and one of the pair of polarizing plates and/or between the second substrate and the other polarizing plate.

In one embodiment, the liquid crystal display device further includes: a pair of polarizing plates placed to face each other via the first substrate and the second substrate; and at least one uniaxial optical anisotropic medium layer placed between the first substrate and one of the pair of polarizing plates and/or between the second substrate and the other polarizing plate.

The liquid crystal display device in the second aspect of the present invention includes a first substrate, a second substrate placed to face the first substrate, and a liquid crystal layer interposed between the first substrate and the second substrate, wherein the liquid crystal display device has a plurality of pixels each including a first electrode formed on the first substrate, a second electrode formed on the second substrate, and the liquid crystal layer interposed between the first electrode and the second electrode, the first substrate has a shading region in gaps between the plurality of pixels, and a wall structure is placed regularly on the surface of the first substrate facing the liquid crystal layer in the shading region, the first electrode has at least one first opening formed at a predetermined position in the pixel, the second electrode has at least one second opening formed at a predetermined position in the pixel, and the liquid crystal layer has at least one liquid crystal domain having axisymmetric alignment formed when at least a predetermined voltage is applied, and the center axis of the axisymmetric alignment of the at least one liquid crystal domain is formed in or near at least one of the at least one first opening and the at least one second opening.

In one embodiment, one end of the center axis of axisymmetric alignment of the at least one liquid crystal domain is in or near the at least one first opening, and the other end is in or near the at least one second opening.

In one embodiment, the at least one first opening and the at least one second opening are placed to at least overlap each other via the liquid crystal layer. When a plurality of liquid crystal domains are formed, the first opening and the second opening (pair of openings) are preferably formed to correspond to the center axis of each of the liquid crystal domains, but either one or both of the openings may be omitted for some of the plurality of liquid crystal domains.

In one embodiment, when a voltage giving a relative transmittance of 10% is applied across the liquid crystal layer interposed between the first electrode and the second electrode, the potential at at least one of the at least one first opening and the at least one second opening is lower than a threshold voltage of the liquid crystal layer.

In one embodiment, when a voltage giving a relative transmittance of 10% is applied across the liquid crystal layer interposed between the first electrode and the second electrode, the potentials at the at least one first opening and the at least one second opening are lower than the threshold voltage of the liquid crystal layer.

In one embodiment, the size Wh' of the at least one first opening and the at least one second opening satisfies the condition 1 μm≦Wh'≦18 μm. The sizes of the first opening and the second opening may be the same or different from each other. The size Wh' is expressed by the diameter when the at least one first opening and the at least one second opening are circles or by the length of the longest diagonal line when the openings are polygons.

In one embodiment, the first electrode has at least one cut.

In one embodiment, a support for defining the thickness of the liquid crystal layer is formed in the shading region located in gaps between the plurality of pixels.

In one embodiment, the first electrode includes a transparent electrode defining a transmission region and a reflective electrode defining a reflection region, and the thickness dt of the liquid crystal layer in the transmission region and the thickness dr of the liquid crystal layer in the reflection region satisfy the relationship 0.3 dt<dr<0.7 dt.

In one embodiment, the first electrode includes a transparent electrode defining a transmission region and a reflective electrode defining a reflection region, the at least one liquid crystal domain includes a liquid crystal domain formed in the transmission region, the at least one first opening and/or the at least one second opening include an opening corresponding to the center axis of the liquid crystal domain formed in the transmission region, and the first electrode has a plurality of cuts formed point-symmetrically with respect to the opening. Formation of the first opening and/or the second opening may be omitted for the liquid crystal domain formed in the reflection region.

In one embodiment, a transparent dielectric layer is selectively formed on the second substrate in the reflection region. In this case, formation of the second opening may be omitted for the liquid crystal domain formed in the reflection region.

In one embodiment, the transparent dielectric layer has a function of scattering light.

In one embodiment, the liquid crystal display device further includes a color filter layer formed on the second substrate, wherein the optical density of the color filter layer in the reflection region is lower than that in the transmission region.

In one embodiment, the liquid crystal display device further includes: a pair of polarizing plates placed to face each other via the first substrate and the second substrate; and at least one biaxial optical anisotropic medium layer placed between the first substrate and one of the pair of polarizing plates and/or between the second substrate and the other polarizing plate.

In one embodiment, the liquid crystal display device further includes: a pair of polarizing plates placed to face each other via the first substrate and the second substrate; and at least one uniaxial optical anisotropic medium layer placed between the first substrate and one of the pair of polarizing plates and/or between the second substrate and the other polarizing plate.

The liquid crystal display device in the third aspect of the present invention includes a first substrate, a second substrate placed to face the first substrate, and a liquid crystal layer interposed between the first substrate and the second substrate, wherein the liquid crystal display device has a plurality of pixels each including a first electrode formed on the first substrate, an interlayer insulating film formed between the first substrate and the first electrode, a second electrode formed on the second substrate, and the liquid crystal layer interposed between the first electrode and the second electrode, the interlayer insulating film has at least one depression formed at a predetermined position, and the liquid crystal layer has at least one liquid crystal domain including liquid crystal molecules tilted in directions defined with the at least one depression formed when at least a predetermined voltage is applied.

In one embodiment, the first electrode has at least one opening, and the at least one opening includes an opening formed at a position corresponding to the at least one depression.

In one embodiment, the plurality of pixels are arranged in a matrix, and the maximum inner diameter/width Dc of the at least one depression satisfies the relationship Dc<0.35·Ps where Ps is the pitch of the pixels in the shorter side direction.

In one embodiment, the thickness Id of the interlayer insulating film and the depth h of the at least one depression satisfy the relationship h<0.8·Id.

In one embodiment, the first electrode further has at least one cut.

In one embodiment, the liquid crystal display device further includes a wall structure formed integrally with the interlayer insulating film, and the wall structure is regularly placed around each of the plurality of pixels.

In one embodiment, a shading region is provided to surround each of the plurality of pixels, and the wall structure is placed regularly in the shading region.

In one embodiment, the liquid crystal layer is a vertically aligned liquid crystal layer, the at least one liquid crystal domain formed when at least a predetermined voltage is applied across the liquid crystal layer includes a liquid crystal domain having axisymmetric alignment, and the center axis of the axisymmetric alignment is formed in or near the at least one depression.

In one embodiment, the second electrode has at least one other opening formed at a predetermined position in the pixel, and the liquid crystal layer is a vertically aligned liquid crystal layer, the at least one liquid crystal domain formed when at least a predetermined voltage is applied across the liquid crystal layer includes a liquid crystal domain having axisymmetric alignment, and the center axis of the axisymmetric alignment is formed in or near the at least one other opening.

In one embodiment, the liquid crystal display device further includes a switching element formed on the first substrate, the switching element being electrically connected to the first electrode, wherein at least part of the switching element is covered with the interlayer insulating film.

In one embodiment, the first electrode includes a transparent electrode defining a transmission region and a reflective electrode defining a reflection region.

In one embodiment, the at least one liquid crystal domain includes a liquid crystal domain having axisymmetric alignment formed in the transmission region, and the center axis of the axisymmetric alignment is formed in or near the at least one depression.

In one embodiment, the interlayer insulating film has a first region having a substantially flat surface and a second region having an uneven surface, the transparent electrode is formed in the first region, and the reflective electrode is formed in the second region.

In one embodiment, the liquid crystal display device further includes: a pair of polarizing plates placed to face each other via the first substrate and the second substrate; and at least one biaxial optical anisotropic medium layer placed between the first substrate and/or the second substrate and the pair of polarizing plates.

In one embodiment, the liquid crystal display device further includes: a pair of polarizing plates placed to face each other via the first substrate and the second substrate; and at least one uniaxial optical anisotropic medium layer placed between the first substrate and one of the pair of polarizing plates and/or between the second substrate and the other polarizing plate.

The fabrication method for a liquid crystal display device in the third aspect of the present invention is a fabrication method for a liquid crystal device including a first substrate, a second substrate placed to face the first substrate, and a liquid crystal layer interposed between the first substrate and the second substrate, the liquid crystal device comprising a plurality of pixels each comprising a first electrode formed on the first substrate, a circuit element electrically connected to the first electrode, an interlayer insulating film formed between the first substrate and the first electrode, a second electrode formed on the second substrate, and the liquid crystal layer formed between the first electrode and the second electrode. The method include the steps of: forming the circuit element on the first substrate; forming a positive photosensitive resin film covering the circuit element; exposing the photosensitive resin film to light to form predetermined regions having different exposures; forming the interlayer insulating film having a contact hole exposing part of the circuit element and also having at least one depression, by developing the light-exposed photosensitive resin film; and forming the first electrode on the interlayer insulating film.

In one embodiment, the step of forming the interlayer insulating film includes the step of forming a first region having a substantially flat surface and a second region having an uneven surface, and the step of forming the first electrode includes the steps of: forming a transparent electrode on the interlayer insulating film in the first region; and forming a reflective electrode on the interlayer insulating film in the second region.

In one embodiment, the step of exposing the photosensitive resin film to light includes: a first exposure step of forming a region to become the second region and the remaining region using a first photomask; and a second exposure step of forming a region to become the contact hole and a region to become the at least one depression in the remaining region using a second photomask.

In one embodiment, the liquid crystal display device further comprises a wall structure integrally formed with the interlayer insulating film to be regularly placed around each of the plurality of pixels, and the first exposure step is a step of forming a region to become the second region and a region to become the wall structure.

In one embodiment, the step of forming the first electrode and/or the second electrode includes the steps of forming a conductive film and patterning the conductive film, and the step of patterning the conductive film includes the step of forming a plurality of openings and/or cuts at predetermined positions of the first electrode and/or the second electrode.

The liquid crystal display device in the fourth aspect of the present invention includes a first substrate, a second substrate placed to face the first substrate, and a vertically aligned liquid crystal layer interposed between the first substrate and the second substrate, wherein the liquid crystal display device has a plurality of pixels each including a first electrode formed on the first substrate, a second electrode formed on the second substrate, and the liquid crystal layer interposed between the first electrode and the second electrode, the liquid crystal layer has at least one liquid crystal domain having axisymmetric alignment formed when at least a predetermined voltage is applied, the first electrode has at least one first opening formed at a position corresponding to about the center of the axisymmetric alignment of the at least one liquid crystal domain and at least one cut or second opening provided at a position corresponding to part of the periphery of the at least one liquid crystal domain, and the at least one cut or second opening includes a rectangular portion, and the width EW of the rectangular portion of the at least one cut or second opening is greater than the width EC of the at least one first opening.

In one embodiment, the liquid crystal layer has two or more liquid crystal domains each having axisymmetric alignment formed when at least a predetermined voltage is applied, and two or more first openings are formed at positions corresponding to about the center of the axisymmetric alignment of the two or more liquid crystal domains.

In one embodiment, the first electrode is a pixel electrode provided for each of the plurality of pixels, and the width EW of the at least one cut or second opening is equal to or greater than the space between the adjacent pixel electrodes.

In one embodiment, the shape of the at least one first opening has rotation symmetry as viewed in the direction normal to the substrate plane.

In one embodiment, the at least one cut or second opening comprises a plurality of cuts or second openings formed at predetermined positions, and includes cuts or second openings arranged point-symmetrically with respect to the at least one first opening.

In one embodiment, the liquid crystal display device further includes a wall structure provided regularly on the surface of the first substrate facing the liquid crystal layer, and the wall structure includes a first wall portion formed in the rectangular portion of the at least one cut or second opening.

In one embodiment, the wall structure includes a second wall portion extending from the first wall portion.

In one embodiment, the wall structure includes a third wall portion provided in a region surrounding the first electrode.

In one embodiment, the first electrode includes a transparent electrode defining a transmission region and a reflective electrode defining a reflection region, and the thickness dt of the liquid crystal layer in the transmission region is greater than the thickness dr of the liquid crystal layer in the reflection region.

In one embodiment, the second substrate has a transparent dielectric layer in the reflection region.

In one embodiment, the liquid crystal layer has two or more liquid crystal domains having axisymmetric alignment formed when at least a predetermined voltage is applied, the two or more liquid crystal domains include a liquid crystal domain formed in the transmission region and a liquid crystal domain formed in the reflection region, and the at least one first opening comprises two or more openings formed at positions corresponding to about the center of the axisymmetric alignment of the two or more liquid crystal domains.

In one embodiment, at least one of the first substrate and the second substrate has a support for defining the thickness of the liquid crystal layer.

In one embodiment, the first substrate further includes an active element provided for each of the plurality of pixels, the first electrode is a pixel electrode provided for each of the pixel electrodes and connected to the active element.

In one embodiment, the liquid crystal display device further includes: a pair of polarizing plates placed to face each other via the first substrate and the second substrate; and at least one biaxial optical anisotropic medium layer placed between the first substrate and one of the pair of polarizing plates and/or between the second substrate and the other polarizing plate.

In one embodiment, the liquid crystal display device further includes: a pair of polarizing plates placed to face each other via the first substrate and the second substrate; and at least one uniaxial optical anisotropic medium layer placed between the first substrate and one of the pair of polarizing plates and/or between the second substrate and the other polarizing plate.

In the liquid crystal display device in the first aspect of the present invention, the directions in which liquid crystal molecules tilt during voltage application (during generation of an electric field) are defined with the slope face effect of the wall structure formed on the surface of the first substrate facing the liquid crystal layer in the shading region, so that an axisymmetrically aligned domain is formed. The opening formed in the second electrode (for example, the counter electrode) acts to fix the position of the center axis of the axisymmetric alignment, to thereby stabilize the alignment of the axisymmetrically aligned domain. If a cut is additionally formed in the first element, the directions in which liquid crystal molecules fall are defined with the influence of a tilt electric field generated near the cut, and this permits further stable formation of the axisymmetrically aligned domain.

The wall structure formed on the first substrate exists in the shading region. Therefore, the axisymmetrically aligned domain can be formed without reducing the effective aperture ratio nor the contrast ratio. The at least one opening formed at a predetermined position in the second electrode, which is provided for fixing and stabilizing the position of the center axis of the axisymmetric alignment, can be comparatively small in size, and therefore reduction in aperture ratio due to the formation of the opening is small. Also, the opening is less affected by misalignment that may occur in bonding of the first substrate and the second substrate together.

With the opening provided at a position corresponding to the center axis of the axisymmetrically aligned liquid crystal domain, the position of the center axis is fixed/stabilized. As a result of the fixation of the center axes of the axisymmetrically aligned liquid crystal domains over the entire liquid crystal display panel, the uniformity of the display improves. For example, the roughness recognized when grayscale display is viewed in a slanting direction is reduced. Also, as a result of the stabilization of the axisymmetric alignment, the response time in grayscale display can be shortened. Moreover, the time required to resume normal alignment from a distortion occurring when the liquid crystal display panel is pressed (an afterimage due to pressing) can be shortened.

In application to a transflective LCD device, a transparent dielectric layer may be placed on the second substrate for control of the thickness of the liquid crystal layer. In this case, an invalid region that does not contribute to display during transmission display can be reduced compared with the conventional transflective LCD device in which the transmission region and the reflection region are differentiated from each other by forming a step on the first substrate, and this can improve the brightness in transmission display. The diffuse reflection plate for improving the brightness in the reflection region may be provided on the first substrate in the reflection region. Otherwise, a light scattering layer (light diffuse layer) may be formed on the transparent dielectric layer on the second substrate. This can eliminate the necessity of forming projections and depressions on the surface of the reflection electrode.

In the liquid crystal display device in the second aspect of the present invention, the directions in which liquid crystal molecules tilt during voltage application (during generation of an electric field) are defined with the slope face effect of the wall structure formed on the surface of the first substrate facing the liquid crystal layer in the shading region, so that an axisymmetrically aligned domain is formed. The openings formed in the first electrode (for example, the pixel electrode) and the second electrode (for example, the counter electrode) act to fix the position of the center axis of the axisymmetric alignment, to thereby stabilize the alignment of the axisymmetrically aligned domain. If a cut is additionally formed in the first element, the directions in which liquid crystal molecules fall are defined with the influence of a tilt electric field generated near the cut, and this permits further stable formation of the axisymmetrically aligned domain.

The wall structure formed on the first substrate is located in the shading region. Therefore, the axisymmetrically aligned domain can be formed without reducing the effective aperture ratio nor the contrast ratio. The center axis of the axisymmetric alignment of the liquid crystal domain can be fixed further stably by placing the first opening and the second opening (pair of openings) so that one end of the center axis of axisymmetric alignment is fixed in or near the first opening and the other end thereof is fixed in or near the second opening. The reduction in effective aperture ratio due to the existence of the openings can be minimized by placing the first opening and the second opening (pair of openings) so as to at least overlap each other via the liquid crystal layer. Since one center axis is fixed/stabilized with the joint action of the first opening and the second opening, the action exerted by the individual first or second opening can be small compared with the case of fixing/stabilizing the center axis with one opening. It is therefore possible to reduce the size of the first and second openings (for example, the diameter of circular openings), and as a result, the reduction in effective aperture ratio can be further minimized. The sizes of the first opening and the second opening maybe equal to or different from each other. The first and second openings, which are provided for fixing and stabilizing the position of the center axis of the axisymmetric alignment, can be comparatively small in size, and therefore reduction in aperture ratio due to the formation of the opening is small. Also, the openings are less affected by misalignment that may occur in bonding of the first substrate and the second substrate together.

With the openings provided at positions corresponding to the center axis of the axisymmetrically aligned liquid crystal domain, the position of the center axis is fixed/stabilized. As a result of the fixation of the center axes of the axisymmetrically aligned liquid crystal domains over the entire liquid crystal display panel, the uniformity of the display improves. For example, the roughness of display recognized when grayscale display is viewed in a slanting direction is reduced. Also, as a result of the stabilization of the axisymmetric alignment, the response time in grayscale display can be shortened. Moreover, the time required to resume normal alignment from a distortion occurring when the liquid crystal display panel is pressed (an afterimage due to pressing) can be shortened.

In application to a transflective LCD device, a transparent dielectric layer may be placed on the second substrate for control of the thickness of the liquid crystal layer. In this case, an invalid region that does not contribute to display during transmission display can be reduced compared with the conventional transflective LCD device in which the transmission region and the reflection region are differentiated from each other by forming a step on the first substrate, and this can improve the brightness in transmission display. The diffuse reflection plate for improving the brightness in the reflection region may be provided on the first substrate in the reflection region. Otherwise, a light scattering layer (light diffuse layer) may be formed on the transparent dielectric layer on the second substrate. This can eliminate the necessity of forming projections and depressions on the surface of the reflection electrode.

In the liquid crystal display device in the third aspect of the present invention, the interlayer insulating film formed between the first electrode (for example, a pixel electrode) and the first substrate has a depression in a predetermined region thereof. A depression is formed on the surface of the first substrate facing the liquid crystal layer in correspondence with the depression on the interlayer insulating film and acts as an alignment regulating structure, defining the directions in which liquid crystal molecules tilt when at least a predetermined voltage (voltage equal to or higher than a threshold voltage) is applied. The interlayer insulating film is typically formed to cover circuit elements (interconnections and switching elements (such as TFTs)) electrically connected to the first electrode, and the depression can be formed in the process for forming a contact hole in the interlayer insulating film. Therefore, the formation of the depression is free from complicating the fabrication process. Also, by forming an opening at the position of the first electrode corresponding to the depression, the directions in which liquid crystal molecules tilt can be regulated with a tilt electric field generated near the opening during voltage application.

By forming a cut in the first electrode, also, the directions in which liquid crystal molecules tilt can be regulated with a tilt electric field generated near the cut. The directions of tilt of liquid crystal molecules can also be regulated with a wall structure regularly placed to surround each pixel. The wall structure defines the directions of tilt of the liquid crystal molecules with the anchoring action (alignment regulating force) of its side slopes. With this action of the wall structure, at least one liquid crystal domain including liquid crystal molecules aligned in different directions can be formed stably in a region substantially surrounded with the wall structure. This wall structure is formed integrally with the interlayer insulating film, and thus the fabrication process will not be complicated. Since the wall structure is formed in the shading region around each pixel, light leakage due to the existence of the wall structure is suppressed/prevented.

The depressions formed on the interlayer insulating film, the openings formed in the first electrodes (typically in the pixel electrodes) and the wall structure that constitute the alignment regulating structure are all provided on the first substrate. Sufficient alignment regulating force is secured with no alignment regulating structure formed on the second substrate.

When a vertically aligned liquid crystal layer is used as the liquid crystal layer, for example, an axisymmetrically aligned domain can be formed with the center axis being fixed/stabilized in or near the depression. By forming an opening at the position corresponding to the depression, the center axis can be fixed/stabilized further reliably. The alignment regulating force of a cut and/or the wall structure can also be used to stabilize the axisymmetric alignment itself. In particular, when a plurality of axisymmetrically aligned domains are formed in one pixel, the axisymmetrically aligned domains can be effectively stabilized by placing a cut at the boundary of the domains.

An opening may be provided in the second electrode facing the first electrode for fixing/stabilizing the center axis of the axisymmetric alignment, and a cut may also be provided as required.

As described above, according to the third aspect of the present invention, the axisymmetric alignment can be stabilized and the center axis of the alignment can be fixed/stabilized, for example. Therefore, it is possible to improve the problems such as the occurrence of roughness of display due to non-uniform positioning of the center axes over the display region (variations with pixels) and the afterimage phenomenon due to the delay in relaxation response time observed during a shift in grayscale voltage. At least one liquid crystal domain may be formed in each pixel. Depending on the size and shape of the pixel, however, two or more liquid crystal domains may be formed. For a typical oblong rectangular pixel, two or more liquid crystal domains are preferably formed.

In the liquid crystal display device in the fourth aspect of the present invention, the first electrode (for example, a pixel electrode) has a first opening and at least one second opening or cut. When a predetermined voltage (voltage equal to or higher than a threshold voltage) is applied between the first electrode and the second electrode (for example, a counter electrode) facing the first electrode via the vertically aligned liquid crystal layer, a tilt electric field is generated along the periphery (edges) of the first electrode and around the first opening and the second opening or the cut. With alignment regulating force given by the tilt electric field, a liquid crystal domain having axisymmetric alignment is formed in the pixel. The first opening acts to fix/stabilize the center axis of the axisymmetric alignment, and thus is positioned roughly in the center of the liquid crystal domain. The cut or the second opening has a rectangular portion, which acts to define the alignment of liquid crystal molecules in the periphery of the liquid crystal domain (in the boundary between adjacent liquid crystal domains when a plurality of liquid crystal domains are formed in one pixel). Therefore, the cut or the second opening is positioned in the periphery of the liquid crystal domain. The width EW of the rectangular portion of the cut or the second opening is set to be greater than the width EC of the first opening. By this setting, the center of the liquid crystal domain can be fixed/stabilized in the first opening effectively. In addition, the width EW of the rectangular portion of the cut or the second opening is set to be equal to or greater than the space between the adjacent pixel electrodes (first electrodes). By this setting, the alignment regulating force given by the tilt electric field generated around the rectangular portion can be made equal to or greater than the alignment regulating force given by the tilt electric field generated along the edges of the pixel electrode, and thus the alignment of the liquid crystal domain formed in the pixel can be further stabilized. In particular, when a plurality of liquid crystal domains are formed in one pixel, the effect of stabilizing the alignment of the liquid crystal domains will be great if the cut or the second opening for defining the boundary between the adjacent liquid crystal domains is formed to satisfy the conditions described above.

As described above, according to the fourth aspect of the present invention, the alignment of liquid crystal molecules can be sufficiently stabilized with a simpler construction than the conventional ones, without the necessity of forming an alignment regulating structure such as an electrode opening, a cut and a projection on the surface of the second substrate facing the first substrate via the liquid crystal layer, and display quality equal to or higher than that conventionally obtained can be attained.

The alignment of the liquid crystal domain can be further stabilized with a wall structure placed on the first substrate, in addition to the first opening and the cut or the second opening formed in the first electrode. The wall structure defines the alignment of liquid crystal molecules in the periphery of the liquid crystal domain with the alignment regulating force of the side slopes (wall faces) thereof. The wall structure exerts the alignment regulating force even in the non-voltage applied state. Therefore, in particular, the wall structure is effective in stabilizing the alignment of the liquid crystal domain in a grayscale display state and the like in which the alignment regulating force given by a tilt electric field is weak. As a result, the display quality in grayscale display can be improved.

BRIEF DESCRIPTION OF THE DRAWINGS

FIGS. 1A and 1B diagrammatically show one pixel of a transmissive LCD device 1100 of an embodiment in the first aspect of the present invention, in which FIG. 1A is a plan view and FIG. 1B is a cross-sectional view taken along line 1B-1B' in FIG. 1A.

FIGS. 2A and 2B diagrammatically show one pixel of a transflective LCD device 1200 of an embodiment in the first aspect of the present invention, in which FIG. 2A is a plan view and FIG. 2B is a cross-sectional view taken along line 2B-2B' in FIG. 2A.

FIG. 6A shows the case of providing no opening in a counter electrode and FIG. 6B shows the case of providing an opening in the counter electrode.

FIGS. 12A and 12B diagrammatically show one pixel of a transmissive LCD device 2100 of an embodiment in the second aspect of the present invention, in which FIG. 12A is a plan view and FIG. 12B is a cross-sectional view taken along line 12B-12B' in FIG. 12A.

FIGS. 13A and 13B diagrammatically show one pixel of a transflective LCD device 2200 of an embodiment in the second aspect of the present invention, in which FIG. 13A is a plan view and FIG. 13B is a cross-sectional view taken along line 13B-13B' in FIG. 13A.

FIG. 17A shows the case of providing no opening in a counter electrode and FIG. 17B shows the case of providing an opening in the counter electrode.

FIGS. 20A and 20B diagrammatically show one pixel of a transmissive LCD device 3100 of an embodiment in the third aspect of the present invention, in which FIG. 20A is a plan view and FIG. 20B is a cross-sectional view taken along line 20B-20B' in FIG. 20A.

FIGS. 23A and 23B diagrammatically show one pixel of a transflective LCD device 3200 of an embodiment in the third aspect of the present invention, in which FIG. 23A is a plan view and FIG. 23B is a cross-sectional view taken along line 23B-23B' in FIG. 23A.

FIGS. 30A and 30B are schematic views for demonstrating the operation principle of the LCD devices according to the third aspect of the present invention, in which FIG. 30A shows the state during non-voltage application and FIG. 30B shows the state during voltage application.

FIGS. 31A and 31B are diagrammatic views for demonstrating the operation principle of LCD devices according to the fourth aspect of the present invention, in which FIG. 31A shows the state during non-voltage application and FIG. 31B shows the state during voltage application.

FIGS. 34A and 34B are diagrammatic views for demonstrating the effect obtained by setting the width EW of rectangular portions of second openings 4013 to be greater than the width EC of a first opening 4014, in which FIG. 34A shows the case of EW>EC and FIG. 34B shows the case of EW=EC.

FIGS. 36A and 36B diagrammatically show one pixel of a transmissive LCD device 4100 of an embodiment in the fourth aspect of the present invention, in which FIG. 36A is a plan view and FIG. 36B is a cross-sectional view taken along line 36B-36B' in FIG. 36A.

FIGS. 37A and 37B diagrammatically show one pixel of a transmissive LCD device 4200 of an embodiment in the fourth aspect of the present invention, in which FIG. 37A is a plan view and FIG. 37B is a cross-sectional view taken along line 37B-37B' in FIG. 37A.

FIGS. 38A and 38B diagrammatically show one pixel of a transflective LCD device 4300 of an embodiment in the fourth aspect of the present invention, in which FIG. 38A is a plan view and FIG. 38B is a cross-sectional view taken along line 38B-38B' in FIG. 38A.

DETAILED DESCRIPTION OF THE INVENTION

Hereinafter, LCD devices of embodiments in the first aspect of the present invention will be described concretely with reference to the relevant drawings.

Transmissive LCD Device

Figure 1A:
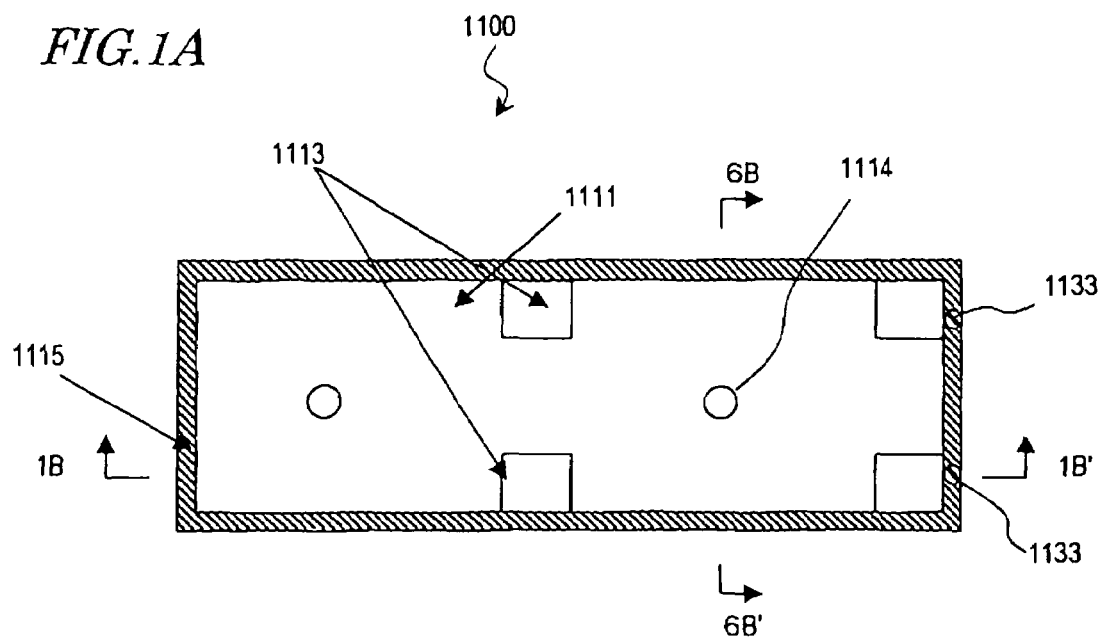
Figure 1B:
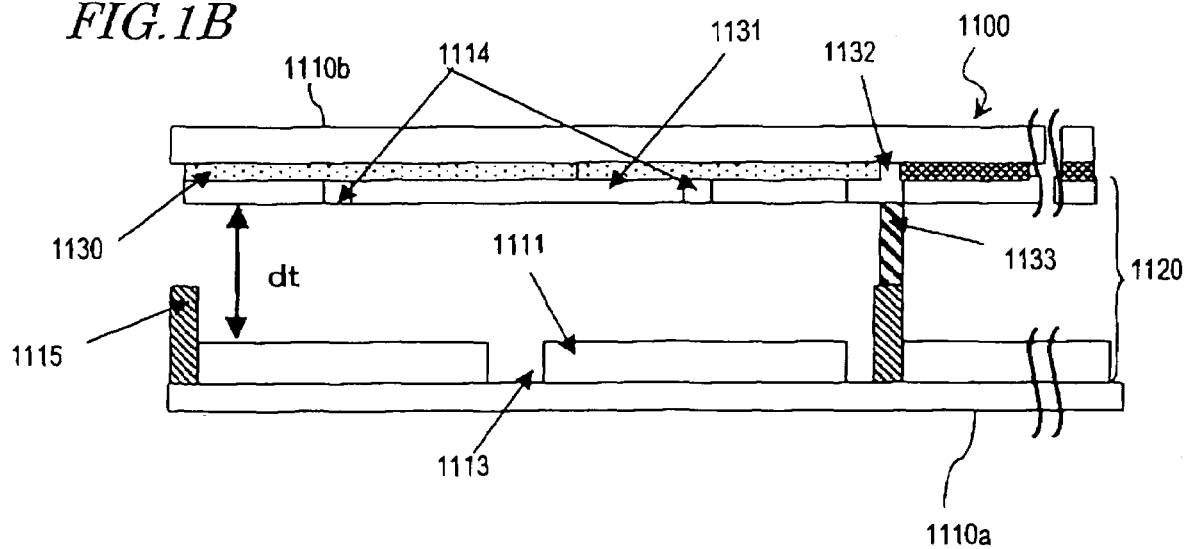

A transmissive LCD device 1100 of an embodiment in the first aspect of the present invention will be described with reference to FIGS. 1A and 1B. FIGS. 1A and 1B diagrammatically show one pixel of the transmissive LCD device 1100, in which FIG. 1A is a plan view and FIG. 1B is a cross-sectional view taken along line 1B-1B' in FIG. 1A. Hereinafter, described will be the case that one pixel is divided into two parts (N=2). The number of parts into which one pixel is divided (=N) can also be three or more depending on the pixel pitch. In any case, the number of openings (=n) each to be positioned roughly in the center of a divided region on a second substrate is preferably the same as the number of divided parts (=N). The effective aperture ratio tends to decrease with increase of the number of divided parts (=N). Therefore, for an application to a high-definition display panel, the number of divided parts (=N) is preferably made small. The present invention is also applicable to the case involving no pixel division (this may be expressed as N=1). Each of the divided regions may be called a "sub-pixel". One liquid crystal domain is typically formed in each sub-pixel.

The LCD device 1100 includes a transparent substrate (for example, a glass substrate) 1110a, a transparent substrate 1110b placed to face the transparent substrate 1110a, and a vertically aligned liquid crystal layer 1120 interposed between the transparent substrates 1110a and 1110b. Vertical alignment films (not shown) are formed on the surfaces of the substrates 1110a and 1110b facing the liquid crystal layer 1120. During non-voltage application, therefore, liquid crystal molecules in the liquid crystal layer 1120 are aligned roughly vertical to the surfaces of the vertical alignment films. The liquid crystal layer 1120 includes a nematic liquid crystal material having negative dielectric anisotropy and also includes-a chiral agent as required.

The LCD device 1100 further includes pixel electrodes 1111 formed on the transparent substrate 1110*a* and a counter electrode 1131 formed on the transparent substrate 1110*b*. Each pixel electrode 1111, the counter electrode 1131 and the liquid crystal layer 1120 interposed between these electrodes define a pixel. In the illustrated example, both the pixel electrodes 1111 and the counter electrode 1131 are formed of a transparent conductive layer (for example, an ITO layer). Typically, color filters 1130 (the entire of the plurality of color filters may also be called a color filter layer 1130) provided for the respective pixels, as well as a black matrix (shading layer) 1132 formed in the gaps between the adjacent color filters 1130, are formed on the surface of the transparent substrate 1110*b* facing the liquid crystal layer 1120, and the counter electrode 1131 is formed on the color filters 1130 and the black matrix 1132. Alternatively, the color filters 1130 and the black matrix 1132 may be formed on the counter electrode 1131 (on the surface thereof facing the liquid crystal layer 1120).

In the LCD device 1100 shown in FIGS. 1A and 1B, in which the number of divided parts (=N) is 2, a wall structure 1115 to be described later extends on the transparent substrate 1110*a* in a shading region around each pixel. Also, as required, four cuts 1113 are formed at predetermined positions of the pixel electrode 1111 on the transparent substrate 1110*a*. On the transparent substrate 1110*b*, openings 1114 of the number corresponding to the number of divided parts (n=2 in the illustrated example) are formed at predetermined positions in the-sub-pixels.

When a predetermined voltage is applied across the liquid crystal layer, two (number equal to the number of divided parts N) liquid crystal domains each having axisymmetric alignment are formed, with the center axes of the axisymmetric alignment thereof being in or near the openings 1114. As will be described later, the openings 1114 in the counter electrode 1131 act to fix the positions of the center axes of the axisymmetrically aligned domains. The wall structure 1115 acts to define the directions in which liquid crystal molecules fall during voltage application (during generation of an electric field) thanks to its slope face effect. The alignment regulating force of the side slopes of the wall structure 1115 is also active during non-voltage application to tilt liquid crystal molecules.

The cuts 1113, provided in the pixel electrode 1111 near the boundaries of the axisymmetrically aligned domains, define the directions in which liquid crystal molecules fall with an electric field, and thus act to form the axisymmetrically aligned domains. A tilt electric field is generated around the openings 1114 and the cuts 1113 with a voltage applied between the pixel electrode 1111 and the counter electrode 1113. With this tilt electric field, together with the action of an electric field at the wall faces of the wall structure 1115 distorted with the existence of the wall structure 1115, the directions of tilt of liquid crystal molecules are defined, resulting in formation of the axisymmetric alignment as described above. In the illustrated example, a total of four cuts 1113 are given point-symmetrically with respect to the opening 1114 corresponding to the center axis of a liquid crystal domain formed in the pixel (in this case, the right opening as viewed from FIG. 1A) (in this case, the entire pixel is a transmission region).

By providing the cuts 1113 as described above, the directions in which liquid crystal molecules fall during voltage application are defined, allowing formation of two liquid crystal domains. The reason why no cuts are provided on the left side of the pixel electrode 1111 as viewed from FIG. 1A is that substantially the same function is obtained from cuts provided on the right side of the adjacent pixel electrode (not shown) located left to the illustrated pixel electrode 1111, and thus cuts, which may decrease the effective aperture ratio of the pixel, are omitted on the left side of the pixel electrode 111. Also, in the illustrated example, the wall structure 1115 to be described later gives the alignment regulating force. Therefore, with no cuts provided on the left side of the pixel electrode 1111, the resultant liquid crystal domain is as stable as a liquid crystal domain having such cuts. In addition, the effect of improving the effective aperture ratio is obtained.

Although a total of four cuts 1113 were formed in the illustrated example, at least one cut between the adjacent liquid crystal domains is sufficient. For example, an elongate cut may be formed in the center of the pixel and the other cuts may be omitted.

The shape of the openings 1114 formed at predetermined positions of the counter electrode 1131 to fix the center axes of the axisymmetrically aligned domains is preferably circular as illustrated although not limited to this. To exert roughly equal alignment regulating force in all directions, the shape is preferably a polygon having four or more sides and also preferably a regular polygon. The shape of the cuts 1113 acting to define the directions in which liquid crystal molecules in the axisymmetrically aligned domains fall with the electric field is determined so that roughly equal alignment regulating force is exerted for the adjacent axisymmetrically aligned domains. For example, a square is preferred.

The LCD device 1100 has a shading region surrounding each of the pixels, and the wall structure 1115 is placed on the transparent substrate 1110*a* in the shading region. The shading region as used herein refers to a region shaded from light due to the presence of TFTs, gate signal lines and source signal lines formed on the peripheries of the pixel electrodes 1111 on the transparent substrate 1110*a*, or the presence of the black matrix formed on the transparent substrate 1110*b*, for example. Since this region does not contribute to display, the wall structure 1115 formed in the shading region is free from adversely affecting the display.

The illustrated wall structure 1115 is a continuous wall surrounding the pixel. Alternatively, the wall structure 1115 may be composed of a plurality of separate walls. The wall structure 1115, which serves to define boundaries of the liquid crystal domains located near the outer edges of the pixel, should preferably have a length of some extent. For example, when the wall structure is composed of a plurality of walls, each wall is preferably longer than the gap between the adjacent walls.

Supports 1133 for defining the thickness of the liquid crystal layer 1120 (also called the cell gap) are preferably formed in the shading region (in the illustrated example, the region defined by the black matrix 1132) to avoid degradation in display quality due to the supports. Although the supports 1133 are formed on the wall structure 1115 provided in the shading region in the illustrated example, the supports 1133 may be formed on either transparent substrate 1110*a* or 1110*b*. In the case of forming the supports 1133 on the wall structure 1115, setting is made so that the sum of the height of the wall structure 1115 and the height of the supports 1133 is equal to the thickness of the liquid crystal layer 1120. If the supports 1133 are formed in a region having no wall structure 1115, setting is made so that the height of the supports 1133 is equal to the thickness of the liquid crystal layer 1120. The supports 1133 can be formed by photolithography using a photosensitive resin, for example.

In the LCD device 1100, when a predetermined voltage (voltage equal to or higher than a threshold voltage) is applied between the pixel electrode 1111 and the counter electrode 1131, two axisymmetrically aligned domains are formed with their center axes stabilized in or near the two openings 1114 formed in the counter electrode 1131 An electric field distorted with the wall faces of the wall structure 1115 and the wall face effect of the wall structure mainly define the directions in which liquid crystal molecules in the two adjacent liquid crystal domains fall with an electric field. Also, a tilt electric field generated near the pair of cuts 1133 acts to define the directions in which liquid crystal molecules in the two adjacent liquid crystal domains fall with an electric field. Such alignment regulating forces presumably act cooperatively, to stabilize the axisymmetric alignment of the liquid crystal domains. The cuts may be omitted.

With the openings 1114 formed at positions in the counter electrode 1131 corresponding to the center axes of the axisymmetrically aligned liquid crystal domains, the positions of the center axes are fixed/stabilized. As a result of the fixation of the center axes of the axisymmetrically aligned liquid crystal domains over the entire liquid crystal display panel, the uniformity of the display improves. Also, as a result of the stabilization of the axisymmetric alignment, the response time in grayscale display can be shortened. Moreover, occurrence of an afterimage due to pressing of the liquid crystal display panel can be reduced (the time required to resume from the pressing can be shortened).

On the surface of the transparent substrate 1110a facing the liquid crystal layer 1120, provided are active elements such as TFTs and circuit elements such as gate signal lines and source signal lines connected to TFTs (all of these elements are not shown). Herein, the transparent substrate 1110a, together with the circuit elements and the pixel electrodes 1111, the wall structure 1115, the supports 1133, the alignment film and the like described above formed on the transparent substrate 1110a, are collectively called an active matrix substrate in some cases. Likewise, the transparent substrate 1110b, together with the color filter layer 1130, the black matrix 1132, the counter electrode 1131, the alignment film and the like formed on the transparent substrate 1110b, are collectively called a counter substrate or a color filter substrate in some cases. The supports 1133 may be formed either on the active matrix substrate or on the color filter substrate.

Although omitted in the above description, the LCD device 1100 further includes a pair of polarizing plates placed to face each other via the transparent substrates 1110a and 1110b. The polarizing plates are typically placed so that their transmission axes are orthogonal to each other. The LCD device 1100 may further include a biaxial optical anisotropic medium layer and/or a uniaxial optical anisotropic medium layer, as will be described later.

Transflective LCD Device

Next, a transflective LCD device 1200 of an embodiment in the first aspect of the present invention will be described with reference to FIGS. 2A and 2B.

FIGS. 2A and 2B diagrammatically show one pixel of the transflective LCD device 1200 in the first aspect of the present invention, in which FIG. 2A is a plan view and FIG. 2B is a cross-sectional view taken along line 2B-2B' in FIG. 2A.

Hereinafter, described will be a case that one pixel is divided into three parts (N=3; two for the transmission region and one for the reflection region). The number of parts into which one pixel is divided (=N) can be at least two (at least one for the transmission region and at least one for the reflection region) determined depending on the pixel pitch. The number of openings (=n) each to be positioned roughly in the center of a divided region (region in which an axisymmetrically aligned domain is formed) on the counter substrate (second substrate) is preferably the same as the number of divided parts (=N). Note however that if a transparent dielectric layer is selectively formed on the surface of the counter substrate facing the liquid crystal layer in the reflection region, as will be described later, an opening may not be formed in the counter electrode (second electrode) in the reflection region. The effective aperture ratio tends to decrease with increase of the number of divided parts (=N). Therefore, for an application to a high-definition display panel, the number of divided parts (=N) is preferably made small.

The LCD device 1200 includes a transparent substrate (for example, a glass substrate) 1210a, a transparent substrate 1210b placed to face the transparent substrate 1210a, and a vertically aligned liquid crystal layer 1220 interposed between the transparent substrates 1210a and 1210b. Vertical alignment films (not shown) are formed on the surfaces of the substrates 1210a and 1210b facing the liquid crystal layer 1220. During non-voltage application, therefore, liquid crystal molecules in the liquid crystal layer 1220 are aligned roughly vertical to the surfaces of the vertical alignment films. The liquid crystal layer 1220 includes a nematic liquid crystal material having negative dielectric anisotropy and also includes a chiral agent as required.

The LCD device 1200 further includes pixel electrodes 1211 formed on the transparent substrate 1210a and a counter electrode 1231 formed on the transparent substrate 1210b. Each pixel electrode 1211, the counter electrode 1231 and the liquid crystal layer 1220 interposed between these electrodes define a pixel. Circuit elements such as TFTs are formed on the transparent substrate 1210a as will be described later. Herein, the transparent substrate 1210a and the components formed thereon are collectively called an active matrix substrate 1210a in some cases.

Typically, color filters 1230 (the entire of the plurality of color filters may also be called a color filter layer 1230) provided for the respective pixels, as well as a black matrix (shading layer) 1232 provided in the gaps between the adjacent color filters 1230, are formed on the surface of the transparent substrate 1210b facing the liquid crystal layer 1220, and the counter electrode 1231 is formed on the color filters 1230 and the black matrix 1232. Alternatively, the color filters 1230 and the black matrix 1232 may be formed on the counter electrode 1231 (on the surface thereof facing the liquid crystal layer 1220). Herein, the transparent substrate 1210b and the components formed thereon are collectively called a counter substrate (color filter substrate) 1210b in some cases.

Each pixel electrode 1211 includes a transparent electrode 1211a formed of a transparent conductive layer (for example, an ITO layer) and a reflective electrode 1211b formed of a metal layer (for example, an Al layer, an Al-including alloy layer, and a multilayer film including any of these layers). Having such a pixel electrode, each pixel includes a transmission region A defined by the transparent electrode 1211*a* and a reflection region B defined by the reflective electrode 1211*b*, to provide display in the transmission mode and display in the reflection mode, respectively.

In the LCD device 1200 shown in FIGS. 2A and 2B, in which the number of divided parts (=N) is 3 (two for the transmission region and one for the reflection region), a wall structure 1215 to be described later extends on the transparent substrate 1210*a* in a shading region around each pixel electrode 1211. Also, four cuts 1213 are formed at predetermined positions of the pixel electrode 1211 on the transparent substrate 1210*a*. On the transparent substrate 1210*b*, two openings 1214 corresponding to the number of divided parts are formed at predetermined positions of the counter electrode 1231 in sub-pixels in the transmission region.

When a predetermined voltage is applied across the liquid crystal layer, three (number equal to the number of divided parts N) liquid crystal domains each having axisymmetric alignment are formed, with the center axes of the axisymmetric alignment of the two liquid crystal domains formed in the transmission region being in or near the openings 1214. As will be described later, the openings 1214 formed at predetermined positions of the counter electrode 1231 act to fix the positions of the center axes of the axisymmetric alignment. The wall structure 1215 acts to define the directions in which liquid crystal molecules tilt during voltage application (during generation of an electric field) thanks to its slope face effect. In addition, the cuts, which are formed as required near a boundary between any axisymmetrically aligned domains, act to define the directions in which liquid crystal molecules tilt with an electric field, to form the axisymmetrically aligned domains. A tilt electric field is generated around the openings 1214 and the cuts 1213 with the application of a voltage between the pixel electrode 1211 and the counter electrode 1213. With this tilt electric field, acting together with an electric field at the wall faces distorted with the wall structure 1215, the directions of tilt of liquid crystal molecules are defined, resulting in formation of the axisymmetric alignment as described above.

In the illustrated example, a total of four cuts 1213 are given point-symmetrically with respect to the opening 1214 corresponding to the center axis of a liquid crystal domain formed in the transmission region A of the pixel (in this case, the right opening as viewed from FIG. 2A). With these cuts 1213, the directions in which liquid crystal molecules fall during voltage application are defined, resulting in formation of three liquid crystal domains. The placement and preferred shapes of the wall structure 1215, the openings 1214 and the cuts 1213 are the same as those described above in relation to the transmissive LCD device 1100. In the example illustrated in FIGS. 2A and 2B, the transmission region A has two liquid crystal domains and the reflection region B has one liquid crystal domain. However, the placement is not limited to this. Each liquid crystal domain is preferably roughly square in shape from the standpoint of the viewing angle characteristics and the stability of alignment.

The LCD device 1200 has a shading region around each pixel, and the wall structure 1215 extends on the transparent substrate 1210*a* in the shading region. Since the shading region does not contribute to display, the wall structure 1215 formed in the shading region is free from adversely affecting the display. The wall structure 1215 shown in the illustrated example is a continuous wall surrounding the pixel. Alternatively, the wall structure 1215 may be composed of a plurality of separate walls. The wall structure 1215, which serves to define boundaries of the liquid crystal domains located near the outer edges of each pixel, should preferably have a length of some extent. For example, when the wall structure 1215 is composed of a plurality of walls, each wall is preferably longer than the gap between the adjacent walls.

Supports 1233 for defining the thickness of the liquid crystal layer 1220 (also called the cell gap) should preferably be formed in the shading region (in the illustrated example, the region defined by the black matrix 1232) to avoid degradation of the display quality due to the supports. Although the supports 1233 are formed on the wall structure 1215 provided in the shading region in the illustrated example, the supports 1233 may be formed on either transparent substrate 1210*a* or 1210*b*. In the case of forming the supports 1233 on the wall structure 1215, setting is made so that the sum of the height of the wall structure 1215 and the height of the supports 1233 is equal to the thickness of the liquid crystal layer 1220. If the supports 1233 are formed in a region having no wall structure 1215, setting is made so that the height of the supports 1233 is equal to the thickness of the liquid crystal layer 1220.

In the LCD device 1200, when a predetermined voltage (voltage equal to or higher than a threshold voltage) is applied between the pixel electrode 1211 and the counter electrode 1231, two axisymmetrically aligned domains with their center axes stabilized in or near the two openings 1214 are formed in the transmission region A, and one axisymmetrically aligned domain is formed in the reflection region B. The electric field distorted with the wall faces of the wall structure 1215 and the wall face effect of the wall structure 1215 mainly define the directions in which liquid crystal molecules in the three adjacent liquid crystal domains (two in the transmission region and one in the reflection region) fall with an electric field. Also, the tilt electric field generated near the four cuts 1233 acts to define the directions in which liquid crystal molecules in the three adjacent liquid crystal domains fall with the electric field. Such alignment regulating forces act cooperatively, to stabilize the axisymmetric alignment of the liquid crystal domains. Moreover, the center axes of the two axisymmetrically aligned liquid crystal domains formed in the transmission region A are fixed in or near the openings 1214 and stabilized.

A preferred construction specific to the transflective LCD device 1200 permitting both the transmission-mode display and the reflection-mode display will be described.

While light used for display passes through the liquid crystal layer 1220 once in the transmission-mode display, it passes through the liquid crystal layer 1220 twice in the reflection-mode display. Accordingly, as diagrammatically shown in FIG. 2B, the thickness dt of the liquid crystal layer 1220 in the transmission region A is preferably set roughly double the thickness dr of the liquid crystal layer 1220 in the reflection region B. By setting in this way, the retardation given to the light by the liquid crystal layer 1220 can be roughly the same in both display modes. Most preferably, dr=0.5 dt should be satisfied, but good display is secured in both display modes as long as 0.3 dt<dr<0.7 dt is satisfied. Naturally, dt=dr may be satisfied depending on the use.

In the LCD device 1200, a transparent dielectric layer 1234 is provided on the glass substrate 1210*b* only in the reflection region B to make the thickness of the liquid crystal layer 1220 in the reflection region B smaller than that in the transmission region A. This construction eliminates the necessity of providing a step by forming an insulating film and the like under the reflective electrode 1211*b*, and thus has an advantage of simplifying the fabrication of the active matrix substrate 1210*a*. If the reflective electrode 1211*b* is formed on such an insulting film provided to give a step for adjusting the thickness of the liquid crystal layer 1220, light used for transmission display will be shaded with the reflective electrode covering a slope (tapered face) of the insulating film, or light reflected from the reflective electrode formed on a slope of the insulating film will repeat internal reflection, failing to be effectively used even for reflection display. By adopting the construction described above, occurrence of such problems is prevented, and thus the light use efficiency can be improved.

If the transparent dielectric layer 1234 is provided with a function of scattering light (diffuse reflection function), white display close to good paper white can be realized without the necessity of providing the reflective electrode 1211b with the diffuse reflection function. Such white display close to paper white can also be realized by making the surface of the reflective electrode 1211b uneven, and in this case, no light scattering function is necessary for the transparent dielectric layer 1234. However, the uneven surface may fail to stabilize the position of the center axis of the axisymmetric alignment depending on the shape of the uneven surface. On the contrary, by combining the transparent dielectric layer 1234 having the light scattering function and the reflective electrode 1211b having a flat surface, the position of the center axis can be stabilized with the opening 1214 formed in the reflective electrode 1211b more reliably. Note that in the case of making the surface of the reflective electrode 1211b uneven to provide the reflective electrode 1211b with the diffuse reflection function, the uneven shape is preferably a continuous wave shape to prevent occurrence of an interference color, and such a shape is preferably set to allow stabilization of the center axis of the axisymmetric alignment.

While light used for display passes through the color filter layer 1230 once in the transmission mode, it passes through the color filter layer 1230 twice in the reflection mode. Accordingly, if the color filter layer 1230 has the same optical density both in the transmission region A and the reflection region B, the color purity and/or the luminance may decrease in the reflection mode. To suppress occurrence of this problem, the optical density of the color filter layer in the reflection region is preferably made lower than that in the transmission region. The optical density as used herein is a characteristic value characterizing the color filter layer. For example, the optical density can be reduced by reducing the thickness of the color filter layer. Otherwise, the optical density can be reduced by reducing the density of a pigment added, for example, while keeping the thickness of the color filter layer unchanged. Forming color filter layers different between the transmission region A and the reflection region B in this way is very effective in improvement of the display color reproducibility.

Figure 3:
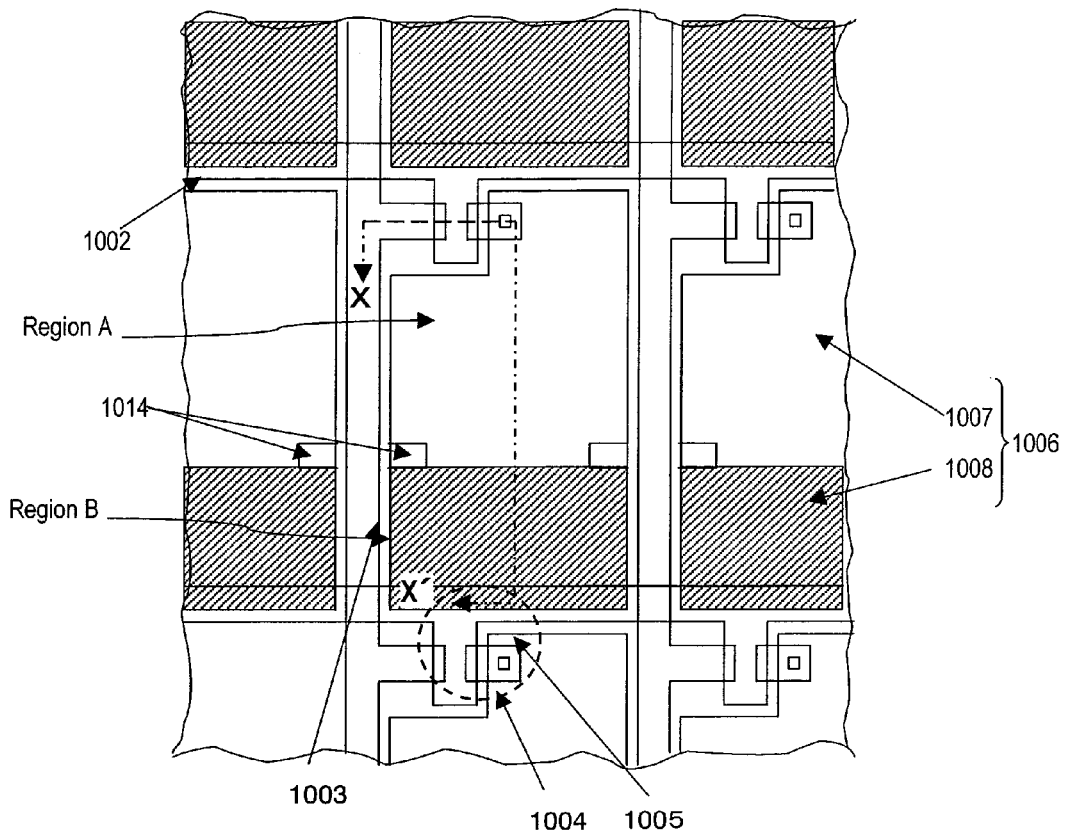
FIG. 3 is a plan view of an active matrix substrate 1210a of the transflective LCD device 1200.
Figure 4:
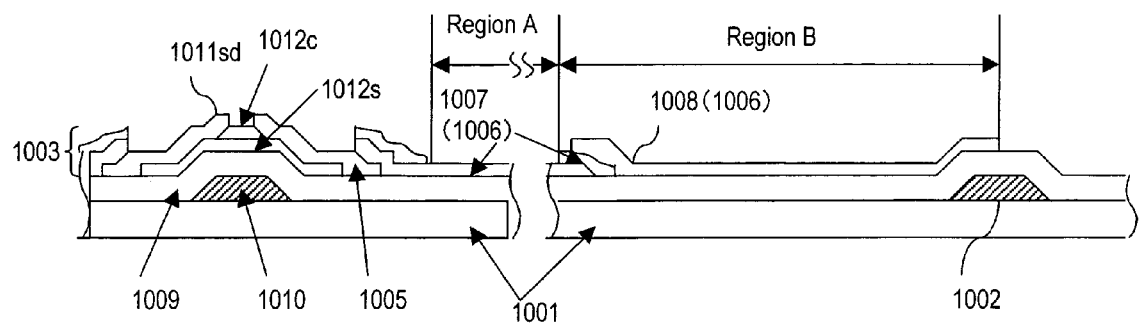
FIG. 4 is a cross-sectional view of the active matrix substrate 1210a of the transflective LCD device 1200.

Next, referring to FIGS. 3 and 4, an example of the structure of an active matrix substrate suitably used for the transflective LCD device will be described. FIG. 3 is a partial enlarged view of the active matrix substrate, and FIG. 4 is a cross-sectional view taken along line X-X' in FIG. 3. The active matrix substrate shown in FIGS. 3 and 4 can be the same in construction as the active matrix substrate shown in FIGS. 2A and 2B, except that one liquid crystal domain is formed in the transmission region A (that is, the numbers of the openings 1214 and the cuts 1213 are reduced).

The active matrix substrate shown in FIGS. 3 and 4 has a transparent substrate 1001 made of a glass substrate, for example. Gate signal lines 1002 and source signal lines 1003 run on the transparent substrate 1001 to cross each other at right angles. TFTs 1004 are formed near the crossings of these signal lines 1002 and 1003. Drain electrodes 1005 of the TFTs 1004 are connected to corresponding pixel electrodes 1006.

Each of the pixel electrodes 1006 includes a transparent electrode 1007 made of a transparent conductive layer such as an ITO layer and a reflective electrode 1008 made of Al and the like. The transparent electrode 1007 defines a transmission region A, and the reflective electrode 1008 defines a reflection region B. Cuts 1014 are formed at predetermined positions of the pixel electrode 1006 for controlling the alignment of the axisymmetrically aligned domains as described above. Also, a wall structure (not shown) is formed in a non-display region outside each pixel (shading region) where signal lines extend, for defining the aligned state of the axisymmetrically aligned domains.

The pixel electrode 1006 overlaps the gate signal line for the next row via a gate insulating film 1009, forming a storage capacitance. The TFT 1004 has a multilayer structure including the gate insulating film 1009, a semiconductor layer 1012, a channel protection layer 1013 and an $n^+$-Si layer 1011 (source/drain electrodes) formed in this order on a gate electrode 1010 branched from the gate signal line 1002.

The illustrated TFT is of a bottom gate type. The TFT is not limited to this type, but a top gate type TFT can also be used.

As described above, in the LCD 1200 having the construction shown in FIGS. 2A and 2B, the center axes of the axisymmetrically aligned liquid crystal domains formed in the transmission region are fixed and stabilized with the openings 1214 formed in the counter electrode 1231. Therefore, like the LCD 1100, as a result of the placement of the center axes of the axisymmetrically aligned liquid crystal domains at fixed positions over the entire liquid crystal display panel, the uniformity of the display improves. Also, as a result of the stabilization of the axisymmetric alignment, the response time in grayscale display can be shortened. Moreover, occurrence of an afterimage due to pressing of the liquid crystal display panel can be reduced (the time required to resume from the pressing can be shortened).

Also, in the LCD device 1200, the display brightness and color purity in both the transmission mode and the reflection mode can be improved with the transparent dielectric layer 1234 and/or the color filter layer 1230 constructed in the manner described above. Note that although no opening was formed to correspond to the center axis of the axisymmetrically aligned liquid crystal domain formed in the reflection region in the illustrated example, an opening may be formed also in the counter electrode 1231 in the reflection region.

Operation Principle

The reason why the LCD device having a vertically aligned liquid crystal layer in the first aspect of the present invention has excellent wide viewing angle characteristics will be described with reference to FIGS. 5A and 5B.

Figure 5A:
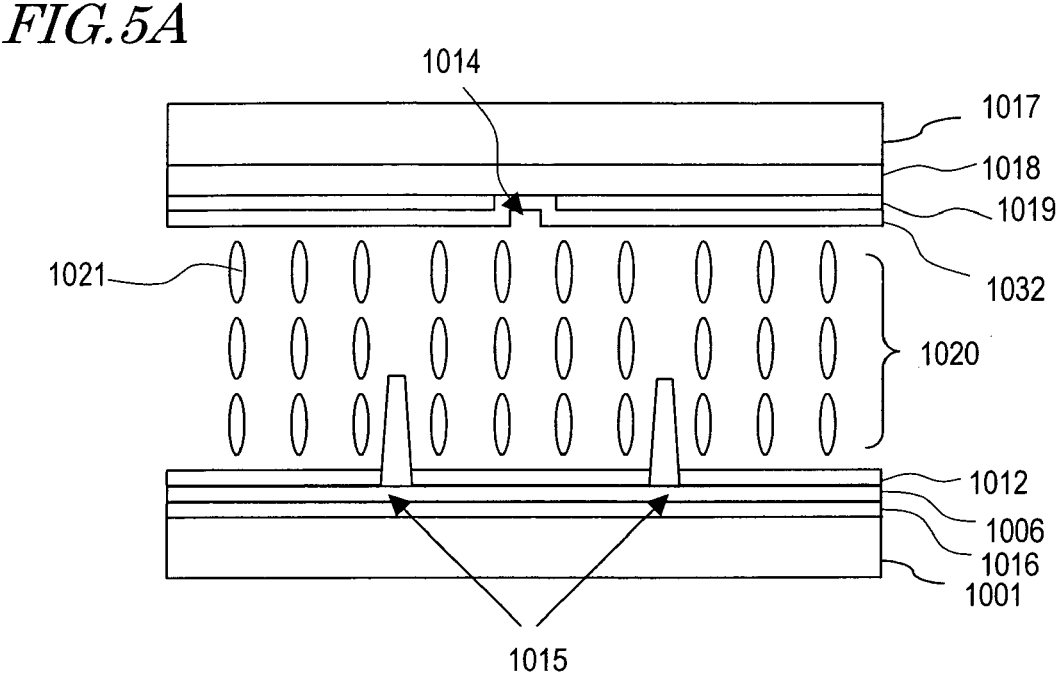
FIGS. 5A and 5B are schematic views for demonstrating the operation principle of the LCD devices in the first aspect of the present invention, showing the states during non-voltage application (FIG. 5A) and during voltage application (FIG. 5B).
Figure 5B:
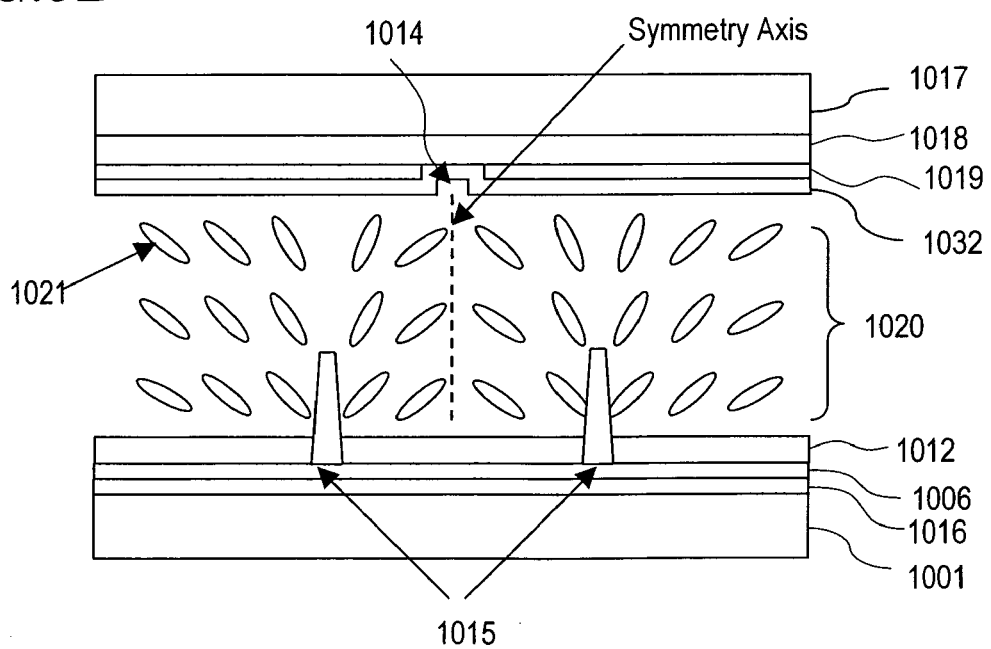

FIGS. 5A and 5B are views for demonstrating how the alignment regulating forces of a wall structure 1015 formed on the active matrix substrate and an opening 1014 formed on the color filter substrate act, in which the aligned states of liquid crystal molecules during non-voltage application (FIG. 5A) and during voltage application (FIG. 5B) are diagrammatically shown. The state shown in FIG. 5B is for display of a grayscale level.

The LCD device shown in FIGS. 5A and 5B includes an insulating film 1016, a pixel electrode 1006, the wall structure 1015 and an alignment film 1012 formed in this order on a transparent substrate 1001. The LCD device also includes a color filter layer 1018, a counter electrode 1019 having the opening 1014 at a predetermined position and an alignment film 1032 formed in this order on another transparent substrate 1017. A liquid crystal layer 1020 interposed between the two substrates includes liquid crystal molecules 1021 having negative dielectric anisotropy.

As shown in FIG. 5A, during non-voltage application, the liquid crystal molecules 1021 are aligned roughly vertical to the substrate surface with the alignment regulating force of the vertical alignment films 1012 and 1032.

As shown in FIG. 5B, during voltage application, the liquid crystal molecules 1021 having negative dielectric anisotropy attempt to make their major axes vertical to electric lines of force, and thus the directions in which the liquid crystal molecules 21 fall are defined with a tilt electric field generated around the opening 1014 and also with distortion in electric field occurring near the side faces (wall faces) of the wall structure 1015 and the alignment regulating force of the wall structure 1015. In this way, the liquid crystal molecules 1021 are aligned axisymmetrically around the opening 1014 as the center. In the resultant axisymmetrically aligned domain, liquid crystal directors point in all directions (directions in the substrate plane), and thus, excellent viewing angle characteristics can be obtained. Herein, the term "axisymmetric alignment (or orientation)" has the same meaning as the term "radially inclined alignment (or orientation)". These terms refer to the state where liquid crystal molecules are continuously oriented without forming disclination around the central axis of axisymmetric alignment (center of the radially inclined alignment), and the longer axis of the liquid crystal molecules is oriented radially, tangentially, or spirally. In either case, the longer axis of the liquid crystal molecules has a component radially inclining from the center of the orientation (i.e., a component parallel to the inclined electric field).

Although the action of the tilt electric field generated around the opening 1014 and the alignment regulating force of the wall structure 1015 were referred to in the above description, a tilt electric field is also generated around cuts formed at edges of the pixel electrode 1006, and the directions of the tilt of the liquid crystal molecules 1021 are also defined with this tilt electric field.

Hereinafter, referring to FIGS. 6A and 6B, the mechanism with which an opening formed in the counter electrode stabilizes the center axis of axisymmetric alignment in the LCD device in the first aspect of the present invention will be described.

Figure 6A:
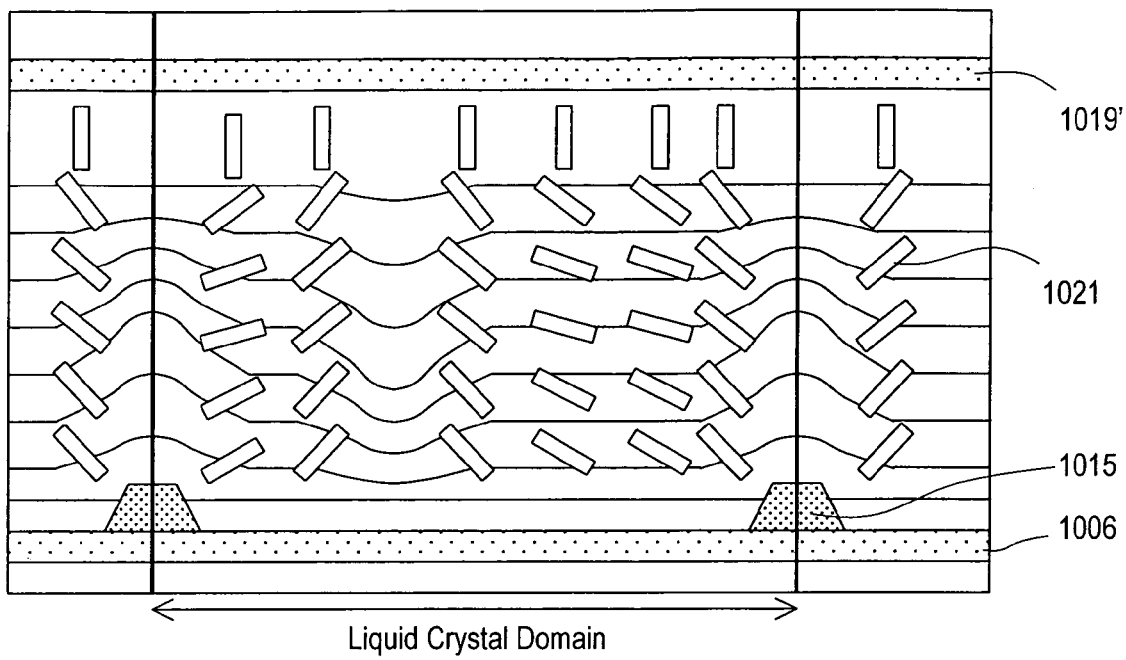
FIGS. 6A and 6B are views diagrammatically illustrating the aligned state of liquid crystal molecules (shown in line segments in FIGS. 6A and 6B) 200 msec after application of a voltage giving a relative transmittance of 10% to a liquid crystal layer, together with the equipotential lines of an electric field generated in the liquid crystal layer at that time obtained by two-dimensional electric field simulation, where
Figure 6B:
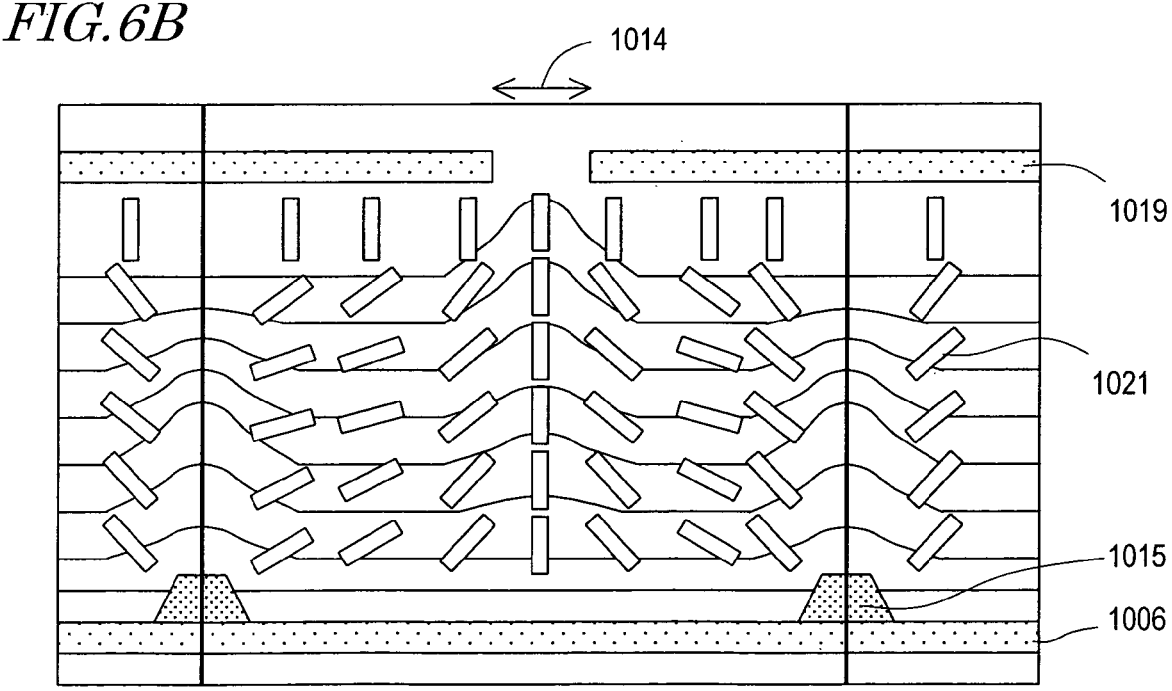

FIGS. 6A and 6B are views diagrammatically illustrating the aligned state of liquid crystal molecules (shown as line segments in FIGS. 6A and 6B) 200 msec after application of a voltage that gives a relative transmittance of 10% to a liquid crystal layer (3V in this case), together with equipotential lines of an electric field generated in the liquid crystal layer at that time as obtained by a two-dimensional electric field simulation, where FIG. 6A shows the case of providing no opening in a counter electrode and FIG. 6B shows the case of providing an opening in the counter electrode. FIG. 6B corresponds to a cross-sectional view taken along line 6B-6B' in FIG. 1A and FIG. 2A. In the illustrated example, the thickness of the liquid crystal layer is 4.0 µm, the dielectric constant of the liquid crystal material is −4.5, the refractive indexes no=1.485 and ne=1.495, the height of the wall structure is 0.5 µm, and the pixel pitch is 50 µm×16 µm.

As shown in FIG. 6A, in which a counter electrode 1019' has no opening, the center axis of the axisymmetric alignment of liquid crystal molecules 1021 may not be fixed effectively at a fixed position, failing to be formed in the center between the walls of the wall structure 1015. By forming an opening 1014 near the center between the walls of the wall structure 1015 as shown in FIG. 6B, the center axis of the axisymmetric alignment of the liquid crystal molecules 1021 is fixed in the opening 1014 and thus stabilized. The liquid crystal molecules 1021 located near the center of the opening 1014 are aligned vertically serving as the center axis of the axisymmetric alignment. This occurs due to the action of a tilt electric field that is generated because the equipotential lines are attracted into the opening 1014 formed in the counter electrode 1019. The liquid crystal molecules 1021, staying roughly uniformly in their vertically aligned state immediately after the voltage application, gradually shift to axisymmetric alignment with time with the center axis being positioned in the center of the opening 1014, and thus are fixed/stabilized.

The relationship between the electric field at the opening 1014 formed in the counter electrode 1019 and the alignment behavior of the liquid crystal molecules 1021 was analyzed in detail. From the results of the analysis, it was found that the liquid crystal molecules 1021 located in the center of the opening 1014 were immobilized when the potential Va (as obtained in the above electric field simulation, for example) at the center of the opening 1014 was lower than the threshold voltage Vth of the liquid crystal layer. That is, if the potential Va at the center of the opening 1014 is lower than the threshold voltage Vth (Va<Vth), the liquid crystal molecules are kept in their initial vertically aligned state irrespective of the application of the voltage across the liquid crystal layer, and thus the molecular axes uniformly keep standing vertically. On the contrary, if the potential Va at the center of the opening 1014 is higher than the threshold voltage Vth (Va>Vth) during voltage application, the liquid crystal molecules are aligned along the equipotential lines (for a liquid crystal material having negative dielectric anisotropy) under the influence of the electric field. The liquid crystal molecules are therefore tilted, and this makes it difficult to fix the axis position effectively. Thus, since the axis position is no more uniform and the relaxation response time at a change in grayscale voltage increases, the roughness of display increases and the response time is delayed, causing the afterimage phenomenon and the like to become noticeable easily. To ensure sufficient stabilization of the axisymmetric alignment in a grayscale level, it is preferred to set the size of the opening so that the potential at the center of the opening is lower than the threshold voltage of the liquid crystal layer when a voltage giving a relative transmittance of 10% is applied, for example.

The shape of the opening is preferably circular although not limited to this. To exert roughly equal alignment regulating force in all directions, the shape is preferably a polygon having four or more sides and also preferably a regular-polygon. The size Wh of the opening (opening size Wh) preferably satisfies the condition 2 µm≦Wh≦20 µm. The opening size Wh is expressed by the diameter when the opening is circular, or by the length of the longest diagonal line when it is a polygon.

The reason why the opening size Wh should preferably satisfy the conditions 2 µm≦Wh≦20 µm will be described with reference to FIGS. 7 and 8. Note that a circular opening was used in the following examination, and that the liquid crystal layer and the liquid crystal material described above with reference to FIGS. 6A and 6B were also used in this case.

Figure 7:
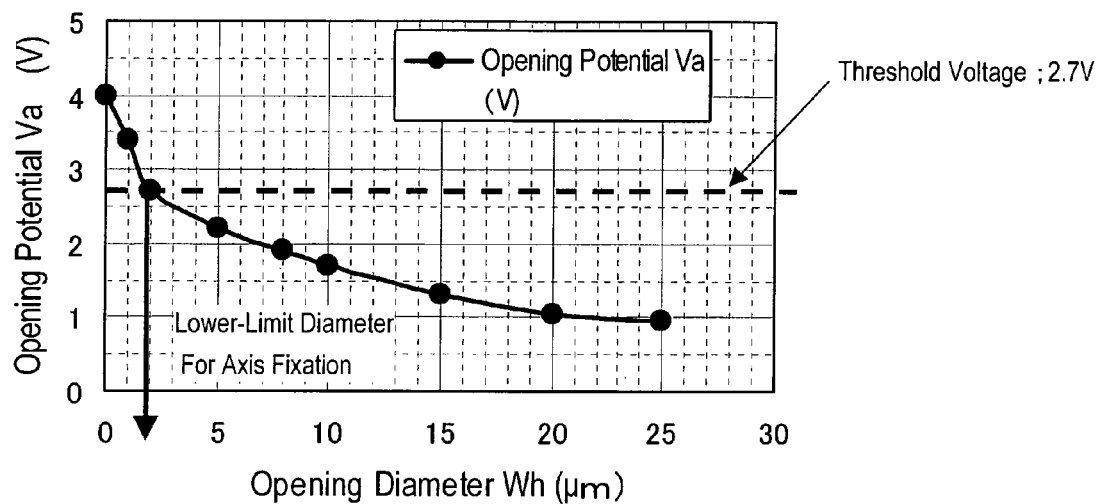
FIG. 7 is a graph showing the relationship between the opening diameter Wh and the opening potential Va during application of 3V (grayscale voltage) in an LCD device of an embodiment in the first aspect of the present invention.

FIG. 7 is a graph showing the relationship between the opening diameter Wh and the potential Va at the opening (opening potential Va) during application of 3V. FIG. 8 is a graph showing the relationship between the diameter Lh of a region in the opening giving a relative transmittance of 0% during application of 3V, that is, the diameter of a region in which liquid crystal molecules are aligned vertically (vertically aligned region diameter Lh) and the opening diameter Wh.

As is found from FIG. 7, with increase of the opening diameter Wh, the opening potential Va monotonously decreases. With the threshold voltage Vth of the liquid crystal layer being 2.7V, the lower limit of the range of preferred opening diameters Wh is 2 µm. In this examination, the threshold voltage of the liquid crystal layer was defined as the lowest voltage value with which the relative transmittance of the liquid crystal layer showed any change from the state of 0% in the voltage-transmittance characteristics computed in an optical simulation conducted based on the construction of the liquid crystal panel described above. The results of the simulation were verified with evaluation of the actual panel.

Figure 8:
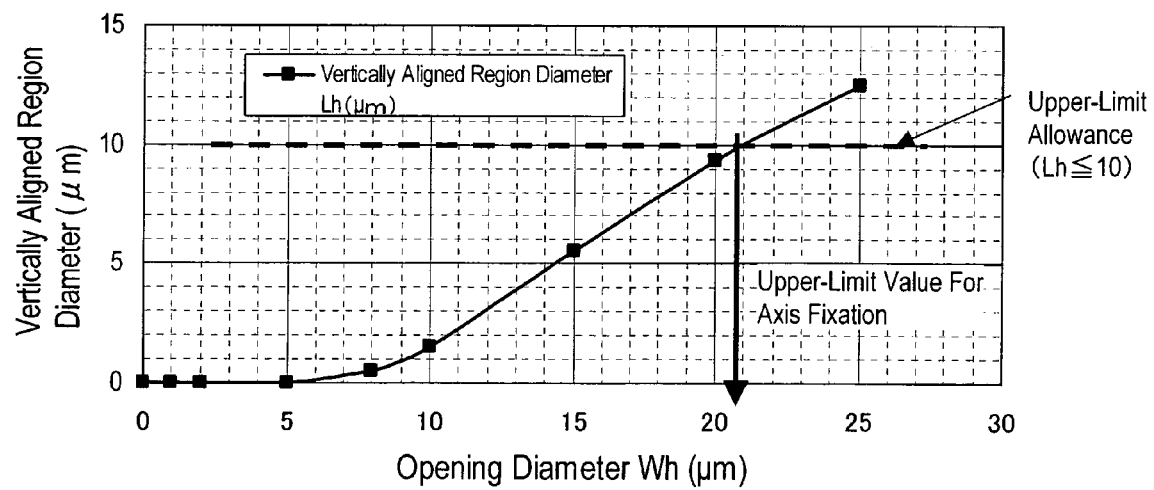
FIG. 8 is a graph showing the relationship between the diameter (vertically aligned region diameter) Lh of a region in an opening giving a relative transmittance of 0% during application of 3V and the opening diameter Wh in an LCD device of an embodiment in the first aspect of the present invention.

As is found from FIG. 8, with increase of the opening diameter Wh, the vertically aligned region diameter Lh monotonously increases. Since the transmittance decreases with increase of the size of the vertically aligned region, the vertically aligned region should preferably be small from the standpoint of the transmittance. Assuming that the size of a sub-pixel providing one liquid crystal domain is about 500 µm$^2$ (the size of one pixel is 50 µm×16 µm, and the size of the region providing one liquid crystal domain (sub-pixel) is 33 µm×16 µm), the effective aperture ratio will decrease by about 15% if the vertically aligned region diameter Lh exceeds 10 µm. To ensure sufficient display brightness, therefore, the opening diameter Wh is preferably 20 µm or less. To enhance the function of stabilizing the axisymmetric alignment, the opening diameter Wh is preferably 4 µm or more. To suppress decrease in transmittance, the opening diameter Wh is more preferably 15 µm or less. Note that the diameter of the region giving a relative transmittance of 0% (vertically aligned region) refers to the diameter of a region, near the opening, in which liquid crystal directors are fixed to point in the vertical direction even during application of a voltage for driving the liquid crystal layer, permitting no passing of light (exhibiting black display with substantially no occurrence of birefringence), as obtained in a two-dimensional electric field (optical) simulation.

The construction of an LCD device in the first aspect of the present invention will be described with reference to FIG. 9.

Figure 9:
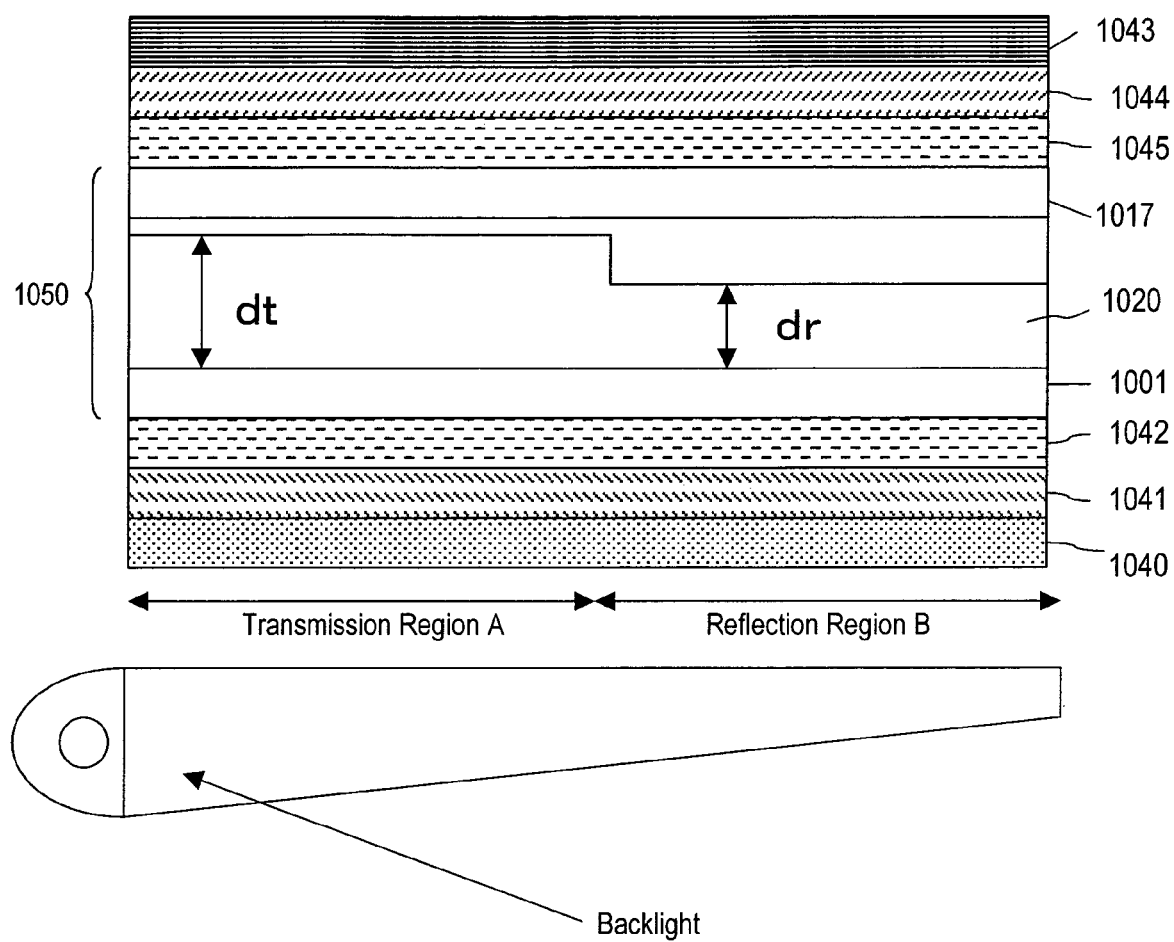
FIG. 9 is a diagrammatic view showing an example of construction of an LCD device of an embodiment in the first aspect of the present invention.

The LCD device shown in FIG. 9 includes: a backlight; a transflective liquid crystal panel 1050; a pair of polarizing plates 1040 and 1043 placed to face each other via the transflective liquid crystal panel 1050; a quarter wave plates 1041 and 1044 respectively placed between the polarizing plates 1040 and 1043 and the liquid crystal panel 1050; and phase plates 1042 and 1045 having negative optical anisotropy respectively placed between the wave plates 1041 and 1044 and the liquid crystal panel 1050. The liquid crystal panel 1050 includes a vertically aligned liquid crystal layer 1020 between a transparent substrate (active matrix substrate) 1001 and a transparent substrate (counter substrate) 1017. As the liquid crystal panel 1050, one having the same construction as that of the LCD device 1200 shown in FIGS. 2A and 2B is used.

The display operation of the LCD device shown in FIG. 9 will be briefly described.

In reflection-mode display, light incident from above passes through the polarizing plate 1043 to be output as linearly polarized light. The linearly polarized light is changed to circularly polarized light with the quarter wave plate 1044 placed so that the slower axis thereof forms 45° with the transmission axis of the polarizing plate 1043. The circularly polarized light passes through the color filter layer (not shown) formed on the substrate 1017. In the illustrated example, the phase plate 1045 provides no phase difference for light incident in the normal direction.

During non-voltage application, in which liquid crystal molecules in the liquid crystal layer 1020 are aligned roughly vertical to the substrate plane, incident light passes through the liquid crystal layer 1020 with a phase difference of roughly 0 and is reflected with the reflective electrode formed on the lower substrate 1001. The reflected circularly polarized light passes again through the liquid crystal layer 1020 and the color filter layer. The light then passes through the phase plate 1045 having negative optical anisotropy as the circularly polarized light, to enter the quarter wave plate 1044, where the light is changed to linearly polarized light having a polarizing direction orthogonal to the polarizing direction given to the incident light after first passing through the polarizing plate 1043, and reaches the polarizing plate 1043. The resultant linearly polarized light fails to pass through the polarizing plate 1043, and thus black display is provided.

During voltage application, in which the liquid crystal molecules in the liquid crystal layer 1020 are tilted toward the horizontal direction from the direction vertical to the substrate plane, the incident circularly polarized light is changed to elliptically polarized light due to birefringence of the liquid crystal layer 1020, and reflected with the reflective electrode formed on the lower substrate 1001. The polarized state of the reflected light is further changed during passing back through the liquid crystal layer 1020. The reflected light passes again through the color filter layer and then the phase plate 1045 having negative optical anisotropy, to enter the quarter wave plate 1044 as the elliptically polarized light. Accordingly, when reaching the polarizing plate 1043, the light is not linearly polarized light having a polarizing direction orthogonal to the polarizing direction given to the original incident light, and thus passes through the polarizing plate 1043. That is to say, by adjusting the applied voltage, the degree of the tilt of the liquid crystal molecules can be controlled, and thus the amount of reflected light allowed to pass through the polarizing plate 1043 can be changed, to thereby enable grayscale display.

In transmission-mode display, the upper and lower polarizing plates 1043 and 1040 are placed so that the transmission axes thereof are orthogonal to each other. Light emitted from a light source is changed to linearly polarized light at the polarizing plate 1040, and then changed to circularly polarized light when being incident on the quarter wave plate 1041 placed so that the slower axis thereof forms 45° with the transmission axis of the polarizing plate 1040. The circularly polarized light then passes through the phase plate 1042 having negative optical anisotropy and is incident on the transmission region A of the lower substrate 1001. In the illustrated example, the phase plate 1042 provides no phase difference for light incident in the normal direction.

During non-voltage application, in which liquid crystal molecules in the liquid crystal layer 1020 are aligned roughly vertical to the substrate plane, the incident light passes through the liquid crystal layer 1020 with a phase difference of roughly 0. That is, the light incident on the lower substrate 1001 as circularly polarized light passes through the liquid crystal layer 1020 and then the upper substrate 1017 in this state. The light then passes through the upper phase plate 1045 having negative optical anisotropy, to enter the quarter wave plate 1044. The lower and upper quarter wave plates 1041 and 1044 are placed so that the slower axes thereof are orthogonal to each other. Therefore, a phase difference in the polarized light that has entered the quarter wave plate 1044, which was given at the lower quarter wave plate 1041, can be cancelled with the quarter wave plate 1044, and thus the light resumes the original linearly polarized light. The polarized light coming from the upper quarter wave plate 1044 is therefore linearly polarized light having the polarizing direction parallel with the transmission axis (polarizing axis) of the polarizing plate 1040, and thus absorbed with the polarizing plate 1043 of which the transmission axis is orthogonal to that of the polarizing plate 1040. Accordingly, black display is provided.

During voltage application, in which the liquid crystal molecules in the liquid crystal layer 1020 are tilted toward the horizontal direction from the direction vertical to the substrate plane, the incident circularly polarized light is changed to elliptically polarized light due to birefringence of the liquid crystal layer 1020. The light then passes through the color filter layer 1017, the phase plate 1045 having negative optical anisotropy, and the quarter wave plate 1044 as the elliptically polarized light. Accordingly, when reaching the polarizing plate 1043, the light is not linearly polarized light orthogonal to the polarized component in the original incident light, and thus passes through the polarizing plate 1043. That is to say, by adjusting the applied voltage, the degree of the tilt of the liquid crystal molecules can be controlled, and thus the amount of light allowed to pass through the polarizing plate 1043 can be changed, to thereby enable grayscale display.

The phase plate having negative optical anisotropy minimizes the amount of change in phase difference occurring with change of the viewing angle when the liquid crystal molecules are in the vertically aligned state, and thus suppresses black floating observed when the display device is viewed at a wide viewing angle. In place of the combination of the phase plate having negative optical anisotropy and the quarter wave plate, a biaxial phase plate unifying the functions of both plates may be used.

When axisymmetrically aligned domains are used to implement the normally black mode that presents black display during non-voltage application and white display during voltage application, as in the first aspect of the present invention, a polarizing plate-caused extinction pattern can be eliminated by placing a pair of quarter wave plates on the top and bottom of the LCD device (panel), and thus the brightness can be improved. Also, when axisymmetrically aligned domains are used to implement the normally black mode with upper and lower polarizing plates placed so that the transmission axes thereof are orthogonal to each other, it is theoretically possible to present black display of substantially the same level as that obtained when a pair of polarizing plates are placed under crossed nicols. Therefore, a considerably high contrast ratio can be obtained, and also, with the all-direction alignment of liquid crystal molecules, wide viewing angle characteristics can be attained.

Figure 10:
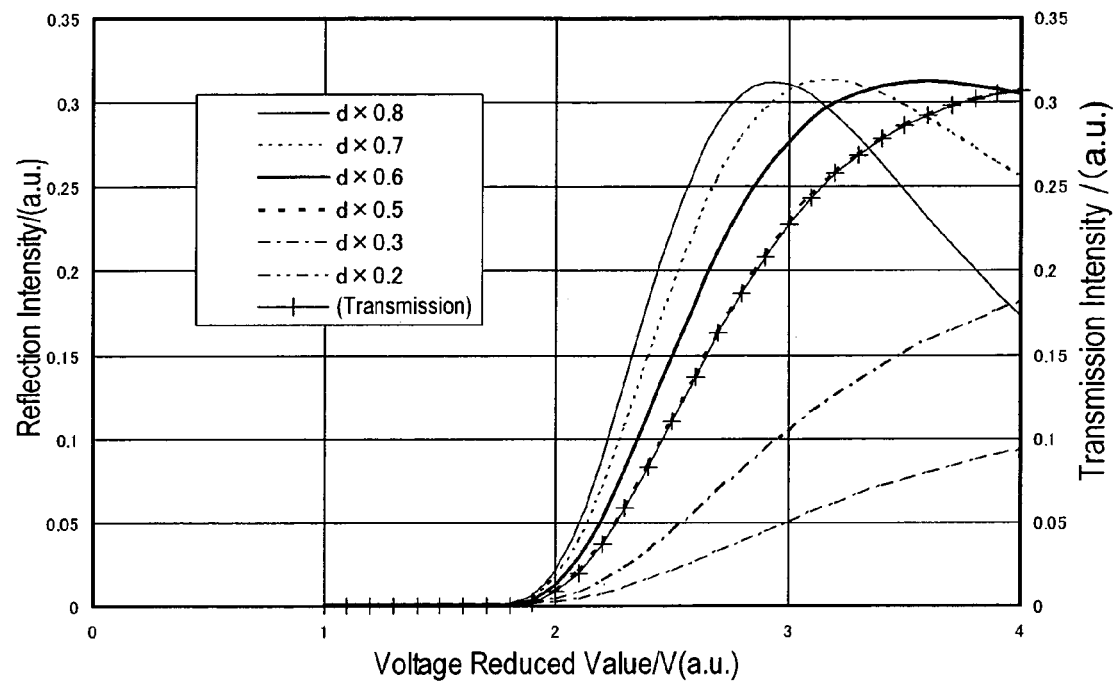
FIG. 10 is a graph showing the dependence of the voltage-reflectance (transmittance) of a transmission region and a reflection region on the thickness of a liquid crystal layer in an LCD device of an embodiment in the first aspect of the present invention.

The thicknesses dt and dr of the liquid crystal layer in the transmission region and the reflection region defined in the first aspect of the present invention preferably has the relationship satisfying 0.3 dt<dr<0.7 dt, more preferably 0.4 dt<dr<0.6 dt, as is found from the dependence of the voltage-reflectance (transmittance) of the transmission region and the reflection region on the thickness of the liquid crystal layer shown in FIG. 10. If the thickness of the liquid crystal layer in the reflection region is smaller than the lower limit, the reflectance will be 50% or less of the maximum reflectance, failing to provide sufficiently high reflectance. If the thickness dr of the liquid crystal layer in the reflection region is greater than the upper limit, the peak of the reflectance in the voltage-reflectance characteristics exists at a drive voltage different from that in the case of the transmission display. Also, the relative reflectance tends to be low at a white display voltage optimal for the transmission display. The reflectance is as low as 50% or less of the maximum reflectance, failing to provide sufficiently high reflectance. Since the optical length in the liquid crystal layer in the reflection region is double that in the transmission region, the birefringence anisotropy ($\Delta n$) of the liquid crystal material and the panel cell thickness design are very important when the same design is made for both the transmission region and the reflection region.

Specific characteristics of the transflective LCD device in the first aspect of the present invention will be described as follows.

An LCD device having the construction shown in FIG. 9 was fabricated. As the liquid crystal cell 1050, one having the same construction as that of the LCD device 1200 shown in FIGS. 2A and 2B was used. In the counter electrode on the counter substrate, an opening having a diameter of 8 μm for fixing the center axis of an axisymmetrically aligned domain was formed at a predetermined position in each of the transmission region and the reflection region. A transparent dielectric layer having no light scattering function was formed on the color filter substrate as the transparent dielectric layer 1234, and a resin layer having a continuous uneven surface was formed under the reflective electrode 1211b, to thereby adjust the diffuse reflection characteristics in the reflection display.

The vertical alignment films were formed by a known method using a known alignment film material. No rubbing was made. A liquid crystal material having negative dielectric anisotropy ($\Delta n$: 0.1 and $\Delta \in$: $-4.5$) was used. In this example, the thicknesses dt and dr of the liquid crystal layer in the transmission region and the reflection region were set at 4 μm and 2.2 μm, respectively (dr=0.55 dt).

The LCD device of this example had a multilayer structure composed of a polarizing plate (observer side), a quarter wave plate (phase plate 1), a phase plate having negative optical anisotropy (phase plate 2 (NR plate)), the liquid crystal layer (on the upper and lower sides thereof, the color filter substrate and the active matrix substrate were respectively placed), a phase plate having negative optical anisotropy (phase plate 3 (NR plate)), a quarter wave plate (phase plate 4), and a polarizing plate (backlight side) in the order from the observer side. The upper and lower quarter wave plates (phase plates 1 and 4) were placed so that the slower axes thereof were orthogonal to each other, and had a phase difference of 140 nm. The phase plates having negative optical anisotropy (phase plates 2 and 3) had a phase difference of 135 nm. The two polarizing plates were placed so that the absorption axes thereof were orthogonal to each other.

A drive signal was applied to the thus-obtained LCD device (4V was applied across the liquid crystal layer) to evaluate the display characteristics.

Figure 11:
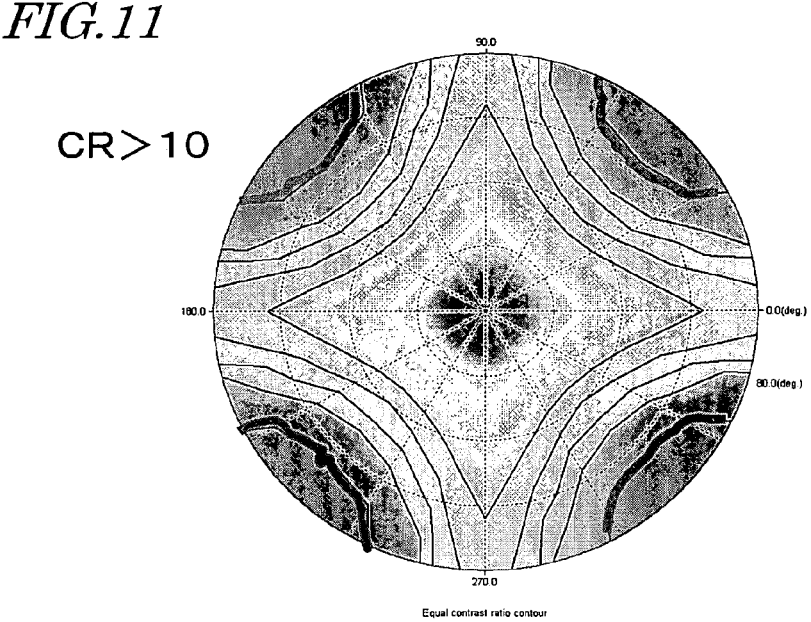
FIG. 11 is a view showing the visual angle—contrast ratio characteristics of an example of an LCD device of an embodiment in the first aspect of the present invention.

FIG. 11 shows the results of the visual angle—contrast characteristics in the transmission display. It was found from the results that the viewing angle characteristics in the transparent display were roughly symmetric in all directions, the range CR>10 was as large as up to ±80°, and the transmission contrast was as high as 300:1 or more at the front.

As for the characteristics of the reflection display, the reflectance evaluated with a spectral colorimeter (CM2002 from Minolta Co., Ltd.) was about 8.3% (value in terms of the aperture ratio of 100%) with respect to a standard diffuse plate as the reference. The contrast value of the reflection display was 21, which was high compared with the case of the conventional LCD devices.

No roughness of display was observed in visual evaluation in a slanting direction in a grayscale level (level 2 in the eight levels of grayscale). On the contrary, for an LCD device fabricated under the same conditions except that no opening was formed in the counter electrode on the counter substrate for comparison, roughness of display in a slanting direction was eminent in a grayscale level. In observation with an optical microscope with polarizing axes set orthogonal to each other, axisymmetrically aligned domains with their center axes aligned uniformly were recognized for the LCD device having electrode openings. For the latter LCD device having no opening, however, the center axes of some liquid crystal domains deviated from the centers of the sub-pixels, and it was confirmed that this variation in center axis position was a main cause of the roughness of display.

The grayscale response time (time required for a change from level 3 to level 5 in the eight levels of grayscale) was 38 msec for the LCD device having openings formed in the counter electrode. On the contrary, it was 60 msec for the LCD device having no opening. It was therefore confirmed that the response time in grayscale display could be shortened by providing openings in the counter electrode. As for the recovery of the alignment after the display panel was pressed with a finger during application of 4V (white display), an afterimage was hardly observed on the pressed portion (the alignment was immediately recovered from distortion) for the LCD device having openings. On the contrary, an afterimage was observed for several minutes for the LCD device having no opening. A difference was therefore recognized in the recovery of the alignment from distortion due to pressing.

Thus, with the formation of the openings in the counter electrode, obtained were the effects such as fixing/stabilizing the positions of the center axes of the axisymmetrically aligned domains, reducing the roughness of display in grayscale display when viewed in a slanting direction, improving the response speed in grayscale display, and reducing occurrence of an afterimage due to pressing of the display panel.

Next, LCD devices of embodiments in the second aspect of the present invention will be described concretely with reference to the relevant drawings.

Transmissive LCD Device

Figure 12A:
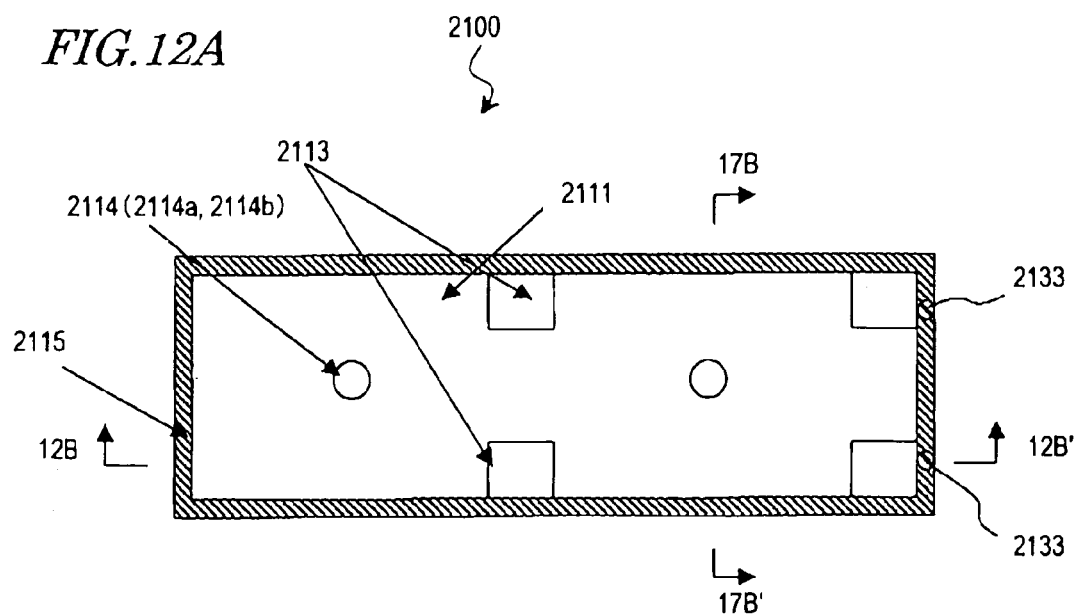
Figure 12B:
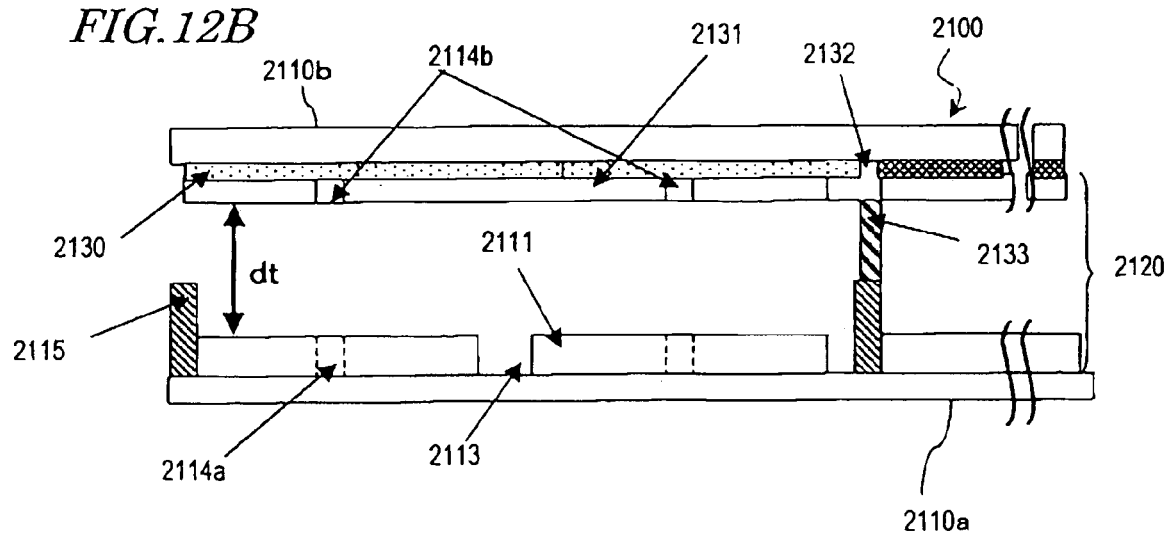

A transmissive LCD device 2100 of an embodiment in the second aspect of the present invention will be described with reference to FIGS. 12A and 12B. FIGS. 12A and 12B diagrammatically show one pixel of the transmissive LCD device 2100, in which FIG. 12A is a plan view and FIG. 12B is a cross-sectional view taken along line 12B-12B' in FIG. 12A.

Hereinafter, described will be the case that one pixel is divided into two parts (N=2). The number of parts into which one pixel is divided (=N) can also be three or more depending on the pixel pitch. In any case, the number of openings (=n) each to be positioned roughly in the center of a divided region on a second substrate is preferably the same as the number of divided parts (=N). The effective aperture ratio tends to decrease with increase of the number of divided parts (=N). Therefore, for an application to a high-definition display panel, the number of divided parts (=N) is preferably made small. The present invention is also applicable to the case involving no pixel division (this may be expressed as N=1). Each of the divided regions may be called a "sub-pixel". One liquid crystal domain is typically formed in each sub-pixel.

The LCD device 2100 includes a transparent substrate (for example, a glass substrate) 2110a, a transparent substrate 2110b placed to face the transparent substrate 2110a, and a vertically aligned liquid crystal layer 2120 interposed between the transparent substrates 2110a and 2110b. Vertical alignment films (not shown) are formed on the surfaces of the substrates 2110a and 2110b facing the liquid crystal layer 2120. During non-voltage application, therefore, liquid crystal molecules in the liquid crystal layer 2120 are aligned roughly vertical to the surfaces of the vertical alignment films. The liquid crystal layer 2120 includes a nematic liquid crystal material having negative dielectric anisotropy and also includes a chiral agent as required.

The LCD device 2100 further includes pixel electrodes 2111 formed on the transparent substrate 2110a and a counter electrode 2131 formed on the transparent substrate 2110b. Each pixel electrode 2111, the counter electrode 2131 and the liquid crystal layer 2120 interposed between these electrodes define a pixel. In the illustrated example, both the pixel electrodes 2111 and the counter electrode 2131 are formed of a transparent conductive layer (for example, an ITO layer). Typically, color filters 2130 (the entire of the plurality of color filters may also be called a color filter layer 2130) provided for the respective pixels, as well as a black matrix (shading layer) 2132 formed in the gaps between the adjacent color filters 2130, are formed on the surface of the transparent substrate 2110b facing the liquid crystal layer 2120, and the counter electrode 2131 is formed on the color filters 2130 and the black, matrix 2132. Alternatively, the color filters 2130 and the black matrix 2132 may be formed on the counter electrode 2131 (on the surface thereof facing the liquid crystal layer 2120).

In the LCD device 2100 shown in FIGS. 12A and 12B, in which the number of divided parts (=N) is 2, a wall structure 2115 to be described later extends on the transparent substrate 2110a in a shading region around each pixel. The pixel electrode 2111 has first openings 2114a of the number corresponding to the number of divided parts (n=2 in the illustrated example) at predetermined positions in the pixel. The pixel electrode 2111 also has four cuts 2113 at predetermined positions. On the transparent substrate 2110b, the counter electrode 2131 of each pixel has second openings 2114b of the number corresponding to the number of divided parts (n=2 in the illustrated example) at predetermined positions.

The first openings 2114a and the second openings 2114b are formed so that they are superposed one on the other spatially via the liquid crystal layer 2120. The first openings 2114a and the second openings 2114b have the same size (diameter), and each pair of the first and second openings 2114a and 2114b facing each other (which are called a pair of openings 2114 in some cases) coincide with each other when viewed from top as shown in FIG. 12A.

When a predetermined voltage is applied across the liquid crystal layer, two (number equal to the number of divided parts N) liquid crystal domains each having axisymmetric alignment are formed, with the center axes of the axisymmetric alignment thereof being in or near the first and second openings 2114*a* and 2114*b*. As will be described later in detail, the pairs of openings 2114 act to fix the positions of the center axes of the axisymmetrically aligned domains. With the placement of the first opening 2114*a* and the second opening 2114*b* to be superposed one on the other as in the illustrated example, the reduction in effective aperture ratio due to the existence of the pair of openings 2114 can be minimized. Since one center axis is fixed/stabilized with the joint action of the first opening 2114*a* and the second opening 2114*b*, the action exerted by the individual first or second opening 2114*a* or 2114*b* can be small compared with the case of fixing/stabilizing the center axis with one opening. It is therefore possible to reduce the diameter of the first and second openings 2114*a* and 2114*b*, and as a result, the reduction in effective aperture ratio can be minimized. The wall structure 2115 acts to define the directions in which liquid crystal molecules fall during voltage application (during generation of an electric field) thanks to its slope face effect. The alignment regulating force of the side slopes of the wall structure 2115 is also active during non-voltage application to tilt liquid crystal molecules.

The cuts 2113, provided in the pixel electrode 2111 near the boundaries of the axisymmetrically aligned domains, define the directions in which liquid crystal molecules fall with an electric field, and thus act to form the axisymmetrically aligned domains. A tilt electric field is generated around the pairs of openings 2114 and the cuts 2113 with a voltage applied between the pixel electrode 2111 and the counter electrode 2113. With this tilt electric field, together with the action of an electric field at the wall faces of the wall structure 2115 distorted with the existence of the wall structure 2115, the directions of tilt of liquid crystal molecules are defined, resulting in formation of the axisymmetric alignment as described above. In the illustrated example, a total of four cuts 2113 are given point-symmetrically with respect to the pair of openings 2114 corresponding to the center axis of a liquid crystal domain formed in the pixel (in this case, the right opening as viewed from FIG. 12A) (in this case, the entire pixel is a transmission region).

By providing the cuts 2113 as described above, the directions in which liquid crystal molecules fall during voltage application are defined, allowing formation of two liquid crystal domains. The reason why no cuts are provided on the left side of the pixel electrode 2111 as viewed from FIG. 12A is that substantially the same function is obtained from cuts provided on the right side of the adjacent pixel electrode (not shown) located left to the illustrated pixel electrode 2111, and thus cuts, which may decrease the effective aperture ratio of the pixel, are omitted on the left side of the pixel electrode 2111. Also, in the illustrated example, the wall structure 2115 to be described later gives the alignment regulating force. Therefore, with no cuts provided on the left side of the pixel electrode 2111, the resultant liquid crystal domain is as stable as a liquid crystal domain having such cuts. In addition, the effect of improving the effective aperture ratio is obtained.

Although a total of four cuts 2113 were formed in the illustrated example, at least one cut between the adjacent liquid crystal domains is sufficient. For example, an elongate cut may be formed in the center of the pixel and the other cuts may be omitted.

The shape of the first and second openings 2114*a* and 2114*b* formed at predetermined positions of the pixel electrode 2111 and the counter electrode 2131 to fix the center axes of the axisymmetrically aligned domains is preferably circular as illustrated. The shape is not limited to a circle, and also the shape of the first openings 2114*a* may be different from the shape of the second openings 2114*b*. However, to exert roughly equal alignment regulating force in all directions, the shape is preferably a polygon having four or more sides and also preferably a regular polygon.

The configuration and placement of the first opening 2114*a* and the second opening 2114*b* are not limited to the illustrated example described above in which the first opening 2114*a* and the second opening 2114*b* having the same size are superposed one on the other. The first and second openings 2114*a* and 2114*b* can separately provide the effect of fixing/stabilizing the axisymmetric alignment even when they are not superposed one on the other. However, the fixation of the center axis of the axisymmetric alignment will be further stabilized if the placement is made so that the first opening 2114*a* fixes one end of the center axis of the axisymmetric alignment of the liquid crystal domain and the second opening 2114*b* fixes the other end of the center axis. Also, the reduction in effective aperture ratio due to the existence of the openings 2114 will be lessened if the first and second openings 2114*a* and 2114*b* are placed to at least overlap each other via the liquid crystal layer. In this case, since one center axis is fixed/stabilized with the joint action of the first and second openings, the action to be exerted by the individual first or second opening 2114*a* or 2114*b* can be small compared with the case of fixing/stabilizing the center axis with one opening, and by superposing the first opening 114*a* and the second opening 114*b* having the same size one on the other as in the illustrated example, the reduction in effective aperture ratio can be minimized.

The shape of the cuts 2113 acting to define the directions in which liquid crystal molecules in the axisymmetrically aligned domains fall with the electric field is determined so that roughly equal alignment regulating force is exerted for the adjacent axisymmetrically aligned domains. For example, a square is preferred. The cuts may be omitted.

The LCD device 2100 has a shading region surrounding each of the pixels, and the wall structure 115 is placed on the transparent substrate 2110*a* in the shading region. The shading region as used herein refers to a region shaded from light due to the presence of TFTs, gate signal lines and source signal lines formed on the peripheries of the pixel electrodes 2111 on the transparent substrate 2110*a*, or the presence of the black matrix formed on the transparent substrate 2110*b*, for example. Since this region does not contribute to display, the wall structure 2115 formed in the shading region is free from adversely affecting the display.

The illustrated wall structure 2115 is a continuous wall surrounding the pixel. Alternatively, the wall structure 2115 may be composed of a plurality of separate walls. The wall structure 2115, which serves to define boundaries of liquid crystal domains located near the outer edges of the pixel, should preferably have a length of some extent. For example, when the wall structure is composed of a plurality of walls, each wall is preferably longer than the gap between the adjacent walls.

Supports 2133 for defining the thickness of the liquid crystal layer 2120 (also called the cell gap) are preferably formed in the shading region (in the illustrated example, the region defined by the black matrix 2132) to avoid degradation in display quality due to the supports. Although the supports 2133 are formed on the wall structure 2115*b* provided in the shading region in the illustrated example, the supports 2133 may be formed on either transparent substrate 2110*a* or 2110*b*. In the case of forming the supports 2133 on the wall structure 2115, setting is made so that the sum of the height of the wall structure 2115 and the height of the supports 2133 is equal to the thickness of the liquid crystal layer 2120. If the supports 2133 are formed in a region having no wall structure 2115, setting is made so that the height of the supports 2133 is equal to the thickness of the liquid crystal layer 2120. The supports 2133 can be formed by photolithography using a photosensitive resin, for example.

In the LCD device 2100, when a predetermined voltage (voltage equal to or higher than a threshold voltage) is applied between the pixel electrode 2111 and the counter electrode 2131, two axisymmetrically aligned domains are formed with their center axes stabilized in or near the two pairs of openings 2114 formed in the pixel electrode 2111 and the counter electrode 2131 The electric field distorted with the wall faces of the wall structure 2115 and the wall face effect of the wall structure 2115 mainly define the directions in which liquid crystal molecules in the two adjacent liquid crystal domains fall with an electric field. Also, the tilt electric field generated near the pair of cuts 2133 acts to define the directions in which liquid crystal molecules in the two adjacent liquid crystal domains fall with an electric field. Such alignment regulating forces presumably act cooperatively, to stabilize the axisymmetric alignment of the liquid crystal domains.

With the pairs of openings 2114 formed at positions in the pixel electrode 2111 and the counter electrode 2131 corresponding to the center axes of the axisymmetrically aligned liquid crystal domains, the positions of the center axes are fixed/stabilized. As a result of the fixation of the center axes of the axisymmetrically aligned liquid crystal domains over the entire liquid crystal display panel, the uniformity of the display improves. Also, as a result of the stabilization of the axisymmetric alignment, the response time in grayscale display can be shortened. Moreover, occurrence of an afterimage due to pressing of the liquid crystal display panel can be reduced (the time required to resume from the pressing can be shortened).

On the surface of the transparent substrate 2110a facing the liquid crystal layer 2120, provided are active elements such as TFTs and circuit elements such as gate signal lines and source signal lines connected to TFTs (all of these elements are not shown). Herein, the transparent, substrate 2110a, together with the circuit elements and the pixel electrodes 2111, the wall structure 2115, the supports 2133, the alignment film and the like described above formed on the transparent substrate 2110a, are collectively called an active matrix substrate in some cases. Likewise, the transparent substrate 2110b, together with the color filter layer 2130, the black matrix 2132, the counter electrode 2131, the alignment film and the like formed on the transparent substrate 2110b, are collectively called a counter substrate or a color filter substrate in some cases. The supports 2133 may be formed either on the active matrix substrate or on the color filter substrate.

Although omitted in the above description, the LCD device 2100 further includes a pair of polarizing plates placed to face each other via the transparent substrates 2110a and 2110b. The polarizing plates are typically placed so that their transmission axes are orthogonal to each other. The LCD device 2100 may further include a biaxial optical anisotropic medium layer and/or a uniaxial optical anisotropic medium layer, as will be described later.

Transflective LCD Device

Next, a transflective LCD device 2200 of an embodiment in the second aspect of the present invention will be described with reference to FIGS. 13A and 13B.

Figure 13A:
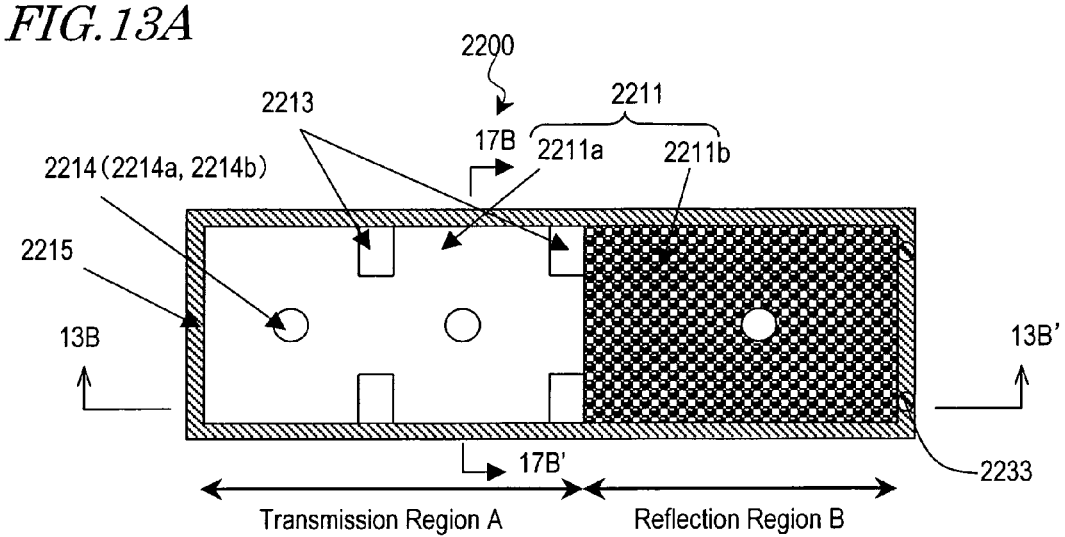
Figure 13B:
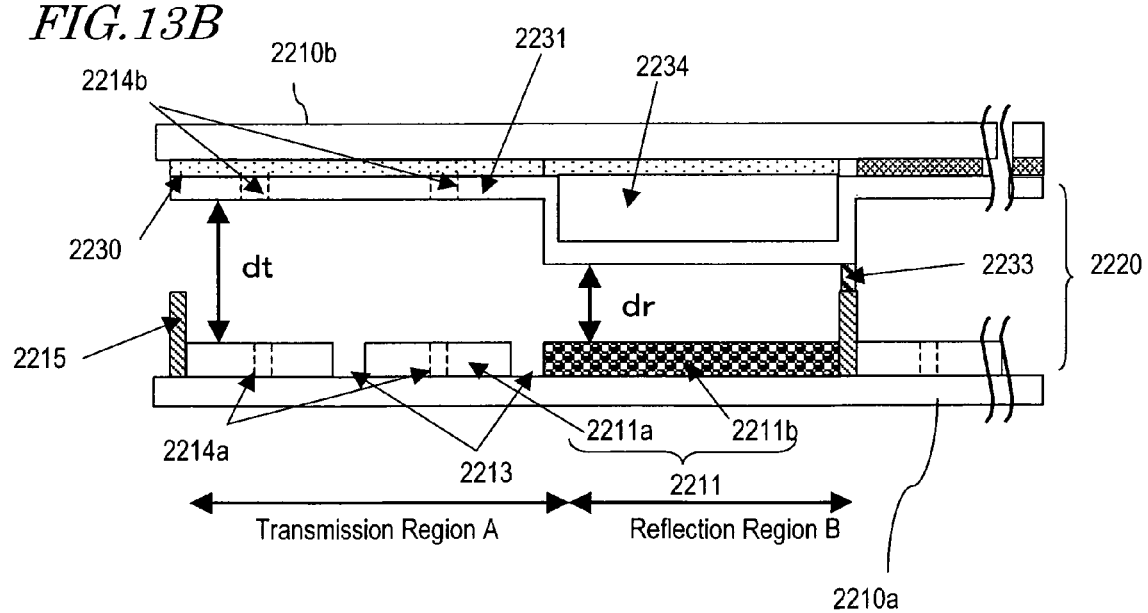

FIGS. 13A and 13B diagrammatically show one pixel of the transflective LCD device 2200 in the second aspect of the present invention, in which FIG. 13A is a plan view and FIG. 13B is a cross-sectional view taken along line 13B-13B' in FIG. 13A.

Hereinafter, described will be a case that one pixel is divided into three parts (N=3; two for the transmission region and one for the reflection region). The number of parts into which one pixel is divided (=N) can be at least two (at least one for the transmission region and at least one for the reflection region) determined depending on the pixel pitch. The number of openings (=n) each to be positioned roughly in the center of a divided region (region in which an axisymmetrically aligned domain is formed) on the counter substrate (second substrate) is preferably the same as the number of divided parts (=N). Note however that if a transparent dielectric layer is selectively formed on the surface of the counter substrate facing the liquid crystal layer in the reflection region, to be described later, an opening may not be formed in the counter electrode (second electrode) in the reflection region. The effective aperture ratio tends to decrease with increase of the number of divided parts (=N). Therefore, for an application to a high-definition display panel, the number of divided parts (=N) is preferably made small.

The LCD device 2200 includes a transparent substrate (for example, a glass substrate) 2210a, a transparent substrate 2210b placed to face the transparent substrate 2210a, and a vertically aligned liquid crystal layer 2220 interposed between the transparent substrates 2210a and 2210b. Vertical alignment films (not shown) are formed on the surfaces of the substrates 2210a and 2210b facing the liquid crystal layer 2220. During non-voltage application, therefore, liquid crystal molecules in the liquid crystal layer 2220 are aligned roughly vertical to the surfaces of the vertical alignment films. The liquid crystal layer 2220 includes a nematic liquid crystal material having negative dielectric anisotropy and also includes a chiral agent as required.

The LCD device 2200 further includes pixel electrodes 2211 formed on the transparent substrate 2210a and a counter electrode 2231 formed on the transparent substrate 2210b. Each pixel electrode 2211, the counter electrode 2231 and the liquid crystal layer 2220 interposed between these electrodes define a pixel. Circuit elements such as TFTs are formed on the transparent substrate 2210a as will be described later. Herein, the transparent substrate 2210a and the components formed thereon are collectively called an active matrix substrate 2210a in some cases.

Typically, color filters 2230 (the entire of the plurality of color filters may also be called a color filter layer 2230) provided for the respective pixels, as well as a black matrix (shading layer) 2232 provided in the gaps between the adjacent color filters 2230, are formed on the surface of the transparent substrate 210b facing the liquid crystal layer 2220, and the counter electrode 2231 is formed on the color filters 2230 and the black matrix 2232. Alternatively, the color filters 2230 and the black matrix 2232 may be formed on the counter electrode 2231 (on the surface thereof facing the liquid crystal layer 2220). Herein, the transparent substrate 2210b and the components formed thereon are collectively called a counter substrate (color filter substrate) 2210b in some cases.

Each pixel electrode 2211 includes a transparent electrode 2211a formed of a transparent conductive layer (for example, an ITO layer) and a reflective electrode 2211b formed of a metal layer (for example, an Al layer, an Al-including alloy layer, and a multilayer film including any of these layers). Having such a pixel electrode, each pixel includes a transmission region A defined by the transparent electrode 2211*a* and a reflection region B defined by the reflective electrode 2211*b*, to provide display in the transmission mode and display in the reflection mode, respectively.

In the LCD device 2200 shown in FIGS. 13A and 13B, in which the number of divided parts (=N) is 3 (two for the transmission region and one for the reflection region), a wall structure 2215 to be described later extends on the transparent substrate 2210*a* in a shading region around each pixel electrode 2211. The pixel electrode 2211 has first openings 2214*a* of the number corresponding to the number of divided parts (n=3 in the illustrated example) at predetermined positions in the pixel. The pixel electrode 2111 also has four cuts 2113 at predetermined positions. On the transparent substrate 2210*b*, the counter electrode 2231 of each pixel has two second openings 2214*b* corresponding to the number of divided parts in the transmission region.

When a predetermined voltage is applied across the liquid crystal layer, three (number equal to the number of divided parts N) liquid crystal domains each having axisymmetric alignment are formed, with the center axes of the axisymmetric alignment of the liquid crystal domains being in or near the first and second openings 2214*a* and 2214*b*. As will be described later, the openings 2214*a* and 2214*b* formed at predetermined positions of pixel electrode 2211 and the counter electrode 2231 act to fix the positions of the center axes of the axisymmetric alignment. The first opening 2214*a* and the second opening 2214*b* may be placed to be superposed one on the other as in the illustrated example. With this placement, the reduction in effective aperture ratio due to the existence of the pair of openings 2214 can be minimized. Since one center axis is fixed/stabilized with the joint action of the first and second openings, the action exerted by the individual first or second opening 2214*a* or 2214*b* can be small compared with the case of fixing/stabilizing the center axis with one opening. It is therefore possible to reduce the diameter of the first and second openings 2214*a* and 2214*b*, and as a result, the reduction in effective aperture ratio can be minimized. The wall structure 2215 acts to define the directions in which liquid crystal molecules tilt during voltage application (during generation of an electric field) thanks to its slope face effect.

Moreover, the cuts 2213, which are formed as required near a boundary between axisymmetrically aligned domains, act to define the directions in which liquid crystal molecules tilt with an electric field, to form the axisymmetrically aligned domains. A tilt electric field is generated around the cuts 2213, as in the openings 2214*a* and 2214*b*, with the application of a voltage between the pixel electrode 2211 and the counter electrode 2213. With this tilt electric field, acting together with an electric field at the wall faces distorted with the wall structure 2215, the directions of tilt of liquid crystal molecules are defined, resulting in formation of the axisymmetric alignment as described above.

In the illustrated example, a total of four cuts 2213 are given point-symmetrically with respect to the opening 2214*a* corresponding to the center axis of a liquid crystal domain formed in the transmission region A of the pixel (in this case, the right opening in the transmission region A as viewed from FIG. 13A). With these cuts 2213, the directions in which liquid crystal molecules fall during voltage application are defined, resulting in formation of three liquid crystal domains. The placement and preferred shapes of the wall structure 2215, the openings 2214 and the cuts 2213 are the same as those described above in relation to the transmissive LCD device 2100. In the example illustrated in FIGS. 13A and 13B, the transmission region A has two liquid crystal domains and the reflection region B has one liquid crystal domain. However, the arrangement is not limited to this. Each liquid crystal domain is preferably roughly square in shape from the standpoint of the viewing angle characteristics and the stability of alignment.

The LCD device 2200 has a shading region around each pixel, and the wall structure 2215 extends on the transparent substrate 2210*a* in the shading region. Since the shading region does not contribute to display, the wall structure 2215 formed in the shading region is free from adversely affecting the display. The wall structure 2215 shown in the illustrated example is a continuous wall surrounding the pixel. Alternatively, the wall structure 2215 may be composed of a plurality of separate walls. The wall structure 2215, which serves to define boundaries of liquid crystal domains located near the outer edges of the pixel, should preferably have a length of some extent. For example, when the wall structure 2215 is composed of a plurality of walls, each wall is preferably longer than the gap between the adjacent walls.

Supports 2233 for defining the thickness of the liquid crystal layer 2220 (also called the cell gap) should preferably be formed in the shading region (in the illustrated example, the region defined by the black matrix 2232) to avoid degradation of the display quality due to the supports. Although the supports 2233 are formed on the wall structure 2215 provided in the shading region in the illustrated example, the supports 2233 may be formed on either transparent substrate 2210*a* or 2210*b*. In the case of forming the supports 2233 on the wall structure 2215, setting is made so that the sum of the height of the wall structure 2215 and the height of the supports 2233 is equal to the thickness of the liquid crystal layer 2220. If the supports 2233 are formed in a region having no wall structure 2215, setting is made so that the height of the supports 2233 is equal to the thickness of the liquid crystal layer 2220.

In the LCD device 2200, when a predetermined voltage (voltage equal to or higher than a threshold voltage) is applied between the pixel electrode 2211 and the counter electrode 2231, two axisymmetrically aligned domains with their center axes stabilized in or near the two openings 2214 are formed in the transmission region A, and one axisymmetrically aligned domain is formed in the reflection region B. The electric field distorted with the wall faces of the wall structure 2215 and the wall face effect of the wall structure 2215 mainly define the directions in which liquid crystal molecules in the three adjacent liquid crystal domains (two in the transmission region and one in the reflection region) fall with an electric field. Also, the tilt electric field generated near the four cuts 2233 acts to define the directions in which liquid crystal molecules in the three adjacent liquid crystal domains fall with the electric field. Such alignment regulating forces act cooperatively, to stabilize the axisymmetric alignment of the liquid crystal domains. Moreover, the center axes of the two axisymmetrically aligned liquid crystal domains formed in the transmission region A are fixed in or near the pairs of openings 2214 (each composed of the openings 2214*a* and 2214*b* facing each other) and stabilized. The center axis of the one axisymmetrically aligned liquid crystal domain formed in the reflection region B is stabilized with the opening 2214*a*.

A preferred construction specific to the transflective LCD device 2200 permitting both the transmission-mode display and the reflection-mode display will be described.

While light used for display passes through the liquid crystal layer 2220 once in the transmission-mode display, it passes through the liquid crystal layer 2220 twice in the reflection-mode display. Accordingly, as diagrammatically shown in FIG. 13B, the thickness dt of the liquid crystal layer 2220 in the transmission region A is preferably set roughly double the thickness dr of the liquid crystal layer 2220 in the reflection region B. By setting in this way, the retardation given to the light by the liquid crystal layer 2220 can be roughly the same in both display modes. Most preferably, dr=0.5 dt should be satisfied, but good display is secured in both display modes as long as 0.3 dt<dr<0.7 dt is satisfied. Naturally, dt=dr may be satisfied depending on the use.

In the LCD device 2200, a transparent dielectric layer 2234 is provided on the glass substrate 2210b only in the reflection region B to make the thickness of the liquid crystal layer 2220 in the reflection region B smaller than that in the transmission region A. This construction eliminates the necessity of providing a step by forming an insulating film and the like under the reflective electrode 2211b, and thus has an advantage of simplifying the fabrication of the active matrix substrate 2210a. If the reflective electrode 2211b is formed on such an insulting film provided to give a step for adjusting the thickness of the liquid crystal layer 2220, light used for transmission display will be shaded with the reflective electrode covering a slope (tapered face) of the insulating film, or light reflected from the reflective electrode formed on a slope of the insulating film will repeat internal reflection, failing to be effectively used even for reflection display. By adopting the construction described above, occurrence of such problems is prevented, and thus the light use efficiency can be improved.

If the transparent dielectric layer 2234 is provided with a function of scattering light (diffuse reflection function), white display close to good paper white can be realized without the necessity of providing the reflective electrode 2211b with the diffuse reflection function. Such white display close to paper white can also be realized by making the surface of the reflective electrode 2211b uneven, and in this case, no light scattering function is necessary for the transparent dielectric layer 2234. However, the uneven surface may fail to stabilize the position of the center axis of the axisymmetric alignment depending on the shape of the uneven surface. On the contrary, by combining the transparent dielectric layer 2234 having the light scattering function and the reflective electrode 2211b having a flat surface, the position of the center axis can be stabilized with the opening 2214 formed in the reflective electrode 2211b more reliably. Note that in the case of making the surface of the reflective electrode 2211b uneven to provide the reflective electrode 2211b with the diffuse reflection function, the uneven shape is preferably a continuous wave shape to prevent occurrence of an interference color, and such a shape is preferably set to allow stabilization of the center axis of the axisymmetric alignment.

While light used for display passes through the color filter layer 2230 once in the transmission mode, it passes through the color filter layer 2230 twice in the reflection mode. Accordingly, if the color filter layer 2230 has the same optical density both in the transmission region A and the reflection region B, the color purity and/or the luminance may decrease in the reflection mode. To suppress occurrence of this problem, the optical density of the color filter layer in the reflection region is preferably made lower than that in the transmission region. The optical density as used herein is a characteristic value characterizing the color filter layer. For example, the optical density can be reduced by reducing the thickness of the color filter layer. Otherwise, the optical density can be reduced by reducing the density of a pigment added, for example, while keeping the thickness of the color filter layer unchanged. Forming color filter layers different between the transmission region A and the reflection region B in this way will provide a great effect for improvement of the display color reproducibility.

Figure 14:
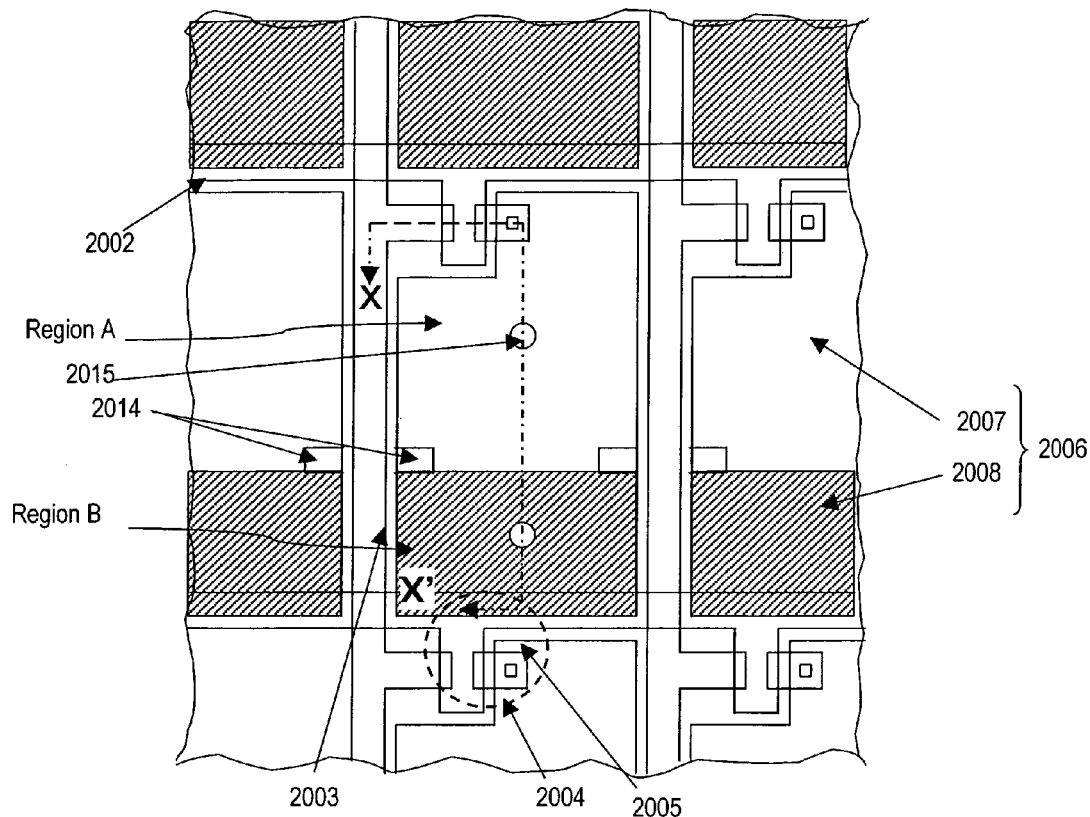
FIG. 14 is a plan view of an active matrix substrate 2210a of the transflective LCD device 2200.
Figure 15:
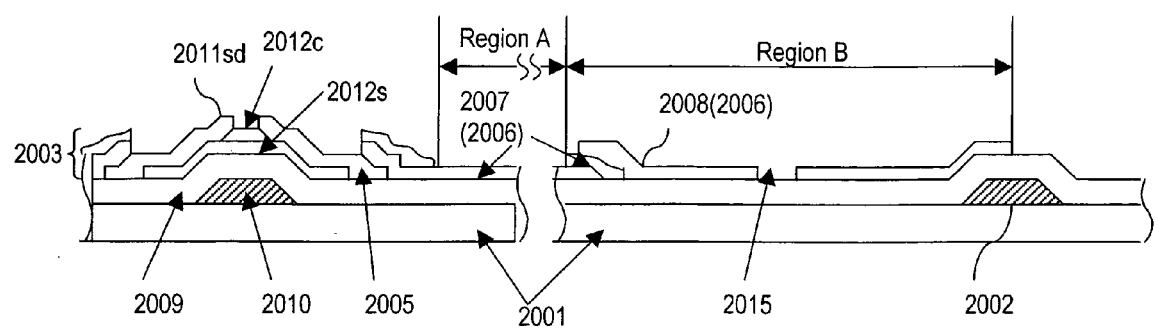
FIG. 15 is a cross-sectional view of the active matrix substrate 2210a of the transflective LCD device 2200.

Next, referring to FIGS. 14 and 15, an example of the structure of an active matrix substrate suitably used for the transflective LCD device will be described. FIG. 14 is a partial enlarged view of the active matrix substrate, and FIG. 15 is a cross-sectional view taken along line X-X' in FIG. 14. The active matrix substrate shown in FIGS. 14 and 15 can be the same in construction as the active matrix substrate shown in FIGS. 13A and 13B, except that one liquid crystal domain is formed in the transmission region A (that is, the numbers of the openings 2214 and the cuts 2213 are reduced).

The active matrix substrate shown in FIGS. 14 and 15 has a transparent substrate 2001 made of a glass substrate, for example. Gate signal lines 2002 and source signal lines 2003 run on the transparent substrate 2001 to cross each other at right angles. TFTs 2004 are formed near the crossings of these signal lines 2002 and 2003. Drain electrodes 2005 of the TFTs 2004 are connected to corresponding pixel electrodes 2006.

Each of the pixel electrodes 2006 includes a transparent electrode 2007 made of a transparent conductive layer such as an ITO layer and a reflective electrode 2008 made of Al and the like. The transparent electrode 2007 defines a transmission region A, and the reflective electrode 2008 defines a reflection region B. Cuts 2014 are formed at predetermined positions of the pixel electrode 2006 for controlling the alignment of the axisymmetrically aligned domains as described above. Also, a wall structure (not shown) is formed in a non-display region outside each pixel (shading region) where signal lines extend, for defining the aligned state of the axisymmetrically aligned domains.

The pixel electrode 2006 overlaps the gate signal line for the next row via a gate insulating film 2009, forming a storage capacitance. The TFT 2004 has a multilayer structure including the gate insulating film 2009, a semiconductor layer 2012, a channel protection layer 2013 and an n$^+$-Si layer 2011 (source/drain electrodes) formed in this order on a gate electrode 2010 branched from the gate signal line 2002.

The illustrated TFT is of a bottom gate type. The TFT is not limited to this type, but a top gate type TFT can also be used.

As described above, in the LCD 2200 having the construction shown in FIGS. 13A and 13B, the center axes of the axisymmetrically aligned liquid crystal domains formed in the transmission region are fixed and stabilized with the openings 2214a formed in the pixel electrode 2211 and the openings 2214b formed in the counter electrode 2231. Also, the center axis of the axisymmetrically aligned liquid crystal domain formed in the reflection region is fixed and stabilized with the opening 2214a formed in the pixel electrode 2211. Therefore, like the LCD 2100, as a result of the fixation of the center axes of the axisymmetrically aligned liquid crystal domains over the entire liquid crystal display panel, the uniformity of the display improves. Also, as a result of the stabilization of the axisymmetric alignment, the response time in grayscale display can be shortened. Moreover, occurrence of an afterimage due to pressing of the liquid crystal display panel can be reduced (the time required to resume from the pressing can be shortened).

Also, in the LCD device 2200, the display brightness and color purity in both the transmission mode and the reflection mode can be improved with the transparent dielectric layer 2234 and/or the color filter layer 2230 constructed in the manner described above. Note that although the opening 2214b was not formed to correspond to the center axis of the axisymmetrically aligned liquid crystal domain formed in the reflection region in the illustrated example, an opening may be formed also in the counter electrode 2231 in the reflection region. In this case, the counter electrode 2231 is preferably formed on the surface of the transparent dielectric layer 2234 facing the liquid crystal layer 2220.

Operation Principle

The reason why the LCD device having a vertically aligned liquid crystal layer of an embodiment in the second aspect of the present invention has excellent wide viewing angle characteristics will be described with reference to FIGS. 16A and 16B.

Figure 16A:
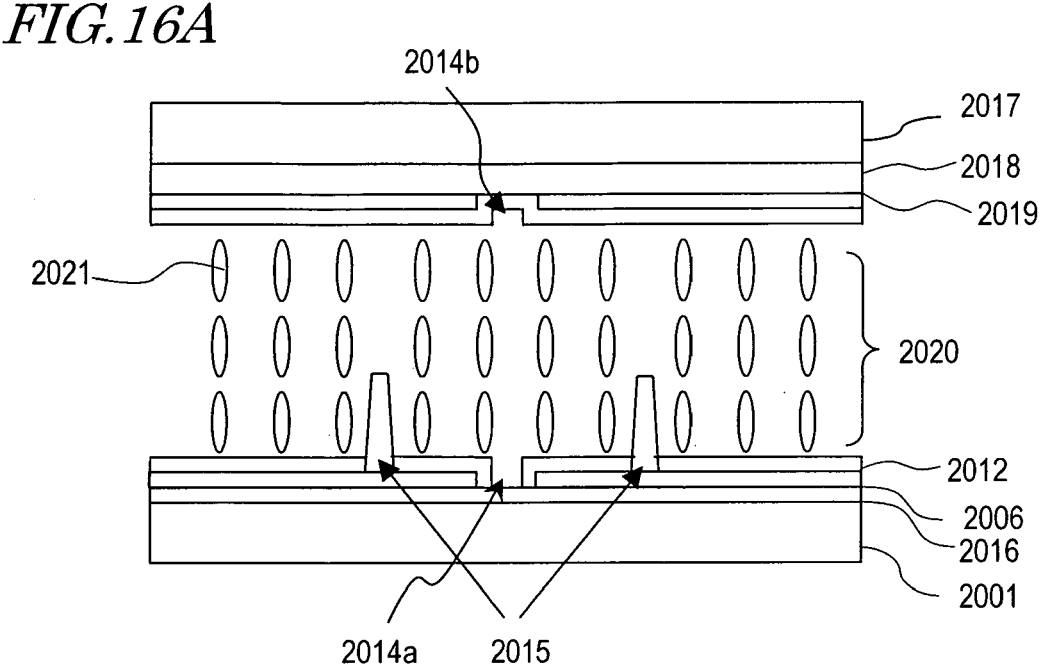
FIGS. 16A and 16B are schematic views for demonstrating the operation principle of the LCD devices according to the second aspect of the present invention, showing the states during non-voltage application (FIG. 16A) and during voltage application (FIG. 16B).
Figure 16B:
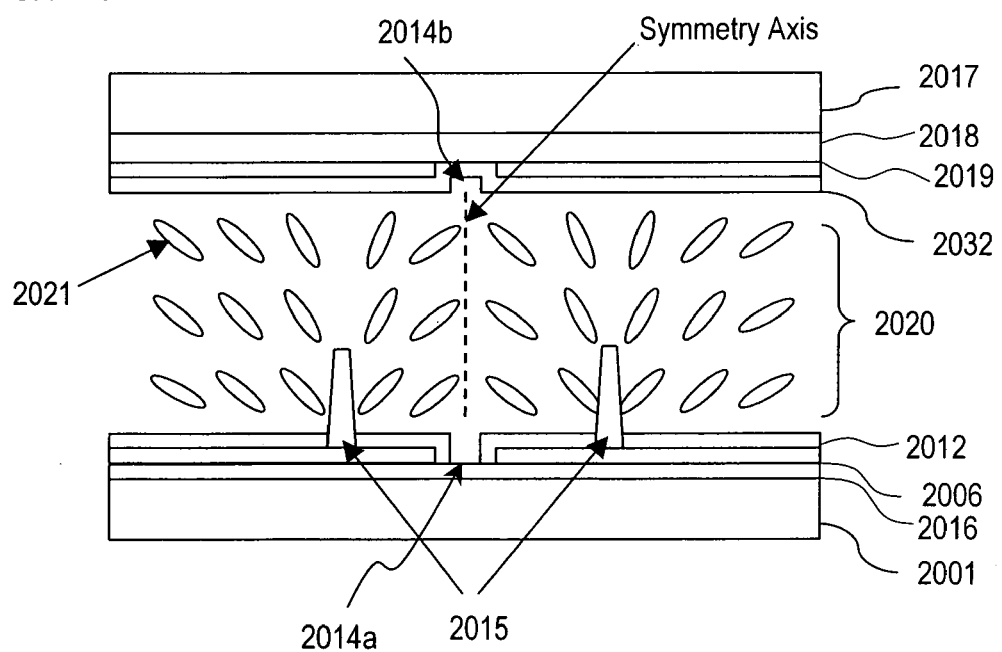

FIGS. 16A and 16B are views for demonstrating how the alignment regulating forces of a wall structure 2015 formed on the active matrix substrate and an opening 2014 formed on the color filter substrate act, in which the aligned states of liquid crystal molecules during non-voltage application (FIG. 16A) and during voltage application (FIG. 16B) are diagrammatically shown. The state shown in FIG. 16B is for display of grayscale level.

The LCD device shown in FIGS. 16A and 16B includes an insulating film 2016, a pixel electrode 2006 having an opening 2014a at a predetermined position, a wall structure 2015 and an alignment film 2012 formed in this order on a transparent substrate 2001. The LCD device also includes a color filter layer 2018, a counter electrode 2019 having an opening 2014b at a predetermined position and an alignment film 2032 formed in this order on another transparent substrate 2017. A liquid crystal layer 2020 interposed between the two substrates includes liquid crystal molecules 2021 having negative dielectric anisotropy.

As shown in FIG. 16A, during non-voltage application, the liquid crystal molecules 2021 are aligned roughly vertical to the substrate surface with the alignment regulating force of the vertical alignment films 2012 and 2032.

As shown in FIG. 16B, during voltage application, the liquid crystal molecules 2021 having negative dielectric anisotropy attempt to make their major axes vertical to electric lines of force, and this causes the directions in which the liquid crystal molecules 2021 fall to be defined with a tilt electric field generated around the pair of openings 2014a and 2014b and distortion in electric field occurring near the side faces (wall faces) of the wall structure 2015 together with the alignment regulating force of the wall structure 2015. In this way, the liquid crystal molecules 2021 are aligned axisymmetrically around the openings 2014a and 2014b as the center. In the resultant axisymmetrically aligned domain, liquid crystal directors point in all directions (directions in the substrate plane), and thus, excellent viewing angle characteristics can be obtained.

Although the action of the tilt electric field generated around the openings 2014a and 2014b and the alignment regulating force of the wall structure 2015 were referred to in the above description, a tilt electric field is also generated around cuts formed at edges of the pixel electrode 2006, and the directions of the tilt of the liquid crystal molecules 2021 are also defined with this tilt electric field.

Hereinafter, referring to FIGS. 17A and 17B, the mechanism with which an opening formed in the pixel electrode and an opening formed in the counter electrode stabilize the center axis of axisymmetric alignment in the LCD device of the embodiment in the second aspect of the present invention will be described.

Figure 17A:
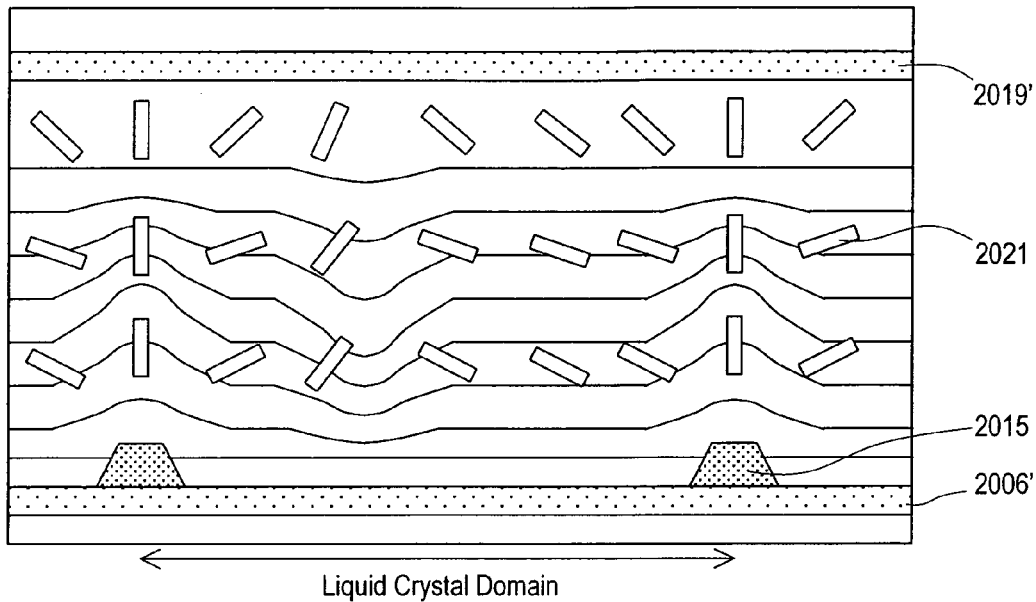
FIGS. 17A and 17B are views diagrammatically illustrating the aligned state of liquid crystal molecules (shown in line segments in FIGS. 17A and 17B) 200 msec after application of a voltage giving a relative transmittance of 10% to a liquid crystal layer, together with equipotential lines of an electric field generated in the liquid crystal layer at that time as obtained by two-dimensional electric field simulation, where
Figure 17B:
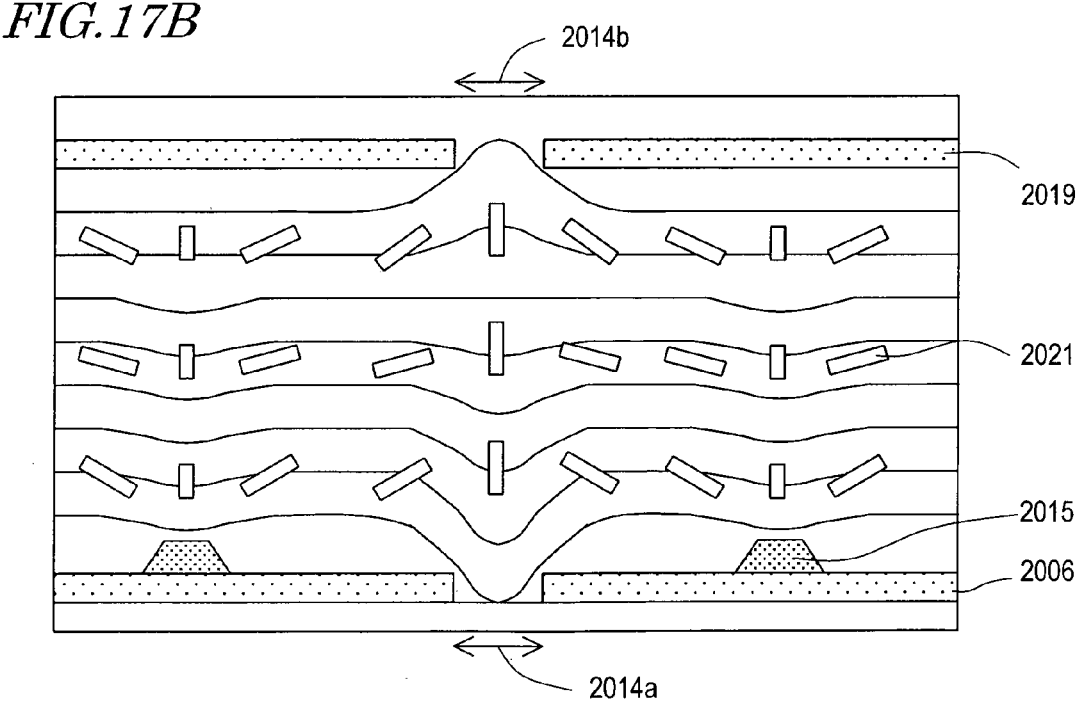

FIGS. 17A and 17B are views diagrammatically illustrating the aligned state of liquid crystal molecules (shown as line segments in FIGS. 17A and 17B) 200 msec after application of a voltage that gives a relative transmittance of 10% to a liquid crystal layer (3V in this case), together with equipotential lines of an electric field generated in the liquid crystal layer at that time as obtained by a two-dimensional electric field simulation, where FIG. 17A shows the case of providing no opening in a pixel electrode 2006' nor in a counter electrode 2019' and FIG. 17B shows the case of providing an opening 2014a in a pixel electrode 2006 and an opening 2014b in a counter electrode 2006. FIG. 17B corresponds to a cross-sectional view taken along line 17B-17B' in FIG. 12A and FIG. 13A. In the illustrated example, the thickness of the liquid crystal layer is 4.0 μm, the dielectric constant of the liquid crystal material is −4.5, the refractive indexes no=1.485 and ne=1.495, the height of the wall structure is 0.5 μm, and the pixel pitch is 50 μm×16 μm.

As shown in FIG. 17A, in which the pixel electrode 2006' and the counter electrode 2019' have no opening, the position of the center axis of the axisymmetric alignment of liquid crystal molecules 2021 may not be fixed effectively at a fixed position, failing to be formed in the center between the walls of the wall structure 2015. By forming the openings 2014a and 2014b so as to face each other near the center between the walls of the wall structure 2015 as shown in FIG. 17B, the center axis of the axisymmetric alignment of the liquid crystal molecules 2021 is fixed in the pair of openings 2014a and 2014b and thus stabilized. The liquid crystal molecules 2021 located near the center of the pair of openings 2014a and 2014b are aligned vertically serving as the center axis of the axisymmetric alignment. This occurs due to the action of a tilt electric field that is generated because the equipotential lines are attracted into the openings 2014a and 2014b formed in the pixel electrode 2006 and the counter electrode 2019. The liquid crystal molecules 2021, staying roughly uniformly in their vertically aligned state immediately after the voltage application, gradually shift to axisymmetric alignment with time with the center axis thereof being positioned in the center of the openings 2014a and 2014b, and thus are fixed/stabilized.

The relationship between the electric field at the openings 2014a and 2014b formed in the pixel electrode 2006 and the counter electrode 2019 and the alignment behavior of the liquid crystal molecules 2021 was analyzed in detail. From the results of the analysis, it was found that the liquid crystal molecules 2021 located in the center of each of the openings 2014a and 2014b were immobilized when the potential Va' (as obtained in the above electric field simulation, for example) at the center of each of the openings 2014a and 2014b was lower than the threshold voltage Vth of the liquid crystal layer. That is, if the potential Va' at the center of each of the openings 2014a and 2014b is lower than the threshold voltage Vth (Va'<Vth), the liquid crystal molecules are kept in their initial vertically aligned state irrespective of the application of the voltage across the liquid crystal layer, and thus the molecular axes uniformly keep standing vertically. On the contrary, if the potential Va' at the center of each of the openings 2014a and 2014b is higher than the threshold voltage Vth (Va'>Vth) during voltage application, the liquid crystal molecules are aligned along the equipotential lines (for a liquid crystal material having negative dielectric anisotropy) under the influence of the electric field. The liquid crystal molecules are therefore tilted, and this makes it difficult to fix the axis position effectively. Thus, since the axis position is no more uniform and the relaxation response time at a change in grayscale voltage increases, the roughness of display increases and the response time is delayed, causing the afterimage phenomenon and the like to become noticeable easily. To ensure sufficient stabilization of the axisymmetric alignment in a grayscale level, it is preferred to set the size of the opening so that the potential at the center of the opening is lower than the threshold voltage of the liquid crystal layer when a voltage giving a relative transmittance of 10% is applied, for example.

The shape of the opening is preferably circular although not limited to this. To exert roughly equal alignment regulating force in all directions, the shape is preferably a polygon having four or more sides and also preferably a regular polygon. The size Wh' of the openings 2014a and 2014b preferably satisfies the condition 1 µm≦Wh'≦18 µm. The size Wh' of the openings 2014a and 2014b is expressed by the diameter when the opening is a circle, or by the length of the longest diagonal line when it is a polygon.

The reason why the size Wh' of the opening should preferably satisfy the conditions 1 µm≦Wh'≦18 µm will be described with reference to FIGS. 18 and 19. Note that circular openings were used in the following examination, and that the liquid crystal layer and the liquid crystal material described above with reference to FIGS. 17A and 17B were also used in this case.

Figure 18:
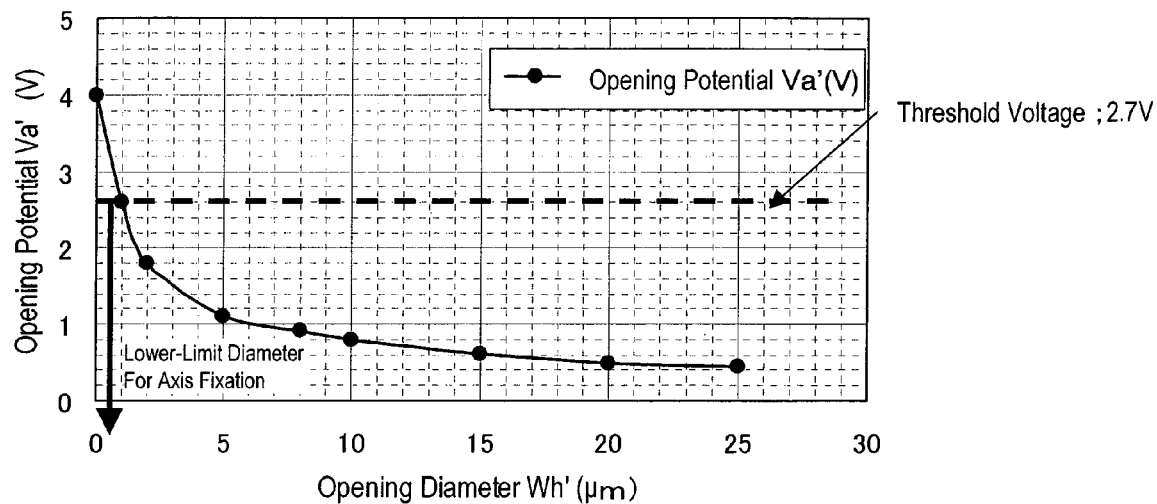
FIG. 18 is a graph showing the relationship between the opening diameter Wh and the opening potential Va during application of 3V (grayscale voltage) in an LCD device of an embodiment in the second aspect of the present invention.

FIG. 18 is a graph showing the relationship between the diameter Wh' of the opening (opening diameter Wh') and the potential Va' at the opening (opening potential Va') during application of 3V. FIG. 19 is a graph showing the relationship between the diameter Lh' of a region in the opening giving a relative transmittance of 0% during application of 3V, that is, the diameter of a region in which liquid crystal molecules are aligned vertically (vertically aligned region diameter Lh') and the opening diameter Wh'. This shows the case that the pair of openings, superposed one on the other, have the same size Wh'.

As is found from FIG. 18, with increase of the opening diameter Wh', the opening potential Va' monotonously decreases. With the threshold voltage Vth of the liquid crystal layer being 2.7V, the lower limit of the range of preferred opening diameters Wh is 1 µm. In this examination, the threshold voltage of the liquid crystal layer was defined as the lowest voltage value with which the relative transmittance of the liquid crystal layer showed any change from the state of 0% in the voltage-transmittance characteristics computed in an optical simulation conducted based on the construction of the liquid crystal panel described above. The results of the simulation were verified with evaluation of the actual panel.

Figure 19:
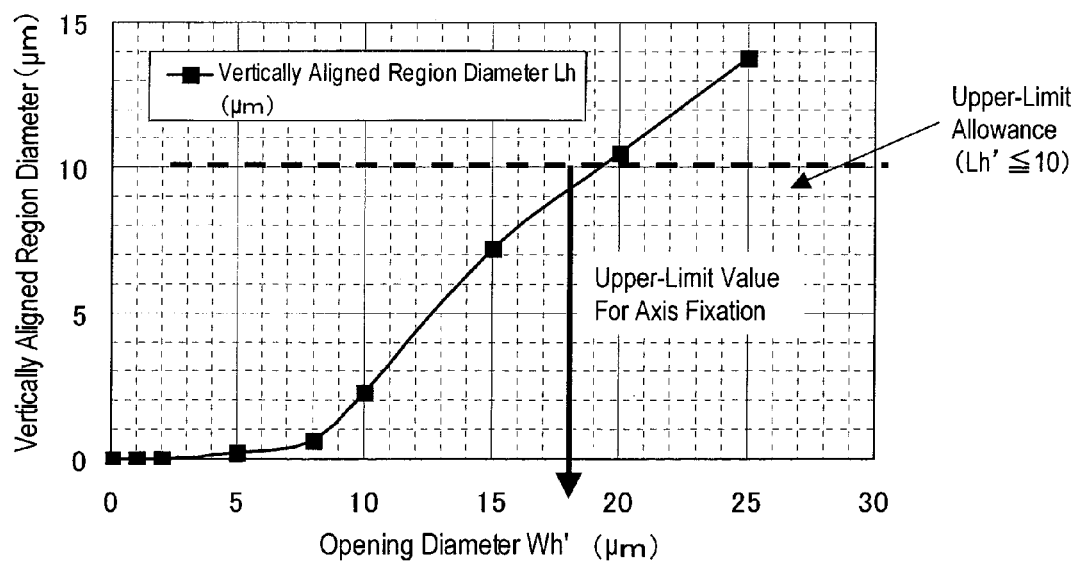
FIG. 19 is a graph showing the relationship between the diameter (vertically aligned region diameter) Lh of a region in an opening giving a relative transmittance of 0% during application of 3V and the opening diameter Wh in an LCD device of an embodiment in the second aspect of the present invention.

As is found from FIG. 19, with increase of the opening diameter Wh', the vertically aligned region diameter Lh' monotonously increases. Since the transmittance decreases with increase of the size of the vertically aligned region, the vertically aligned region should preferably be small from the standpoint of the transmittance. Assuming that the size of a sub-pixel providing one liquid crystal domain is about 500 µm$^2$ (the size of one pixel is 50 µm×16 µm, and the size of the region providing one liquid crystal domain (sub-pixel) is 33 µm×16 µm), the effective aperture ratio will decrease by about 15% if the vertically aligned region diameter Lh' exceeds 10 µm. To ensure sufficient display brightness, therefore, the opening diameter Wh' is preferably 18 µm or less. Further, to enhance the function of stabilizing the axisymmetric alignment, the opening diameter Wh' is preferably 3 µm or more. To suppress decrease in transmittance, the opening diameter Wh' is more preferably 13 µm or less. Note that the diameter of the region giving a relative transmittance of 0% (vertically aligned region) refers to the diameter of a region, near the opening, in which liquid crystal directors are fixed to point in the vertical direction even during application of a voltage for driving the liquid crystal layer, permitting no passing of light (exhibiting black display with substantially no occurrence of birefringence), as obtained in a two-dimensional electric field (optical) simulation.

Specific characteristics of the transflective LCD device of the embodiment in the second aspect of the present invention will be described as follows.

An LCD device having the construction shown in FIG. 9 was fabricated. As the liquid crystal cell 1050, one having the same construction as that of the LCD device 2200 shown in FIGS. 13A and 13B was used. In the counter electrode on the counter substrate, formed was an opening having a diameter of 8 µm for fixing the center axis of an axisymmetrically aligned domain at a predetermined position in each of the transmission region and the reflection region. A transparent dielectric layer having no light scattering function was formed on the color filter substrate as the transparent dielectric layer 2234, and a resin layer having a continuous uneven surface was formed under the reflective electrode 211b, to thereby adjust the diffuse reflection characteristics in the reflection display.

The vertical alignment films were formed by a known method using a known alignment film material. No rubbing was made. A liquid crystal material having negative dielectric anisotropy (Δn: 0.1 and Δ∈: −4.5) was used. In this example, the thicknesses dt and dr of the liquid crystal layer in the transmission region and the reflection region were set at 4 µm and 2.2 µm, respectively (dr=0.55 dt).

The LCD device of this example had a multilayer structure composed of a polarizing plate (observer side), a quarter wave plate (phase plate 1), a phase plate having negative optical anisotropy (phase plate 2 (NR plate)), the liquid crystal layer (on the upper and lower sides thereof, the color filter substrate and the active matrix substrate were respectively placed), a phase plate having negative optical anisotropy (phase plate 3 (NR plate)), a quarter wave plate (phase plate 4), and a polarizing plate (backlight side) in the order from the observer side. The upper and lower quarter wave plates (phase plates 1 and 4) were placed so that the slower axes thereof were orthogonal to each other, and had a phase difference of 140 nm. The phase plates having negative optical anisotropy (phase plates 2 and 3) had a phase difference of 135 nm. The two polarizing plates were placed so that the absorption axes thereof were orthogonal to each other.

A drive signal was applied to the thus-obtained LCD device (4V was applied across the liquid crystal layer) to evaluate the display characteristics.

The results of the characteristics were substantially the same as those shown in FIG. 11. The viewing angle characteristics in the transparent display were roughly symmetric in all directions, the range CR>10 was as large as up to ±80°, and the transmission contrast was as high as 300:1 or more at the front.

As for the characteristics of the reflection display, the reflectance evaluated with a spectral calorimeter (CM2002 from Minolta Co., Ltd.) was about 8.3% (value in terms of the aperture ratio of 100%) with respect to a standard diffuse plate as the reference. The contrast value of the reflection display was 21, which was high compared with the case of the conventional LCD devices.

No roughness of display was observed in visual evaluation in a slanting direction in a grayscale level (level 2 in the eight levels of grayscale). On the contrary, for an LCD device fabricated under the same conditions except that no opening was formed in the pixel electrode nor in the counter electrode for comparison, roughness of display in a slanting direction was eminent in a grayscale level. In observation with an optical microscope with polarizing axes set orthogonal to each other, axisymmetrically aligned domains with their center axes aligned uniformly were recognized for the LCD device having openings. For the latter LCD device having no opening, however, the center axes of some liquid crystal domains deviated from the centers of the sub-pixels, and it was confirmed that this variation in center axis position was a main cause of the roughness of display.

The grayscale response time (time required for a change from level 3 to level 5 in the eight levels of grayscale) was 38 msec for the LCD device having pairs of openings formed in the pixel electrode and the counter electrode, and was 60 msec for the LCD device having no opening. It was therefore confirmed that the response time in a grayscale display could be shortened by providing openings in the pixel electrode and the counter electrode. As for the recovery of the alignment after the display panel was pressed with a finger during application of 4V (white display), an afterimage was hardly observed on the pressed portion (the alignment was immediately recovered from distortion) for the LCD device having openings. On the contrary, an afterimage was observed for several minutes for the LCD device having no opening. A difference was therefore recognized in the recovery of the alignment from distortion due to pressing. In this example, the reduction of the front transmittance in the transmission mode display was only about 2% compared with the case of having no openings at all. The reduction in brightness was of an insignificant level.

Thus, with the formation of the pair of openings facing each other in the pixel electrode and the counter electrode, obtained were the effects such as fixing/stabilizing the positions of the center axes of the axisymmetrically aligned domains, reducing the roughness of display in grayscale display when viewed in a slanting direction, improving the response speed in grayscale display, and reducing occurrence of an afterimage due to pressing of the display panel.

Next, an LCD device of an embodiment in the third aspect of the present invention will be described, which includes: a first substrate (for example, a TFT-mounted glass substrate); a second substrate (for example, a color filter-mounted glass substrate) placed to face the first substrate; a liquid crystal layer (for example, a vertically aligned liquid crystal layer) interposed between these substrates; first electrodes (for example, pixel electrodes) formed on the first substrate; a second electrode (for example, a counter electrode) formed on the second substrate; and an interlayer insulating film formed between the first electrodes and the first substrate. The interlayer insulting film has at least one depression for each pixel formed thereon regularly. A depression following each depression of the interlayer insulating film is therefore formed on the surface of the resultant first substrate facing the liquid crystal layer, and, with this depression, the directions in which liquid crystal molecules tilt with an electric field is defined. Depending on the shape and placement of the depressions, it is possible to form a plurality of regions in which liquid crystal molecules tilt in different directions with an electric field in one pixel. In this embodiment, described will be the case that each liquid crystal domain includes liquid crystal molecules tilting in different directions with an electric field, forming an axisymmetrically aligned domain. Alternatively, the depressions may be placed to form a plurality of domains in which liquid crystal molecules tilt in the same direction within each domain and the tilt directions are different among the domains (preferably, to form four domains different in tilt direction by 90° each).

According to the present invention, an LCD device permitting high-contrast display and a wide viewing angle can be attained particularly when a vertically aligned liquid crystal layer is used and a plurality of axisymmetrically aligned domains are formed in each pixel. Therefore, in the following description, an LCD device using a vertically aligned liquid crystal layer (a VA mode LCD device) is exemplified. It should however be noted that the present invention is not limited to this but is applicable to any LCD devices in which at least one liquid crystal domain including liquid crystal molecules aligned in different directions is formed in each pixel at least when a predetermined voltage is applied. From the standpoint of the viewing angle characteristics, it is preferred to have a liquid crystal domain including liquid crystal molecules aligned in four or more different directions. In the following description, an axisymmetrically aligned domain is exemplified.

In the following embodiment, a transmissive LCD device and a transflective LCD device are described as examples. Note however that the present invention is also applicable to a reflective display device.

Hereinafter, LCD devices of embodiments in the third aspect of the present invention will be described concretely with reference to the relevant drawings.

Transmissive LCD Device

Figure 20A:
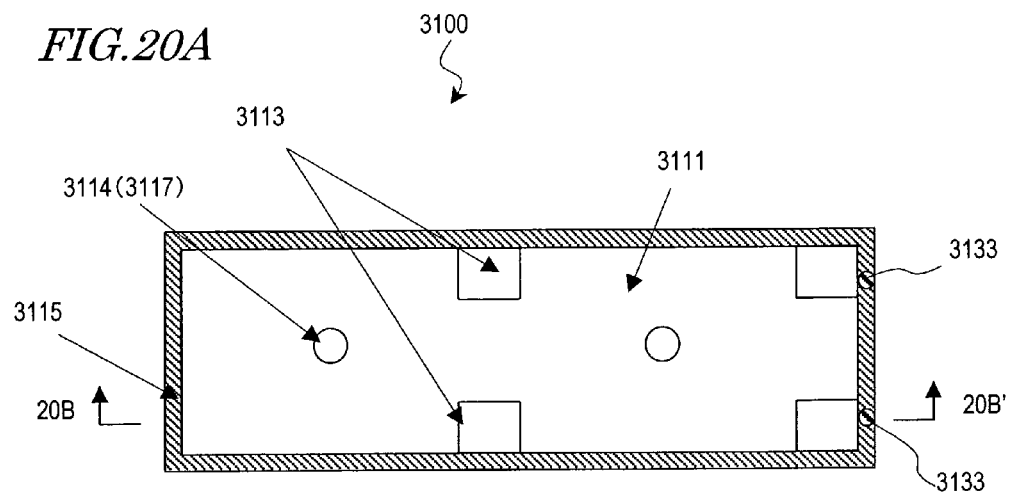
Figure 20B:
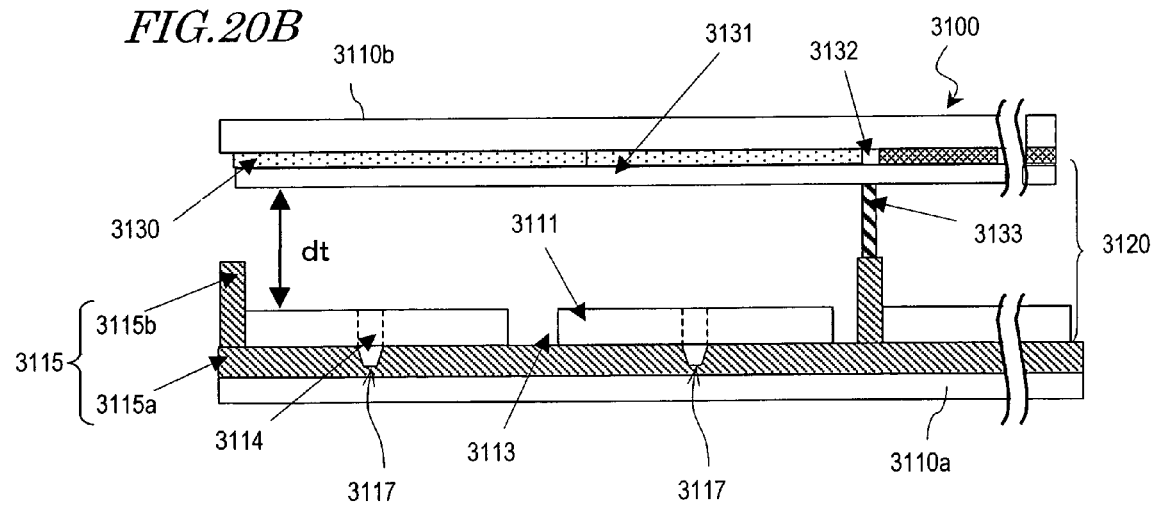

A transmissive LCD device 3100 of Embodiment 1 of the present invention will be described with reference to FIGS. 20A and 20B. FIGS. 20A and 20B diagrammatically show one pixel of the transmissive LCD device 3100, in which FIG. 20A is a plan view and FIG. 20B is a cross-sectional view taken along line 20B-20B' in FIG. 20A.

Hereinafter, described will be the case that one pixel is divided into two parts (N=2). The number of parts into which one pixel is divided (=N) can also be three or more depending on the pixel pitch. The effective aperture ratio tends to decrease with increase of the number of divided parts (=N). Therefore, for an application to a high-definition display panel, the number of divided parts (=N) is preferably made small. The present invention is also applicable to the case involving no pixel division (this may be expressed as N=1). Each of the divided regions may be called a "sub-pixel". One axisymmetrically aligned domain is typically formed in each sub-pixel.

The LCD device 3100 includes a transparent substrate (for example, a glass substrate) 3110*a*, a transparent substrate 3110*b* placed to face the transparent substrate 3110*a*, and a vertically aligned liquid crystal layer 3120 interposed between the transparent substrates 3110*a* and 3110*b*. Vertical alignment films (not shown) are formed on the surfaces of the substrates 3110*a* and 3110*b* facing the liquid crystal layer 3120. During non-voltage application, therefore, liquid crystal molecules in the liquid crystal layer 3120 are aligned roughly vertical to the surfaces of the vertical alignment films. The liquid crystal layer 3120 includes a nematic liquid crystal material having negative dielectric anisotropy and also includes a chiral agent as required.

The LCD device 3100 further includes pixel electrodes 3111 formed on the transparent substrate 3110*a*, an interlayer insulating film 3115a formed between the transparent substrate 3110a and the pixel electrodes 3111, and a counter electrode 3131 formed on the transparent substrate 3110b. Each pixel electrode 3111, the counter electrode 3131 and the liquid crystal layer 3120 interposed between these electrodes define a pixel. In the illustrated example, both the pixel electrodes 3111 and the counter electrode 3131 are formed of a transparent conductive layer (for example, an ITO layer). Typically, color filters 3130 (the entire of the plurality of color filters may also be called a color filter layer 3130) provided for the respective pixels, as well as a black matrix (shading layer) 3132 formed in the gaps between the adjacent color filters 3130, are formed on the surface of the transparent substrate 3110b facing the liquid crystal layer 3120, and the counter electrode 3131 is formed on the color filters 3130 and the black matrix 3132. Alternatively, the color filters 3130 and the black matrix 3132 may be formed on the counter electrode 3131 (on the surface thereof facing the liquid crystal layer 3120).

The interlayer insulating film 3115a has depressions 3117 formed at predetermined positions inside the pixels. Each depression 3117 allows for formation of a depression on the surface facing the liquid crystal layer, so that the center axis of axisymmetric alignment of liquid crystal molecules in the liquid crystal layer can be fixed/stabilized with the effect of existence of the depression. In the illustrated example, the pixel electrode 3111 has an opening 3114 at the position corresponding to the depression 3117 so that the depression 3117 is located inside the opening 3114. A tilt electric field is generated around the opening 3114 of the pixel electrode 3111 during voltage application, which acts to fix/stabilize the center axis of the axisymmetric alignment together with the effect of existence of the depression 3117. If such an opening 3114 is not formed, a depression corresponding to the depression 3117 will be formed on the surface of the pixel electrode 3111 (and further on the surface of an alignment film formed thereon) facing the liquid crystal layer.

The LCD device 3100 has a shading region around each pixel, and a wall structure 3115b extends on the transparent substrate 3110a in the shading region. The wall structure 3115b is formed integrally with an interlayer insulating film 3115a covering circuit elements (including not only active elements such as switching elements but also interconnections and electrodes; not shown in FIGS. 20A and 20B) formed on the transparent substrate 3110a. In a transmissive LCD device having TFTs as circuit elements, for example, providing an interlayer insulating film permits overlap formation of pixel electrodes 3111 with gate signal lines and/or source signal lines, as will be described later, and this improves the aperture ratio.

The shading region as used herein refers to a region shaded from light due to the presence of TFTs, gate signal lines and source signal lines formed on the peripheries of the pixel electrodes 3111 on the transparent substrate 3110a, or the presence of the black matrix formed on the transparent substrate 3110b, for example. Since this region does not contribute to display, the wall structure 3115b formed in the shading region is free from adversely affecting the display.

The illustrated wall structure 3115b is a continuous wall surrounding the pixel. Alternatively, the wall structure 3115b may be composed of a plurality of separate walls. The wall structure 3115b, which serves to define boundaries of liquid crystal domains located near the outer edges of the pixel, should preferably have a length of some extent. For example, when the wall structure is composed of a plurality of walls, each wall is preferably longer than the gap between the adjacent walls.

The illustrated pixel electrode 3111 has two openings 3114, formed to correspond to the depressions 3117, and four cuts 3113. When a predetermined voltage is applied across the liquid crystal layer, two liquid crystal domains each having axisymmetric alignment are formed, with the center axes of the axisymmetric alignment being in or near the depressions 3117 formed on the interlayer insulating film 3115a. As will be described later, the depressions 3117 (and the openings 3114 of the pixel electrode 3111) act to fix the positions of the center axes of the axisymmetric alignment. The cuts 3113, provided near the boundaries of the axisymmetrically aligned domains, define the directions in which liquid crystal molecules fall with an electric field, and thus act to form the axisymmetrically aligned domains. A tilt electric field is generated around the cuts 3113 with the application of a voltage between the pixel electrode 3111 and the counter electrode 3113. With this tilt electric field, the directions of tilt of liquid crystal molecules are defined, to enable the action described above. In the illustrated example, a total of four cuts 3113 are given point-symmetrically with respect to the depression 3117 corresponding to the center axis of a liquid crystal domain formed in the pixel (in this case, the right depression as viewed from FIG. 20A) (in this case, the entire pixel is a transmission region).

By providing the cuts 3113 as described above, the directions in which liquid crystal molecules fall during voltage application are defined, allowing formation of two liquid crystal domains. The reason why no cuts are provided on the left side of the pixel electrode 3111 as viewed from FIG. 20A is that substantially the same function is obtained from cuts provided on the right side of the adjacent pixel electrode (not shown) located left to the illustrated pixel electrode 3111, and thus cuts, which may decrease the effective aperture ratio of the pixel, are omitted on the left side of the pixel electrode 3111. Also, in the illustrated example, the wall structure 3115b described above gives the alignment regulating force. Therefore, with no cuts provided on the left side of the pixel electrode 3111, the resultant liquid crystal domain is as stable as a liquid crystal domain having such cuts. Although a total of four cuts 3113 were formed in the illustrated example, at least one cut between the adjacent liquid crystal domains is sufficient. For example, an elongate cut may be formed in the center of the pixel and the other cuts may be omitted.

The shape of the depression 3117 formed roughly in the center of each sub-pixel (liquid crystal domain) to fix the center axes of the axisymmetrically aligned domain is preferably circular as illustrated although not limited to this. To exert roughly equal alignment regulating force in all directions, the shape is preferably a polygon having four or more sides and also preferably a regular polygon. When the opening 3114 is formed in the pixel electrode 3111 to correspond to the depression 3117, the shape of the opening 3114 is preferably designed in the same manner and is preferably the same. In the illustrated example, both the opening 3114 and the depression 3117 have the shape of a circle.

The wall structure 3115b, which is integral with the interlayer insulating film 3115a having the depression 3117, can be formed in a series of steps of forming a photosensitive resin film, exposing the film to light and developing the resultant film. Specifically, for example, in the exposure/development steps, in which a photosensitive resin film (preferably, a positive photosensitive resin film) is formed to cover circuit elements such as switching elements (for example, TFTS), and contact holes (for connecting pixel electrodes to circuit elements (for example, electrodes (connection electrodes) connected to drain electrodes of TFTs) are formed in the photosensitive resin film, the wall structure 3115b can be formed by changing the exposure amount with regions (in some cases, no exposure is made selectively). For example, when a positive photosensitive resin film is used, regions thereof subjected to no exposure may be used as the wall structure 3115b, completely exposed regions may be used as contact holes, and intermediately exposed regions may be used as the depressions 3117. In the illustrated example, the pixel electrodes 3111 are formed on the regions of the photosensitive resin film less exposed to light than the regions used as the depressions 3117, and as a result, the depressions 3117 are exposed inside the openings 3114 of the pixel electrodes 3111.

Supports 3133 for defining the thickness of the liquid crystal layer 3120 (also called the cell gap) are preferably formed in the shading region (in the illustrated example, the region defined by the black matrix 3132) to avoid degradation in display quality due to the supports. Although the supports 3133 are formed on the wall structure 3115b provided in the shading region in the illustrated example, the supports 3133 may be formed on either transparent substrate 3110a or 3110b. In the case of forming the supports 3133 on the wall structure 3115b, setting is made so that the sum of the height of the wall structure 3115b and the height of the supports 3133 is equal to the thickness of the liquid crystal layer 3120. If the supports 3133 are formed in a region having no wall structure 3115b, setting is made so that the height of the supports 3133 is equal to the thickness of the liquid crystal layer 3120. The supports 3133 can be formed by photolithography using a photosensitive resin, for example.

In the LCD device 3100, when a predetermined voltage (voltage equal to or higher than a threshold voltage) is applied between the pixel electrode 3111 and the counter electrode 3131, two axisymmetrically aligned domains with their center axes stabilized in or near the depressions 3117 formed roughly in the center of the sub-pixels (axisymmetrically aligned domains) (and the openings 3114) are formed. The pair of cuts 3113 provided in the center portion of the pixel electrode 3111 in the length direction define the directions in which liquid crystal molecules in the two liquid crystal domains fall with an electric field, while the wall structure 3115b and the cuts 3133 provided at corners of the pixel electrode 3111 define the directions in which liquid crystal molecules in the portions of the liquid crystal domains located near the outer edges of the pixel fall with the electric field. The alignment regulating forces of the wall structure 3115b, the depressions 3117 (and the openings 3114) and the cuts 3113 are considered to act cooperatively to stabilize the alignment of the liquid crystal domains.

On the surface of the transparent substrate 3110a facing the liquid crystal layer 3120, provided are active elements such as TFTs and circuit elements such as gate signal lines and source signal lines connected to TFTs (all of these elements are not shown). Herein, the transparent substrate 3110a, together with the circuit elements and the pixel electrodes 3111, the wall structure 3115b, the supports 3133, the alignment film and the like described above formed on the transparent substrate 3110a, are collectively called an active matrix substrate in some cases. Likewise, the transparent substrate 3110b, together with the color filter layer 3130, the black matrix 3132, the counter electrode 3131, the alignment film and the like formed on the transparent substrate 3110b, are collectively called a counter substrate or a color filter substrate in some cases.

Although omitted in the above description, the LCD device 3100 further includes a pair of polarizing plates placed to face each other via the transparent substrates 3110a and 3110b. The polarizing plates are typically placed so that their transmission axes are orthogonal to each other. The LCD device 3100 may further include a biaxial optical anisotropic medium layer and/or a uniaxial optical anisotropic medium layer, as will be described later.

Figure 21A:
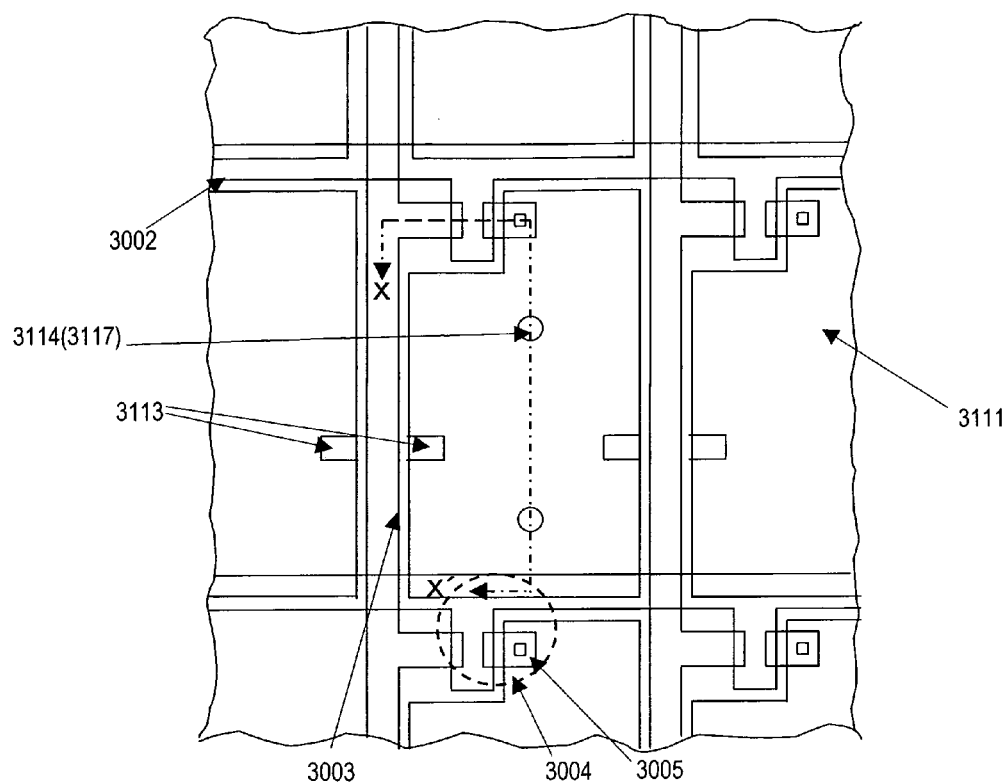
FIG. 21A is a plan view diagrammatically showing an active matrix substrate of a transmissive LCD device of an embodiment in the third aspect of the present invention.
Figure 21B:
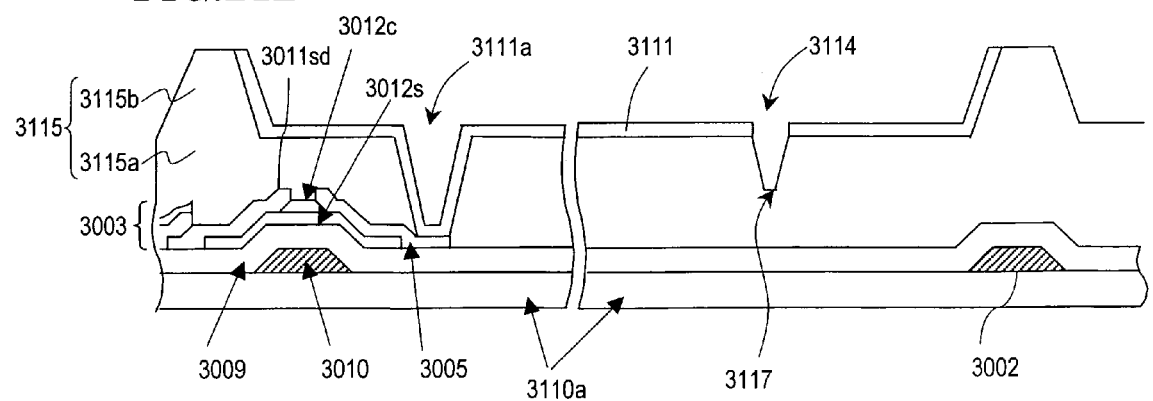
FIG. 21B is a cross-sectional view diagrammatically showing the active matrix substrate shown in FIG. 21A.

Next, referring to FIGS. 21A and 21B, an example of the structure of an active matrix substrate suitably used for the transmissive LCD device 3100 will be described. FIG. 21A is a partial enlarged view of the active matrix substrate, and FIG. 21B is a cross-sectional view taken along line X-X' in FIG. 21A. The active matrix substrate shown in FIGS. 21A and 21B can be the same in construction as the active matrix substrate shown in FIGS. 20A and 20B, except that the number of the cuts 3113 is small.

The active matrix substrate shown in FIGS. 21A and 21B has a transparent substrate 3110a made of a glass substrate, for example. Gate signal lines 3002 and source signal lines 3003 run on the transparent substrate 3110a to cross each other at right angles. TFTs 3004 are formed near the crossings of these signal lines 3002 and 3003. Drain electrodes 3005 of the TFTs 3004 are connected to corresponding pixel electrodes 3111.

The active matrix substrate has an interlayer insulating film 3115a covering the gate signal lines 3002, the source signal lines 3003 and the TFTs 3004. Depressions 3117 are formed on the interlayer insulating film 3115a so as to be located roughly in the center of axisymmetrically aligned domains formed in the pixels. A wall structure 3115b is formed integrally with the interlayer insulating film 3115a to surround each pixel. Therefore, the interlayer insulating film 3115a and the wall structure 3115b can be formed of a single photosensitive resin film 3115 in a series of process steps, and thus can be fabricated in a simple process.

The pixel electrodes 3111, which are transparent electrodes formed of a transparent conductive layer such as an ITO layer, are formed on the interlayer insulating film 3115a. Each pixel electrode 3111 is connected, at a contact portion 3111a thereof in a contact hole formed in the interlayer insulating film 3115a, to the corresponding drain electrode 3005. Cuts 3113 and openings 3114 are formed at predetermined positions of the pixel electrode 3111 for control of the alignment of axisymmetrically aligned domains as described above. Inside the openings 3114, the depressions 3117 are exposed.

The pixel electrode 3111 overlaps the gate signal line for the next row via a gate insulating film 3009. Each TFT 3004 has a multilayer structure including the gate insulating film 3009, a semiconductor layer 3012s, a channel protection layer 3012c and an n$^+$-Si layer 3011sd (source/drain electrodes) formed in this order on a gate electrode 3010 branched from the gate signal line 3002.

The illustrated TFT is of a bottom gate type. The TFT is not limited to this type, but a top gate type TFT may also be used. Any switching elements other than the TFT (for example, MIM) may be used.

Figure 22:
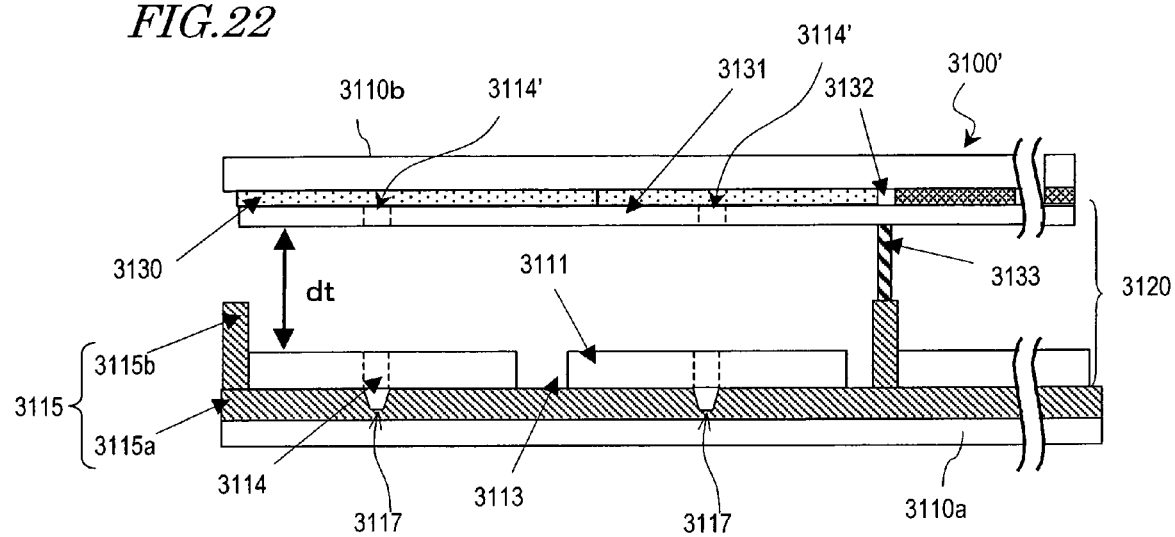
FIG. 22 is a cross-sectional view diagrammatically showing another transmissive LCD device 3100' of an embodiment in the third aspect of the present invention.

In the LCD 3100, the depressions 3117 are formed on the interlayer insulating film 115a on the transparent substrate 110a, and also the wall structure 3115a is formed integrally with the interlayer insulating film 3115. Moreover, the openings 3114 and the cuts 3113 are formed in the pixel electrodes 3111 formed on the interlayer insulating film 3115a. That is, the entire alignment regulating structure for formation of the axisymmetrically aligned domains is formed on the transparent substrate 3110a, with no alignment regulating structure being provided on the counter substrate 3110b. This embodiment is therefore advantageous in that stable axisymmetrically aligned domains can be formed with such a simple construction. Alternatively, the counter substrate 3110b may also be provided with an alignment regulating structure, as in an LCD device 3100' shown in FIG. 22, for example. With this construction, the alignment of liquid crystal molecules can be further stabilized.

The LCD device 3100' is substantially the same in construction as the LCD device 3100, except that the counter electrode 3131 has openings 3114'. Therefore, the common components are denoted by the same reference numerals, and the description thereof is omitted here.

In the LCD 3100', the openings 3114' formed in the counter electrode 3131 are located at positions roughly coinciding the depressions 3117 and the openings 3114 formed in the pixel electrodes 3111 as viewed from the normal to the substrate plane, and thus the plan view of the LCD device 3100' is substantially the same as FIG. 20A. Each of the thus-formed openings 3114' acts to fix/stabilize the center axis of axisymmetric alignment together with the corresponding depression 3117 and opening 3114 formed in the pixel electrode 3111. As a result, the alignment of the axisymmetrically aligned domains is further stabilized.

It is preferred not to provide a structural alignment regulating means such as a wall structure on the counter substrate 3110b. Unlike the openings and the cuts formed in the electrodes, formation of a wall structure and the like disadvantageously increases the fabrication steps and thus increases the cost. The cuts 3113 are provided to define the directions in which liquid crystal molecules fall with an electric field cooperatively with the anchoring action of the side faces of the wall structure, unlike the depressions acting to fix the center axes. Therefore, the cuts 3113 are preferably provided only on the substrate 3110a on which the wall structure 3115b is placed.

Transflective LCD Device

Next, a transflective LCD device 3200 of an embodiment in the third aspect of the present invention will be described with reference to FIGS. 23A and 23B.

Figure 23A:
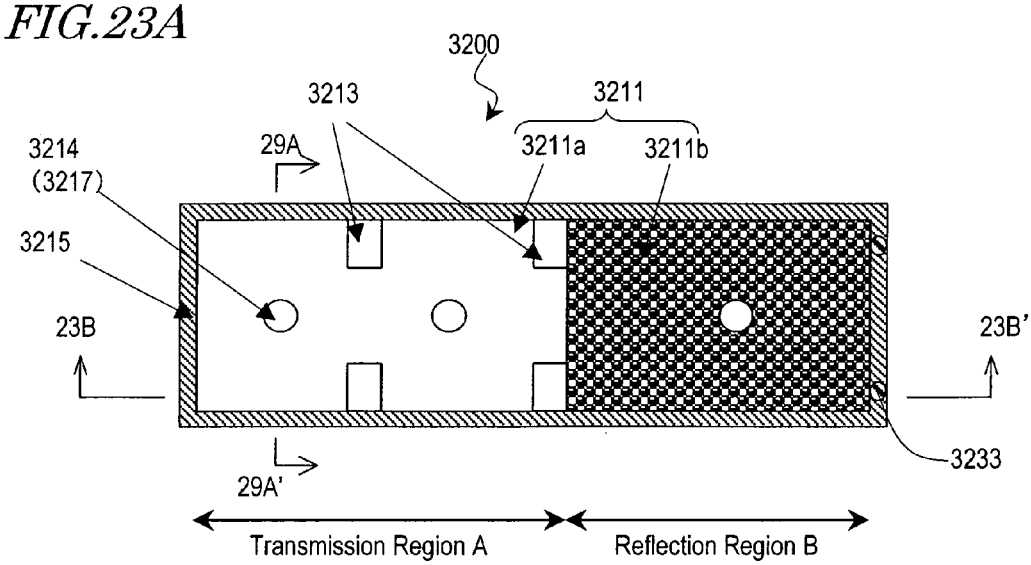
Figure 23B:
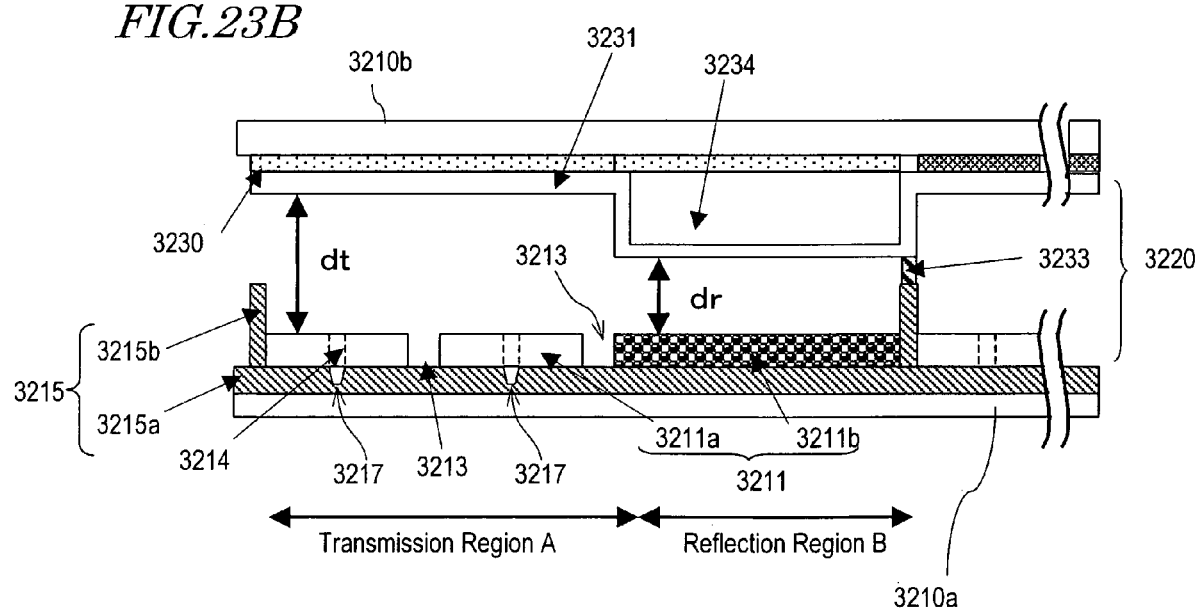

FIGS. 23A and 23B diagrammatically show one pixel of the transflective LCD device 3200 in the third aspect of the present invention, in which FIG. 23A is a plan view and FIG. 23B is a cross-sectional view taken along line 23B-23B' in FIG. 23A.

The LCD device 3200 includes a transparent substrate (for example, a glass substrate) 3210a, a transparent substrate 3210b placed to face the transparent substrate 3210a, and a vertically aligned liquid crystal layer 3220 interposed between the transparent substrates 3210a and 3210b. Vertical alignment films (not shown) are formed on the surfaces of the substrates 3210a and 3210b facing the liquid crystal layer 3220. During non-voltage application, therefore, liquid crystal molecules in the liquid crystal layer 3220 are aligned roughly vertical to the surfaces of the vertical alignment films. The liquid crystal layer 3220 includes a nematic liquid crystal material having negative dielectric anisotropy and also includes a chiral agent as required.

The LCD device 3200 further includes pixel electrodes 3211 formed on the transparent substrate 3210a and a counter electrode 3231 formed on the transparent substrate 3210b. Each pixel electrode 3211, the counter electrode 3231 and the liquid crystal layer 3220 interposed between these electrodes define a pixel. Circuit elements such as TFTs are formed on the transparent substrate 3210a as will be described later. Herein, the transparent substrate 3210a and the components formed thereon are collectively called an active matrix substrate 3210a in some cases.

Typically, color filters 3230 (the entire of the plurality of color filters may also be referred to as a color filter layer 3230) provided for the respective pixels, as well as a black matrix (shading layer) 3232 provided in the gaps between the adjacent color filters 3230, are formed on the surface of the transparent substrate 3210b facing the liquid crystal layer 3220, and the counter electrode 3231 is formed on the color filters 3230 and the black matrix 3232. Alternatively, the color filters 3230 and the black matrix 3232 may be formed on the counter electrode 3231 (on the surface thereof facing the liquid crystal layer 3220). Herein, the transparent substrate 3210b and the components formed thereon are collectively called a counter substrate (color filter substrate) 3210b in some cases.

Each pixel electrode 3211 includes a transparent electrode 3211a formed of a transparent conductive layer (for example, an ITO layer) and a reflective electrode 3211b formed of a metal layer (for example, an Al layer, an Al-including alloy layer, and a multilayer film including any of these layers). Having such a pixel electrode, each pixel includes a transmission region A defined by the transparent electrode 3211a and a reflection region B defined by the reflective electrode 3211b, to provide display in the transmission mode and display in the reflection mode, respectively.

The LCD device 3200 has a shading region around each pixel, and a wall structure 3215b extends on the transparent substrate 3210a in the shading region. Also, the active matrix substrate 3210a has depressions 3117 on an interlayer insulating film 3215a roughly in the center of sub-pixels (liquid crystal domains). The wall structure 3215b, regularly placed to surround the pixels, is formed integrally with the interlayer insulating film 3215a covering circuit elements (including not only active elements such as switching elements but also interconnections and electrodes; not shown in FIGS. 23A and 23B) formed on the transparent substrate 3210a. In a transmissive LCD device having TFTs as circuit elements, for example, providing an interlayer insulating film permits overlap formation of pixel electrodes with gate signal lines and/or source signal lines, as will be described later, and this improves the aperture ratio.

Since the shading region does not contribute to display, the wall structure 3215b formed in the shading region is free from adversely affecting the display. The wall structure 3215b shown in the illustrated example is a continuous wall surrounding the pixel. Alternatively, the wall structure 3215b may be composed of a plurality of separate walls. The wall structure 3215b, which serves to define a boundary of a liquid crystal domain located near the outer edge of the pixel, should preferably have a length of some extent. For example, when the wall structure 3215b is composed of a plurality of walls, each wall is preferably longer than the gap between the adjacent walls.

The transparent electrode 3211a of the illustrated pixel electrode 3211 has openings 3214 formed to correspond to the depressions 3217 and four cuts 3213, and the reflective electrode 3211b thereof has one opening 3214. When a predetermined voltage is applied across the liquid crystal layer, three liquid crystal domains each having axisymmetric alignment are formed, with the center axes of the axisymmetric alignment being in or near the depressions 3217 and the openings 3214. As will be described later, the depression 3217 formed roughly in the center of each sub-pixel acts to fix the position of the center axis of the axisymmetric alignment. The cuts 3213 act to define the directions in which liquid crystal molecules in the axisymmetrically aligned domains fall with an electric field. A tilt electric field is generated around the openings 3214 and the cuts 3213 with the application of a voltage between the pixel electrode 3211 and the counter electrode 3213. With this tilt electric field, the directions of tilt of liquid crystal molecules are defined, to enable the action described above. The depression 3217 defines the direction of tilt of liquid crystal molecules with the effect of its shape.

In the illustrated example, a total of four cuts 3213 are given point-symmetrically with respect to the depression corresponding to the center axis of a liquid crystal domain formed in the transmission region A of the pixel (in the illustrated example, the right depression as viewed from FIG. 23A). With these cuts 3213, the directions in which liquid crystal molecules fall during voltage application are defined, resulting in formation of three liquid crystal domains. The positions and preferred shapes of the depressions 3117, the openings 3214 and the cuts 3213 are the same as those described above in relation to the transmissive LCD device 3100. In the example illustrated in FIGS. 23A and 23B, the transmission region A has two liquid crystal domains and the reflection region B has one liquid crystal domain. However, the arrangement is not limited to this. Each liquid crystal domain is preferably roughly square in shape from the standpoint of the viewing angle characteristics and the stability of alignment.

Supports 3233 for defining the thickness of the liquid crystal layer 3220 (also called the cell gap) should preferably be formed in the shading region (in the illustrated example, the region defined by the black matrix 3232) to avoid degradation of the display quality due to the supports. Although the supports 3233 are formed on the wall structure 3215b provided in the shading region in the illustrated example, the supports 3233 may be formed on either transparent substrate 3210a or 3210b. In the case of forming the supports 3233 on the wall structure 3215b, setting is made so that the sum of the height of the wall structure 3215b and the height of the supports 3233 is equal to the thickness of the liquid crystal layer 3220. If the supports 3233 are formed in a region having no wall structure 3215b, setting is made so that the height of the supports 3233 is equal to the thickness of the liquid crystal layer 3220.

In the LCD device 3200, when a predetermined voltage (voltage equal to or higher than a threshold voltage) is applied between the pixel electrode 3211 and the counter electrode 3231, three axisymmetrically aligned domains with their center axes stabilized in or near the three openings 3214 and the depressions 3217 are formed. The four cuts 3213 provided in the pixel electrode 3211 define the directions in which liquid crystal molecules in the three adjacent liquid crystal domains fall with an electric field, and the wall structure 3215b stabilizes boundaries of the liquid crystal domains located near the outer edges of the pixel.

A preferred construction specific to the transflective LCD device 3200 permitting both the transmission-mode display and the reflection-mode display will be described.

While light used for display passes through the liquid crystal layer once in the transmission-mode display, it passes through the liquid crystal layer 3220 twice in the reflection-mode display. Accordingly, as diagrammatically shown in FIG. 23B, the thickness dt of the liquid crystal layer 3220 in the transmission region A is preferably set roughly double the thickness dr of the liquid crystal layer 3220 in the reflection region B. By setting in this way, the retardation given to the light by the liquid crystal layer 3220 can be roughly the same in both display modes. Most preferably, dr=0.5 dt should be satisfied, but good display is secured in both display modes as long as 0.3 dt<dr<0.7 dt is satisfied. Naturally, dt=dr may be satisfied depending on the use.

In the LCD device 3200, a transparent dielectric layer 3234 is provided on the glass substrate 3210b only in the reflection region B to make the thickness of the liquid crystal layer 3220 in the reflection region B smaller than that in the transmission region A. This construction eliminates the necessity of providing a step by forming an insulating film and the like under the reflective electrode 3211b, and thus has an advantage of simplifying the fabrication of the active matrix substrate 3210a. If the reflective electrode 3211b is formed on such an insulting film provided to give a step for adjusting the thickness of the liquid crystal layer 3220, light used for transmission display will be shaded with the reflective electrode covering a slope (tapered face) of the insulating film, or light reflected from the reflective electrode formed on a slope of the insulating film will repeat internal reflection, failing to be effectively used even for reflection display. By adopting the construction described above, occurrence of such problems is prevented, and thus the light use efficiency can be improved.

If the transparent dielectric layer 3234 is provided with a function of scattering light (diffuse reflection function), white display close to good paper white can be realized without the necessity of providing the reflective electrode 3211b with the diffuse reflection function. Such white display close to paper white can also be realized by making the surface of the reflective electrode 3211b uneven, and in this case, no light scattering function is necessary for the transparent dielectric layer 3234. However, the uneven surface may fail to stabilize the position of the center axis of the axisymmetric alignment depending on the shape of the uneven surface. On the contrary, by combining the transparent dielectric layer 3234 having the light scattering function and the reflective electrode 3211b having a flat surface, the position of the center axis can be stabilized with the opening 3214 formed in the reflective electrode 3211b more reliably. Note that in the case of making the surface of the reflective electrode 3211b uneven to provide the reflective electrode 3211b with the diffuse reflection function, the uneven shape is preferably a continuous wave shape to prevent occurrence of an interference color, and such a shape is preferably set so that the center axis of the axisymmetric alignment can be stabilized.

While light used for display passes through the color filter layer 3230 once in the transmission mode, it passes through the color filter layer 3230 twice in the reflection mode. Accordingly, if the color filter layer 3230 has the same optical density both in the transmission region A and the reflection region B, the color purity and/or the luminance may decrease in the reflection mode. To suppress occurrence of this problem, the optical density of the color filter layer in the reflection region is preferably made lower than that in the transmission region. The optical density as used herein is a characteristic value characterizing the color filter layer. For example, the optical density can be reduced by reducing the thickness of the color filter layer. Otherwise, the optical density can be reduced by reducing the density of a pigment added, for example, while keeping the thickness of the color filter layer unchanged.

Figure 24:
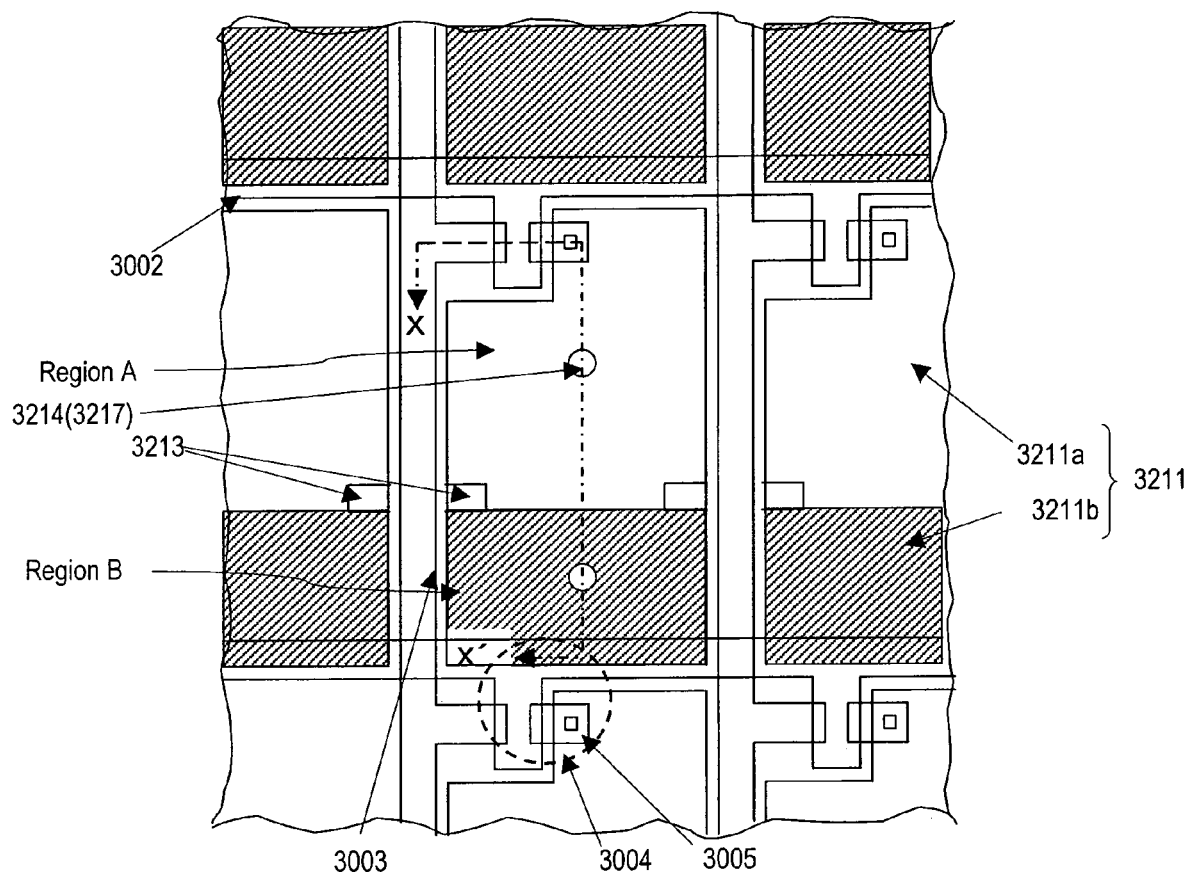
FIG. 24 is a plan view diagrammatically showing an active matrix substrate of a transflective LCD device of an embodiment in the third aspect of the present invention.
Figure 25:
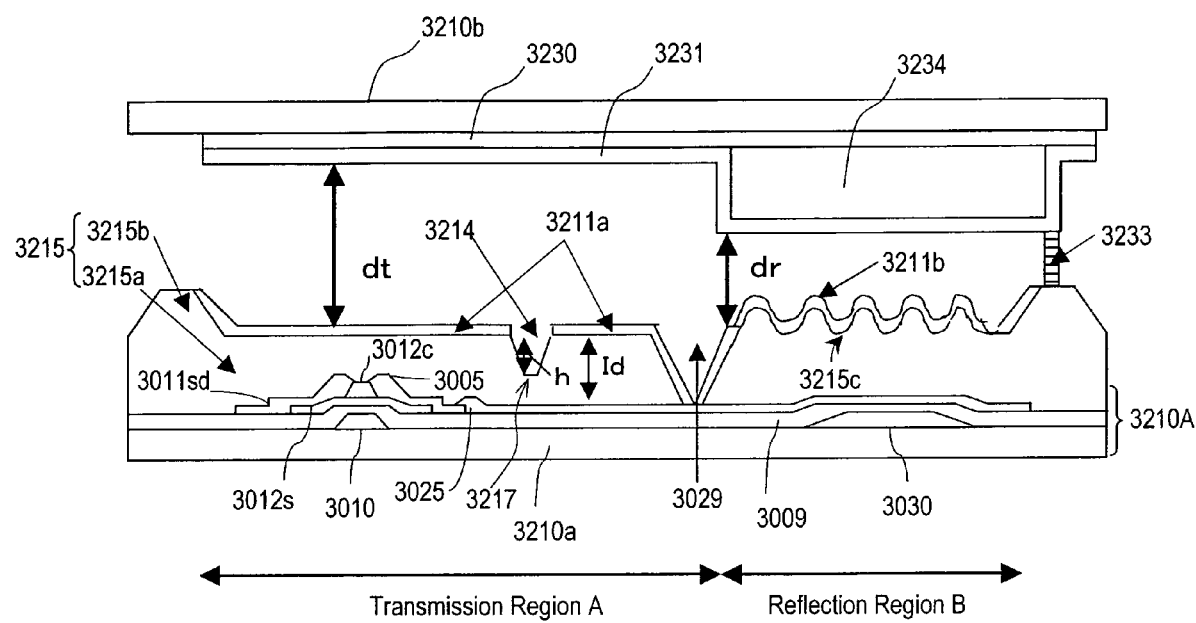
FIG. 25 is a cross-sectional view diagrammatically showing an LCD device provided with the active matrix substrate shown in FIG. 24.

Next, referring to FIGS. 24 and 25, an example of the structure of an active matrix substrate suitably used for the transflective LCD device will be described. FIG. 24 is a partial enlarged view of the active matrix substrate, and FIG. 25 is a cross-sectional view taken along line X-X' in FIG. 24. The active matrix substrate shown in FIGS. 24 and 25 can be the same in construction as the active matrix substrate shown in FIGS. 23A and 23B, except that one liquid crystal domain is formed in the transmission region A (that is, the numbers of the openings 3214, the depressions 3217 (only in the transmission region) and the cuts 3213 are reduced). Thus, the common components are denoted by the same reference numerals.

The active matrix substrate shown in FIGS. 24 and 25 has a transparent substrate 3210a made of a glass substrate, for example. Gate signal lines 3002 and source signal lines 3003 run on the transparent substrate 3210a to cross each other at right angles. TFTs 3004 are formed near the crossings of these signal lines 3002 and 3003. Drain electrodes 3005 of the TFTs 3004 are connected to corresponding pixel electrodes 3211.

Each of the pixel electrodes 3211 includes a transparent electrode 3211a made of a transparent conductive layer such as an ITO layer and a reflective electrode 3211b made of Al and the like. The transparent electrode 3211a defines a transmission region A, and the reflective electrode 3211b defines a reflection region B. A transparent dielectric layer may be formed on the reflective electrode 3211b as required.

The pixel electrodes 3211 are formed on an interlayer insulating film 3215a. Each pixel electrode 3211 (transparent electrode 3211a) is connected, at the contact portion thereof in a contact hole formed in the interlayer insulating film 3215a, to a connection electrode 3025 that is connected to the drain electrode 3005. The reflective electrode 3211b is connected to the transparent electrode 3211a.

The pixel electrode 3211 may extend up to on the slopes of a wall structure 3215b that is integrally formed with the interlayer insulating film 3215a. By this extension of the pixel electrode 3211 to the wall structure 3215b, the directions in which liquid crystal molecules in the liquid crystal layer tilt during voltage application can be efficiently regulated. Openings 3214 for fixing/stabilizing the center axis of axisymmetric alignment and cuts 3213 for controlling the alignment of axisymmetrically aligned domains are formed at predetermined positions of the pixel electrode 3211. The connection electrode 3025 constitutes a storage capacitance together with a storage capacitance line (storage capacitance electrode) formed to face the connection electrode 3025 via a gate insulating film 3009. The storage capacitance line runs in parallel with the gate signal line 3002 under the reflective electrode 3211b, for example. The same signal (common signal) as that applied to the counter electrode formed on the color filter substrate, for example, is applied to the storage capacitance line.

The reflective electrode 3211b of the transflective LCD device of this embodiment has the surface of an uneven shape, and thus exhibits excellent diffuse reflection characteristics. The uneven shape of the surface of the reflective electrode 3211b is a reflection of an uneven shape given to the surface of the interlayer insulating film 3215a.

The interlayer insulating film 3215a has depressions 3217 formed regularly roughly in the center of the sub-pixels (liquid crystal domains) and is formed integrally with the wall structure 3215b. The interlayer insulating film 3215a has a region having an essentially flat surface (called a "first region" in some cases) and a region having a surface of an uneven shape (called a "second region" in some cases). The transparent electrode 3211a is formed on the first region having a flat surface, and the reflective electrode 3211b is formed on the second region having an uneven surface.

Such an interlayer insulating film 3215a, which is formed integrally with the wall structure 3215b and includes the depressions 3217 and also the region having an uneven surface (uneven portion 215c), can be formed from a single photosensitive resin film, as will be described later, and thus the fabrication process can be simpler than the conventional ones.

The pixel electrode 3211 overlaps the gate signal line 3002 for the next row via the gate insulating film 3009. The TFT 3004 has a multilayer structure including the gate insulating film 3009, a semiconductor layer 3012s, a channel protection layer 3012c and an n$^+$-Si layer 3011sd (source/drain electrodes) formed in this order on a gate electrode 3010 branched from the gate signal line 3002.

The illustrated TFT is of a bottom gate type. The TFT is not limited to this type, but a top gate type TFT can also be used. Any switching elements other than the TFT (for example, MIM) may also be used.

As described above, like the LCD 3100, the LCD 3200 having the construction shown in FIGS. 23A and 23B has the effect that the alignment of liquid crystal molecules can be stabilized sufficiently with a comparatively simple construction having the axisymmetric alignment regulating structure formed on only one substrate (that is, the depressions 3217 and the wall structure 3215b formed on the interlayer insulating film and the cuts 3213 formed in the pixel electrode 3211). As in the transmissive LCD device 3100' shown in FIG. 22, the transflective LCD device 3200 may be provided with an alignment regulating structure also on the counter substrate, to thereby further stabilize the alignment. Note however that for the reason described above, the alignment regulating structure provided on the counter substrate preferably includes only openings for fixing the center axis of the axisymmetric alignment.

Also, in the LCD device 3200, the display brightness and color purity in both the transmission mode and the reflection mode can be improved by providing the transparent dielectric layer 3234 and/or the color filter layer 3230 in the manner described above.

Next, referring to FIGS. 26A to 27F, a method for forming the interlayer insulating film 3215a having the depressions 3217 and the wall structure 3215b will be described in detail. Note that in FIGS. 25 and 26A to 27F, the transparent substrate 3210a and the circuit elements such as the TFTs and the signal lines formed on the transparent substrate 3210a are collectively called a "circuit substrate 3210A".

Figure 26A:
FIGS. 26A to 26F are diagrammatic views for demonstrating a fabrication method for the active matrix substrate shown in FIG. 25.

First, as shown in FIG. 26A, the circuit substrate 3210A having predetermined circuit elements such as TFTs formed therein is prepared, and a positive photosensitive resin film 3215 (for example, OFPR-800 from Tokyo Ohka Kogyo Co., LTD.) is formed to a thickness of 4.5 μm, for example, to cover the circuit elements.

Figure 26B:
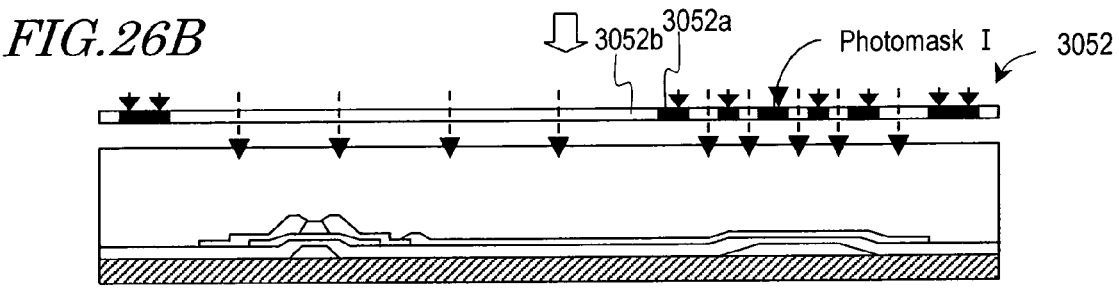

As shown in FIG. 26B, the photosensitive resin film is exposed to light. In this light exposure, regions having different exposures are formed in the photosensitive resin film. That is, light exposure is hardly made for regions that are to be the wall structure 3215b (regions shaded with source signal lines, gate signal lines and the like) and regions of which the surfaces are made uneven (regions on which the reflective electrodes are formed) (almost zero exposure), while exposure of a predetermined amount of light is made for the other regions (non-full intermediate exposure).

Specifically, the photosensitive resin film 3215 is exposed to light via a photomask 3052 having shading portions 3052a at positions corresponding to projections (projections of the uneven surfaces) in the reflection regions and the wall structure. The remaining portions of the photomask 3052 are transmitting portions 3052b. The shading portions 3052a for projections in the reflection regions, each in the shape of a circle or a polygon, for example, are arranged randomly at a predetermined density at predetermined inter-center intervals (5 to 30 µm). The projections may be arranged in such a degree of randomness that can suppress generation of interference colors. An extra-high voltage mercury lamp (for example, i-line illuminance: 20 to 50 mW), for example, is used as the light source, to perform uniform exposure (illumination time: 1 to 4 seconds). The exposure is preferably about 20 to 100 mJ/cm$^2$.

Figure 26C:
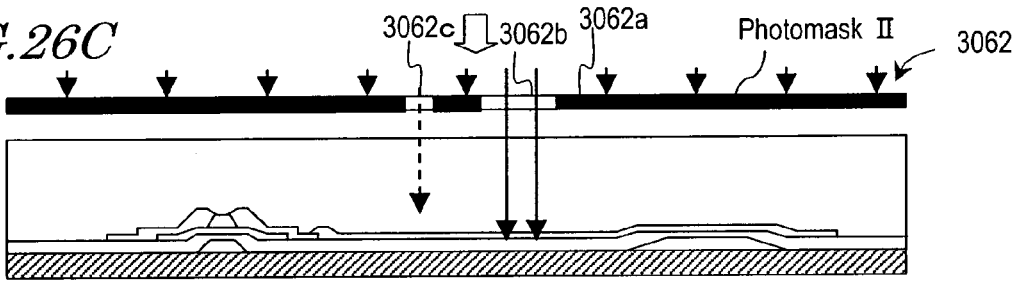

As shown in FIG. 26C, the photosensitive resin film 3215 is uniformly exposed to light via a photomask 3062 having transmitting portions 3062b corresponding to the contact holes, transmitting portions 3062c for forming the depressions 3217 at predetermined positions inside the pixels, and shading portions 3062a for the remaining portions (illumination time: 10 to 15 seconds). The exposure is preferably about 200 to 500 mJ/cm$^2$. The regions that are to be the contact holes and the depressions belonged to the other regions in the preceding exposure step.

The irradiation diameter of the transmitting portions 3062c for formation of the depressions is set to be smaller than that of the transmitting portions 3062b for formation of the contact holes (for example, set to be a half or less of the mask diameter for the contact holes). With this setting, the depressions having a predetermined depth, not extending through the interlayer insulating film to reach the underlying connection electrode, can be obtained in a one-stage contact hole formation exposure step. The thickness of the interlayer insulating film Id and the depth h of the depressions preferably satisfy the relationship $h<0.8 \cdot Id$. This will be described later in detail.

Alternatively, an exposure step for formation of the depressions may be added prior to the step for formation of the contact holes to give a series of exposure steps, to thereby provide the interlayer insulating film in the multistage shape.

Figure 26D:
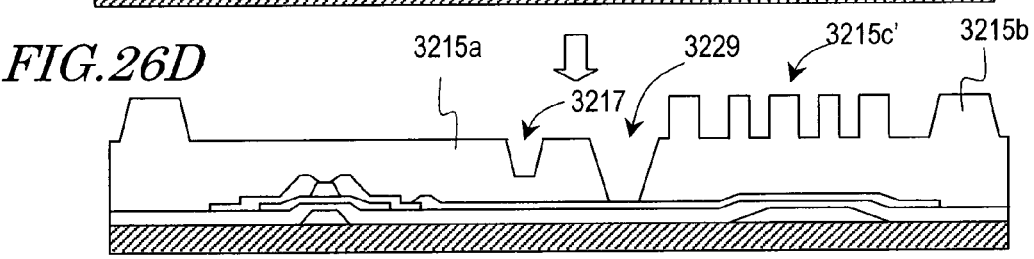

As shown in FIG. 26D, the photosensitive resin film 3215 is developed with a tetramethylammonium hydroxide (TMAH) developer, for example, under predetermined conditions. For example, the regions of the resin film subjected to a high exposure are completely removed (contact holes 3229 are formed), the regions of the resin film subjected to no exposure are left by about 90% (the wall structure and the projections are formed), and the regions of the resin film subjected to a low exposure are left by about 40% (the depressions 3217 are formed).

Figure 26E:
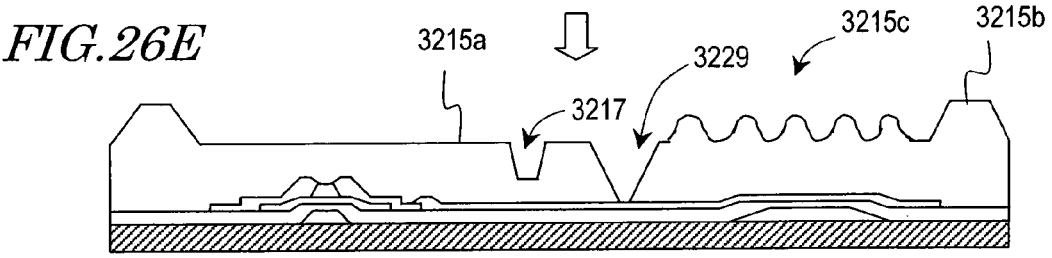

As shown in FIG. 26E, the resultant photosensitive resin film 3215 are dried and baked as required. The baking is made at 200° C., for example. With this baking, the portions of the resin in the reflection regions having a plurality of minute projections, denoted by 3215c', are changed to the mildly uneven portions 3215c by thermal deformation and the like. The reflective electrodes 3211b having such a mildly uneven surface can suppress generation of interference colors and thus exhibit good diffuse reflection characteristics.

As described above, by performing the combined continuous exposure steps and the subsequent development step, obtained is the interlayer insulating film 3215a that is integral with the wall structure 3215b and has the uneven portions 3215c having fine projections and depressions, the depressions 3217 regularly formed roughly in the center of liquid crystal domains in pixels, and the contact holes 3229.

In the exposure steps described above, the regions having different exposures were formed by adjusting the illumination time with regions and using the photomasks having transmitting portions and shading portions. Alternatively, the exposure may be made with a grayscale mask having a continuously varying gradation pattern, to form an interlayer insulating film of which the surface has a continuously varying shape.

Otherwise, in the exposure steps, different photomasks having shading portions corresponding to the wall structure and corresponding to the depressions only may be used, and the different exposure steps may be performed prior to the exposure step for formation of the contact holes.

Figure 26F:
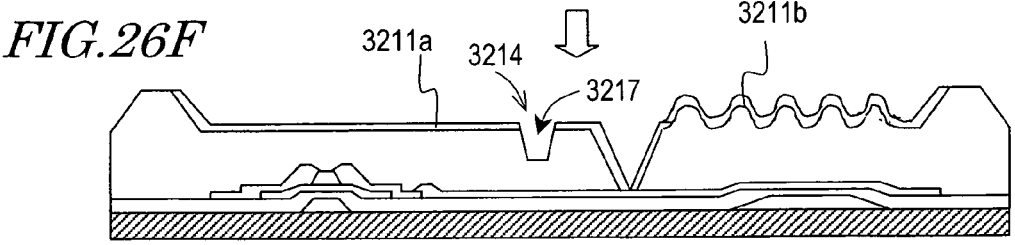

As shown in FIG. 26F, the pixel electrodes 3211 are formed on the interlayer insulating film 3215a and the wall structure 3215b formed in the steps described above. For example, the transparent electrodes 3211a are formed by depositing a transparent conductive film (for example, an ITO film) to a predetermined thickness (for example, 100 nm) by sputtering and patterning the deposited film. The reflective electrodes 3211b are formed by depositing a reflective electrode film (for example, an Al thin film) to a predetermined thickness (for example, 180 nm) by sputtering and patterning the deposited film. During the formation of the electrodes 3211a and 3211b, the openings 3214 and the cuts 3213 are formed.

In this embodiment, the wall structure 3215b and the fine projections and depressions in the reflection regions are formed in the same layer as the interlayer insulating film 3215a having the depressions 3217 inside the pixels, and the pixel electrodes are formed on this layer. Therefore, the pixel electrodes can also be formed on the wall structure, in particular, on the side slopes of the wall structure 3215b on the pixel side. With this extended formation of the pixel electrodes 3211 on the side slopes of the wall structure 3215b, the electric field (electric lines of force) in the vicinity of the side faces of the wall structure 3215b is distorted. By using this effect, together with the structural alignment regulating force of the wall structure 3215b, the directions of tilt of liquid crystal molecules can be efficiently regulated.

A transparent electrode film may be formed on each reflective electrode 3211b as required. Formation of such a transparent electrode film can reduce a difference in potential difference (electrode potential difference) between the reflection regions and the transmission regions. The material used for such a transparent electrode film is preferably the same as that for the transparent electrodes 3211a.

As described above, in the fabrication method of this embodiment, the uneven surfaces for giving the diffuse reflection characteristics, as well as the depressions formed regularly inside the pixels and the wall structure formed outside the pixels both as the alignment control structure, can be formed by only performing the photolithography process for a single photosensitive resin film. Thus, effective cost reduction is attained.

Vertical alignment films are formed on the thus-obtained active matrix substrate and the counter substrate (color filter substrate) under predetermined conditions. These substrates are then bonded together via a sealing resin, and a liquid crystal material having negative dielectric anisotropy is sealed in the gap between the substrates, to obtain the LCD device of the present invention. Known methods can be used to realize these fabrication steps, and thus description thereof is omitted here.

The fabrication method for the transflective LCD device was exemplified to describe the fabrication method of the present invention. Naturally, the technology described above in which the wall structure as an alignment regulating structure for liquid crystal domains, the depressions provided in the center of the liquid crystal domains, the contact holes and the like are formed together during formation of the interlayer insulating film in combined continuous process steps can also be applied to the fabrication of transmissive LCD devices and reflective LCD devices. By adopting this technology, the process can be made simpler than conventionally attained, providing the effects such as cost reduction and reduction of the tact time.

A preferred configuration of the depressions regularly provided roughly in the center of the liquid crystal domains inside the pixels will be described with reference to FIGS. 27 and 28.

Figure 27:
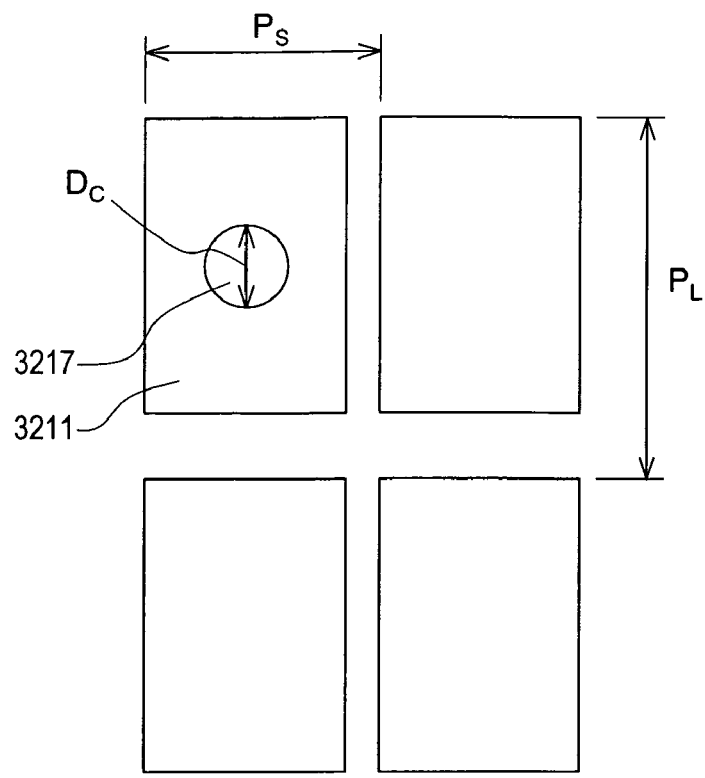
FIG. 27 is a diagrammatic view showing the relationship between the inner diameter/width Dc of a depression and the pixel short pitch.

As diagrammatically shown in FIG. 27, the pitch Ps (µm) of the pixels arranged in a matrix in the shorter side direction and the maximum inner diameter/width Dc (µm) of the depression preferably satisfy the relationship Dc<0.35·Ps. The maximum inner diameter/width Dc is defined as the diameter when the depression is a circle and the length of the longest straight line that can be drawn inside the depression when the depression is of any other shape.

Figure 28:
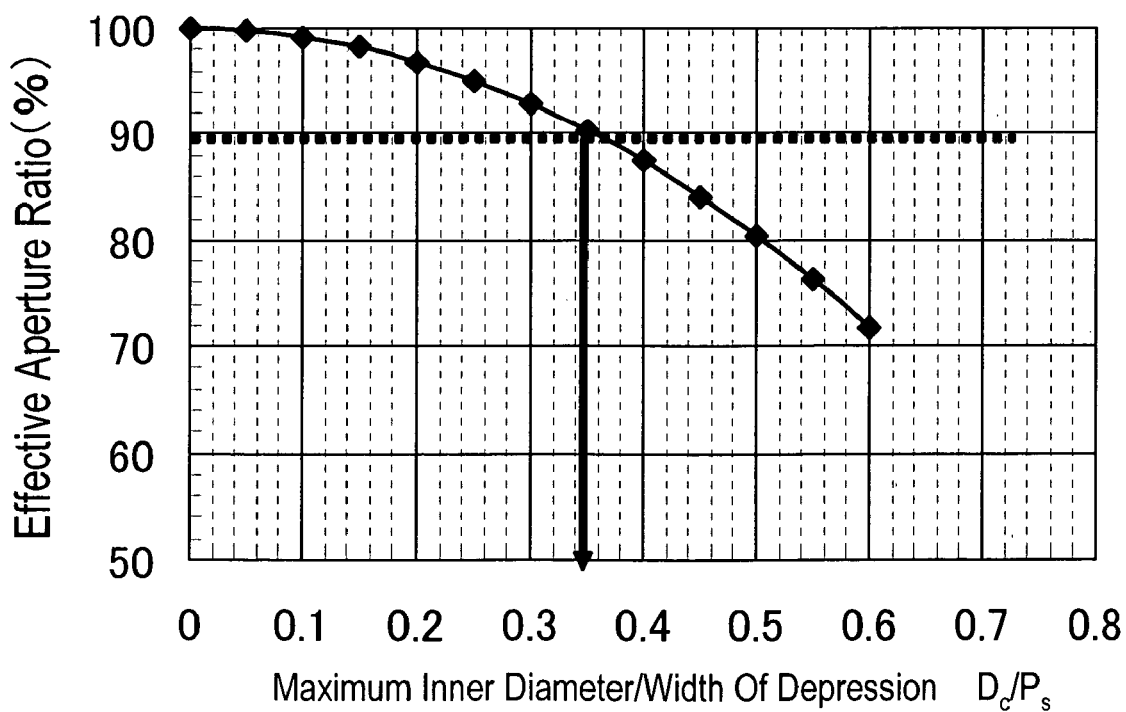
FIG. 28 is a graph showing the relationship between the maximum inner diameter/width Dc of a depression and the effective aperture ratio.

FIG. 28 is a graph showing the relationship between the maximum inner diameter/width Dc of the depression and the effective aperture ratio. The effective aperture ratio tends to decrease with formation of the depressions. As long as the decrease in aperture ratio is equal to or less than 10%, the decrease in brightness as the LCD device can be substantially compensated by optimizing the optical design of the liquid crystal layer. Therefore, the lower limit of the aperture ratio set when the depressions are formed is determined as 90%. From FIG. 28, it is found that to satisfy this condition, the maximum inner diameter/width Dc (µm) of the depression must satisfy the relationship Dc<0.35·Ps. Specifically, for the pixels having a pitch of 50 µm in the shorter side direction, for example, the maximum inner diameter of the depression is preferably 17 µm or less, more preferably 10 µm or less (Dc≦0.2 Ps). If the maximum inner diameter exceeds this value, the decrease of the effective aperture ratio will exceed 10%, resulting in significant reduction in the brightness of the panel and thus deterioration in display quality.

The depth h (µm) of the depression and the thickness Id (µm) of the interlayer insulating film preferably satisfy the relationship h<0.8·Id, as will be described later with experimental examples. If the depth of the depression is greater than this defined value, liquid crystal molecules increasingly tend to tilt along the step faces in the liquid crystal domains. This gives birefringence, causing light leakage near the depressions and thus reduction in contrast ratio. Also, with increase of the depth h of the depression, the thickness of the liquid crystal layer locally increases, causing variations in the characteristics of write to the liquid crystal layer (charging characteristics), and this gives a cause of variations in display characteristics. The depth h of the depression is more preferably h<0.6·Id.

Figure 29A:
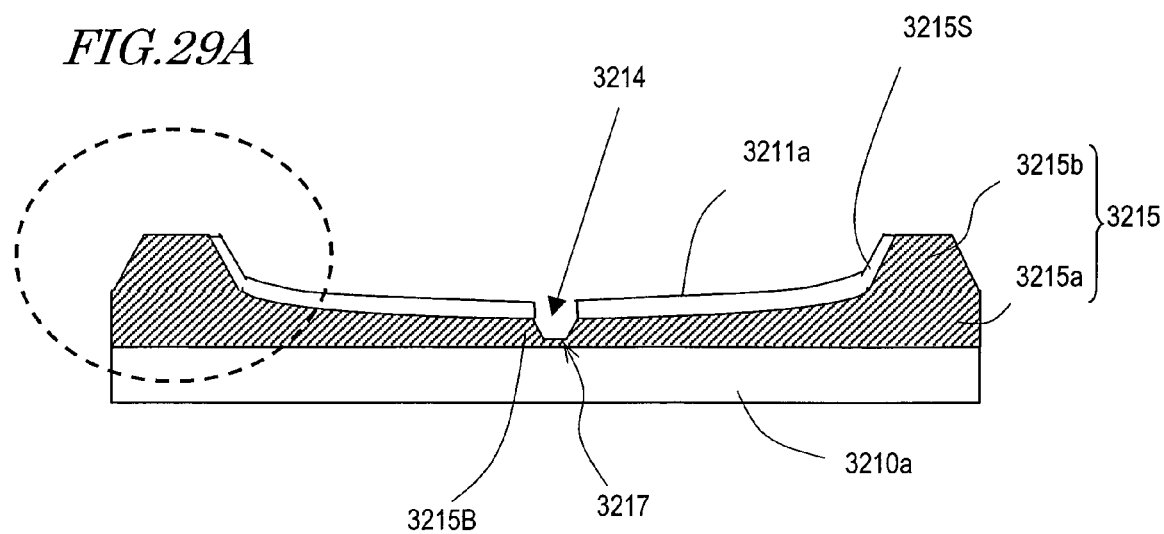
FIG. 29A is a cross-sectional view taken along line 29A-29A' in FIG. 23A.

Next, referring to FIGS. 29A and 29B, a preferred shape of the wall structure 3215b and the interlayer insulating film 3215a will be described in detail. FIG. 29A is a cross-sectional view taken along line 29A-29A' in FIG. 23A, and FIG. 29B is a partial enlarged cross-sectional view of the portion encircled with the dashed line in FIG. 29A.

In this embodiment of the present invention, the interlayer insulating film 3215a overlying the switching elements, the depressions 3217 and the wall structure 3215b are formed integrally with one another in the combined exposure steps. Therefore, as diagrammatically shown in FIGS. 29A and 29B, the cross section of the wall structure 3215b and the interlayer insulating film 3215a vertical to the first substrate 3210a gives a continuous shape having a bottom 3215B in a region in which the center axis of the axisymmetric alignment of the liquid crystal domain is formed. In the illustrated example, the pixel electrode 3211a has the depression 3217 for fixing/stabilizing the position of the center axis of the axisymmetrically aligned domain. Therefore, the bottom 3215B of the cross-sectional shape of the interlayer insulating film 3215a is at the position corresponding to the depression 3217.

Thus, the side slopes 3215S of the wall structure 3215b and the top surface of the interlayer insulating film 3215a give a continuous crater shape. With the pixel electrode 3211 and the vertical alignment film formed on the crater-shaped surface, the alignment of the axisymmetrically aligned domain can be further stabilized. As a result, the following effects can be obtained. That is, the response characteristics in grayscale levels can be improved, the roughness in display in grayscale levels can be reduced, and a distortion in alignment occurring with pressing of a liquid crystal panel, if any, can be cleared in a short time. The alignment stabilizing effect related to the crater shape is obtained because the surfaces of the pixel electrode and the vertical alignment film are in a crater shape. More specifically, the pixel electrode having the crater-shaped surface generates an electric field tilted around the bottom of the crater as the center in the liquid crystal layer. The vertical alignment film having the crater-shaped surface exerts its alignment regulating force so as to tilt liquid crystal molecules around the bottom of the crater as the center. In this way, with the additional alignment regulating force originating from the crater shape, the axisymmetrically aligned domain is further stabilized. Effective exertion of this effect is expected by placing the depressions regularly roughly in the center of the liquid crystal domains inside the pixels, and in this way, the stabilization of the axisymmetric alignment and the fixation of the center axes work more effectively. The crater shape can be controlled by adjusting the conditions such as the temperature and time of heat treatment after the patterning of the photosensitive resin film for forming the interlayer insulating film 3215a and the wall structure 3215b.

Figure 29B:
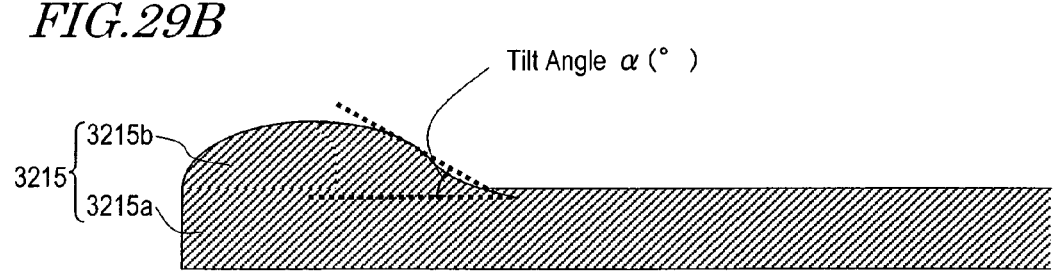
FIG. 29B is an enlarged view of the portion encircled with the broken line in FIG. 29A.

As is diagrammatically shown in FIG. 29B, the tilt angle α of the side face 3215S of the wall structure 3215b with respect to the surface of the substrate 3210a is preferably 45° or less, more preferably 25° or less.

The vertical alignment film (not shown), which is also formed on the side face 3215S of the wall structure 3215b, has the force of regulating liquid crystal molecules to be aligned vertical to the surface thereof. Accordingly, liquid crystal molecules existing on the side face 3215S are aligned in a direction tilted with respect to the surface of the substrate 3210a. The degree of the tilt of the liquid crystal molecules is higher as the tilt angle α of the side face 3215S is larger. Since the alignment regulating force of the vertical alignment film acts irrespective of application of a voltage, light leakage occurs due to the tilted liquid crystal molecules near the side face 3215S in the black display state. The contrast ratio therefore decreases when the tilt angle α of the wall structure 3215b is excessively large. To suppress this decrease in contrast ratio, the tilt angle α is preferably 45° or less, more preferably 25° or less. If the tilt angle α exceeds 45°, the alignment may become unstable because the vertical alignment of the liquid crystal molecules is weakened. To obtain the alignment stabilizing effect, however, the tilt angle α is preferably 3° or more, more preferably 5° or more.

The design parameters for the depressions 3217 and the like formed at the formation of the interlayer insulating film 3215a were described as being used for the transflective LCD device. These parameters are also applicable to transmission LCD devices and reflective LCD devices.

Operation Principle

The reason why the LCD device having a vertically aligned liquid crystal layer in the third aspect of the present invention has excellent wide viewing angle characteristics will be described with reference to FIGS. 30A and 30B.

Figure 30A:
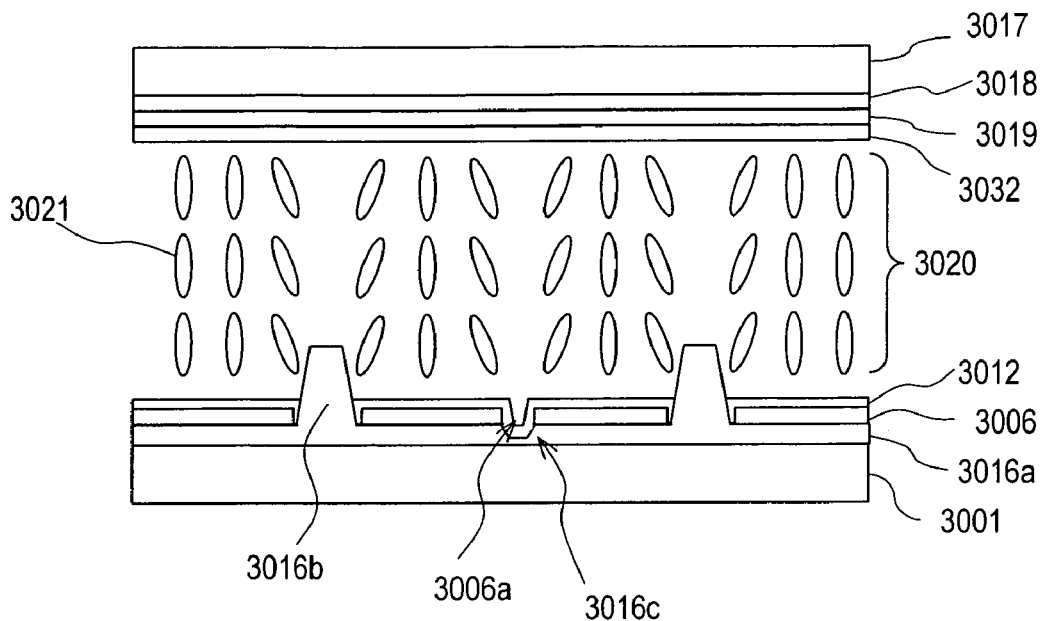
Figure 30B:
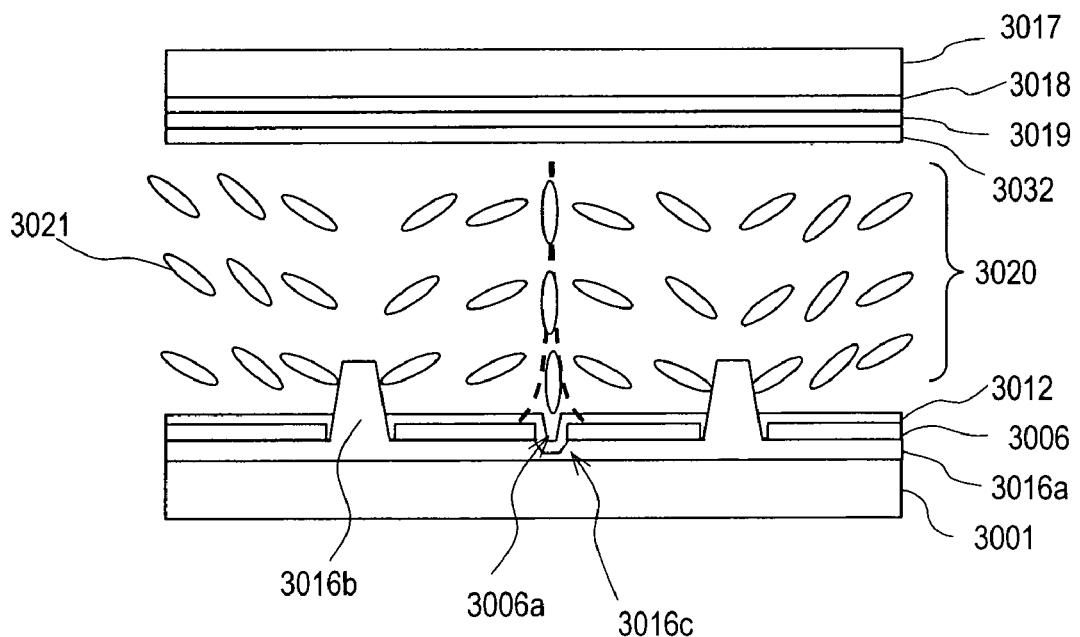

FIGS. 30A and 30B are views for demonstrating how the alignment regulating forces of a depression 3016c formed on an interlayer insulating film 3016a, a wall structure 3016b formed integrally with the interlayer insulating film 3016a, and an opening 3006a formed in a pixel electrode 3006 act, in which FIG. 30A diagrammatically shows the aligned state of liquid crystal molecules during non-voltage application and FIG. 30B diagrammatically shows that during voltage application. The state shown in FIG. 30B is for display of a grayscale level.

The LCD device shown in FIGS. 30A and 30B includes the interlayer insulating film 3016a, the pixel electrode 3006 having the opening 3006a and an alignment film 3012 formed in this order on a transparent substrate 3001. A depression is formed on the surface of the transparent substrate 3001 (alignment film 3012) facing a liquid crystal layer 3020 in correspondence with the depression 3016c. The LCD device also includes a color filter layer 3018, a counter electrode 3019 and an alignment film 3032 formed in this order on another transparent substrate 3017. The liquid crystal layer 3020 interposed between the two substrates includes liquid crystal molecules 3021 having negative dielectric anisotropy.

As shown in FIG. 30A, during non-voltage application, the liquid crystal molecules 3021 are aligned roughly vertical to the substrate surface with the alignment regulating force of the vertical alignment films 3012 and 3032. Note however that the liquid crystal molecules existing near the wall structure 3016b (typically, covered with the vertical alignment film) and those existing in the depression 3016c tilt with respect to the substrate plane because these liquid crystal molecules are aligned roughly vertical to the side slopes of the wall structure 3016b and the depression 3016c. That is, the wall structure 3016b and the depression 3016c define the directions in which the liquid crystal molecules tilt.

As shown in FIG. 30B, during voltage application, the liquid crystal molecules 3021 having negative dielectric anisotropy attempt to make their major axes vertical to electric lines of force, and thus the directions in which the liquid crystal molecules 3021 fall are defined with a tilt electric field generated around the opening 3006a. Therefore, the liquid crystal molecules 3021 are aligned axisymmetrically around the opening 3006a as the center. In the thus-formed axisymmetrically aligned domains, liquid crystal directors are aligned in all directions (direction in the substrate plane), and thus, excellent viewing angle characteristics can be obtained. The force regulating the tilt directions of the liquid crystal molecules given by the tilt electric field and the wall structure is more intense in the periphery of each pixel, and the tilting of the liquid crystal molecules under this influence tends to propagate toward the center of the pixel. As a result, the center axis is easily stabilized around the depression in the center of the pixel (sub-pixel).

Although the action given by the tilt electric field generated around the opening 3006a was referred to in the above description, a tilt electric field is also generated around cuts formed at edges of the pixel electrode 3006, and the directions of tilt of the liquid crystal molecules 3021 are also defined with this tilt electric field. With the combined action of the alignment regulating force of this tilt electric field and the alignment regulating force of the wall structure 3016b, the center axis is fixed more stably in the center of the liquid crystal domain during voltage application.

Hereinafter, specific examples of the LCD device in the third aspect of the present invention will be described. The LCD device of an embodiment in the third aspect of the present invention has the construction shown in FIG. 9, for example. As the liquid crystal panel 1050, one having the same construction as that of the LCD device 3200 shown in FIGS. 23A and 23B was used.

EXAMPLE 1

An LCD device was fabricated using an active matrix substrate having the construction shown in FIG. 25 and a color filter substrate having a color filter layer, transparent dielectric layers 3234 and a counter electrode placed to face the active matrix substrate.

In the active matrix substrate in this example, the interlayer insulating film and the wall structure were formed in the process described above under the following exposure conditions.

The first exposure step for forming the uneven shape and the wall structure on a positive photosensitive resin film was executed under a low exposure condition (60 mJ/cm$^2$) using the first photomask 3052. The second exposure step for forming the depressions placed regularly roughly in the center of liquid crystal domains of the pixels for controlling the axis position, the contact holes and the like was executed under a high exposure condition (300 mJ/cm$^2$) using the second photomask 3062 (inner diameter/width of depressions: 1.5 μm, diameter of contact holes: 5 μm).

Thereafter, the series of steps described above were executed to obtain the active matrix substrate in this example. The baking after the development was made at 200° C. for one hour. As a result, the wall structure having a side slope tilt angle α of about 100 and a cross section of a crater shape was obtained. The depressions had a finished inner diameter of 2 μm and a depth of 1.8 μm, and the thickness of the flat portion of the interlayer insulating film in each pixel was 2.5 μm.

In the color filter substrate, the transparent dielectric layers were formed to give steps in the reflection regions. Supports (dielectrics) for defining the thickness of the liquid crystal layer were formed in the shading region outside the pixels used for display.

The vertical alignment films were formed on the active matrix substrate and the color filter substrate under predetermined conditions (no rubbing was made). The two substrates were then bonded together via a sealing resin, and a liquid crystal material having negative dielectric anisotropy (refractive index anisotropy Δn: 0.1, dielectric constant anisotropy Δ∈: −4.5) was injected and sealed in the space between the substrates, to obtain a liquid crystal display panel. In this example, the thickness dt of the liquid crystal layer in the transmission regions was 4 μm, and the thickness dr thereof in the reflection regions was 2.1 μm.

Optical films were then placed on both surfaces of the liquid crystal display panel in the manner described below, to obtain an LCD device.

The LCD device of this example had a multilayer structure composed of a polarizing plate (observer side), a quarter wave plate (phase plate 1), a phase plate having negative optical anisotropy (phase plate 2 (NR plate)), the liquid crystal layer (on the upper and lower sides thereof, the color filter substrate and the active matrix substrate were respectively placed), a phase plate having negative optical anisotropy (phase plate 3 (NR plate)), a quarter wave plate (phase plate 4), and a polarizing plate (backlight side) in the order from the observer side. The upper and lower quarter wave plates (phase plates 1 and 4) were placed so that the slower axes thereof were orthogonal to each other, and had a phase difference of 140 nm. The phase plates having negative optical anisotropy (phase plates 2 and 3) had a phase difference of 135 nm. The two polarizing plates were placed so that the absorption axes thereof were orthogonal to each other.

A drive signal was applied to the thus-obtained LCD device (4V was applied across the liquid crystal layer) to evaluate the display characteristics.

The results of the visual angle—contrast characteristics were substantially the same as those shown in FIG. 11. The viewing angle characteristics in the transparent display were roughly symmetric in all directions, the range CR>10 was as large as up to ±80°, and the transmission contrast was as high as 300:1 or more at the front.

As for the characteristics of the reflection display, the reflectance evaluated with a spectral calorimeter (CM2002 from Minolta Co., Ltd.) was about 8.3% (value in terms of the aperture ratio of 100%) with respect to a standard diffuse plate as the reference. The contrast value of the reflection display was 20, which was high compared with the case of the conventional LCD devices.

It was also found that the roughness in a grayscale level (level 2 in the eight levels of grayscale) was improved. The grayscale response time (the time required to change from level 3 to level 5 in the eight levels of grayscale) was 30 msec. These characteristics were equal to or higher than those of a conventional ECB mode LCD device using a liquid crystal material having positive dielectric anisotropy.

The alignment distorted when the display panel was pressed with a finger during application of 4V (white display) was recovered immediately after the pressing was stopped. Thus, the center axis was effectively fixed in the depressions regularly formed roughly in the center of liquid crystal domains in the pixels, and the alignment stability in the axisymmetrically aligned domains was improved with the wall structure formed to substantially surround each pixel and also with the pixel electrode and the vertical alignment film formed on the crater-shaped surface continuous from the side faces of the wall structure surrounding the pixel toward the center of the pixel.

In the case of having no crater-shaped cross section, the contrast ratio failed to reach 300:1, or alignment distortion with pressing occurred, in some cases, if the tilt angle of the side face of the wall structure exceeded 45°.

EXAMPLE 2

Prototype samples (1 to 6) of transflective LCD devices having the structure shown in FIG. 9 were fabricated in substantially the same process as that described in Example 1. Table 1 below shows the shape factors of the depressions and the panel characteristics for the samples.

Preferred conditions for the ratio of the maximum inner diameter/width Dc (μm) to the pixel shorter side pitch Ps (μm) (Dc/Ps) and the ratio of the depth h (μm) of the depressions to the thickness Id of the interlayer insulating film (flat portion in each pixel) (h/Id) were examined.

As the liquid crystal panel characteristics, shown are the evaluation results of the transmittance during application of 4V under the reference backlight illumination (2000 cd/m$^2$) and the front contrast ratio and the shock resistance during application of 4V.

In the transmittance, the set value and the lower-limit allowance were 4.0% and 3.6%, respectively. In the front contrast ratio, the set value and the lower-limit allowance were 300 and 270, respectively. In the shock resistance evaluation, the time required to recover the original alignment (return to the original alignment state) after pressing the panel with a force of 1 kgf/cm$^2$ was evaluated. The mark ○ represents the case that the normal alignment was restored from faulty alignment within one minute, the mark Δ represents the case that the normal alignment was restored in the time exceeding one minute but within five minutes, and the mark × represents the case that alignment distortion remained after the lapse of ten minutes.

TABLE 1

|          | Dc/Ps | h/Id | Transmittance (%) | Front CR | Shock resistance |
|----------|-------|------|-------------------|----------|------------------|
| Sample 1 | 0.1   | 0.4  | 4.2               | 315      | Δ                |
| Sample 2 | 0.1   | 0.6  | 4.0               | 305      | ○                |
| Sample 3 | 0.38  | 0.6  | 3.7               | 270      | ○                |
| Sample 4 | 0.43  | 0.6  | 3.3               | 260      | ○                |
| Sample 5 | 0.1   | 0.75 | 3.6               | 270      | ○                |
| Sample 6 | 0.1   | 0.85 | 3.4               | 245      | ○                |

As is found from the results of Table 1, with increase of the maximum inner diameter/width Dc and depth h of the depressions placed roughly in the center of the liquid crystal domains in the pixels, the effective aperture ratio decreases and thus the transmittance decreases. Also, since the liquid crystal molecules existing near the side faces of the depressions tilt, light leakage occurs easily and thus the front CR tends to decrease. As for the shock resistance, alignment was recovered from the failure due to pressing of the panel with a force within five minutes in the examples shown in Table 1. It was therefore confirmed that the placement of the depressions in this embodiment gave a great effect. The roughness of display was also improved.

COMPARATIVE EXAMPLE 1

An ECB mode homogeneously aligned liquid crystal display panel having substantially the same construction as the liquid crystal panels of the above examples was fabricated. The liquid crystal display panel of Comparative Example 1 has neither a wall structure nor openings/cuts of the pixel electrodes. Also, in the liquid crystal display panel of Comparative Example 1, horizontal alignment films were formed in place of the vertical alignment films in the liquid crystal panels of the examples, and a liquid crystal material having positive dielectric anisotropy (Δn: 0.07, Δ∈: 8.5) was injected in the liquid crystal layer to form a homogeneously aligned liquid crystal layer. The thickness dt of the liquid crystal layer in the transmission regions was 4.3 μm, and the thickness dr thereof in the reflection regions was 2.3 μm.

Optical films each formed of a plurality of optical layers including a polarizing plate and a phase plate such as a quarter wave plate were placed on both surfaces of the liquid crystal display panel, to obtain an LCD device of Comparative Example 1.

A drive signal was applied to the LCD device of Comparative Example 1 (4V was applied across the liquid crystal layer) to evaluate the display characteristics by the same evaluation method as that described in the above examples.

As the viewing angle characteristics in the transmission display, the range of CR>10 was up to ±30°, and reverse gradation was eminent. The transmission contrast was 140:1. As for the characteristics of the reflection display, the reflectance was about 9.3% (value in terms of the aperture ratio of 100%) with respect to a standard diffuse plate as the reference. The contrast value of the reflection display was 8, and the display image was white-blurred and low in contrast compared with the above examples of the vertical alignment mode.

As described above, in the LCD devices in the third aspect of the present invention, in which the vertical alignment mode is applied to transmission display and reflection display, a good contrast ratio can be obtained both in the transmission display and the reflection display, compared with the conventional homogeneously aligned LCD devices and the conventionally known technologies.

In addition, in the embodiments in the third aspect of the present invention, the alignment regulating structure for liquid crystal domains (the wall structure, openings and/or cuts) is placed only on one substrate (in the illustrated examples, the active matrix substrate). Moreover, the wall structure can be formed integrally with the interlayer insulating film and also formed in a series of steps combined with the formation of fine projections and depressions in the reflection portions and the formation of the contact holes. This simplifies the fabrication process. With the alignment regulating forces of the wall structure, the openings and/or cuts, the directions in which liquid crystal molecules fall during voltage application can be regulated in a non-rubbing process. As exemplified in the embodiments in the third aspect of the present invention, by providing the alignment regulating structure for liquid crystal domains, a plurality of liquid crystal domains each exhibiting axisymmetric alignment during voltage application are formed for each pixel, and thus all-direction wide viewing angle characteristics can be attained.

In the embodiment described above, axisymmetrically aligned domains were formed for the LCD device having a vertically aligned liquid crystal layer. The present invention is also applicable to an MVA type LCD device as that described in Japanese Laid-Open Patent Publication No. 11-242225, for example, by changing the shape and placement of the depressions formed on the interlayer insulating film.

Next, LCD devices of embodiments in the fourth aspect of the present invention will be described with reference to the relevant drawings.

First, the mechanism of formation of radial tilt alignment in an LCD device of the present invention will be described with reference to FIGS. 31A, 31B, 32, 33A, 33B, 34A and 34B.

Figure 31A:
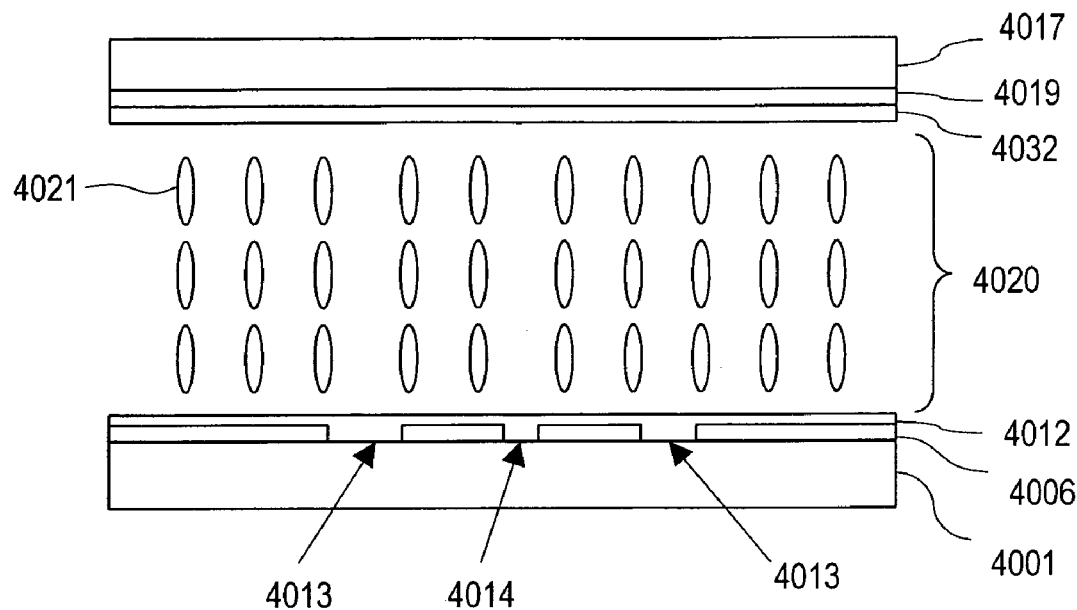
Figure 31B:
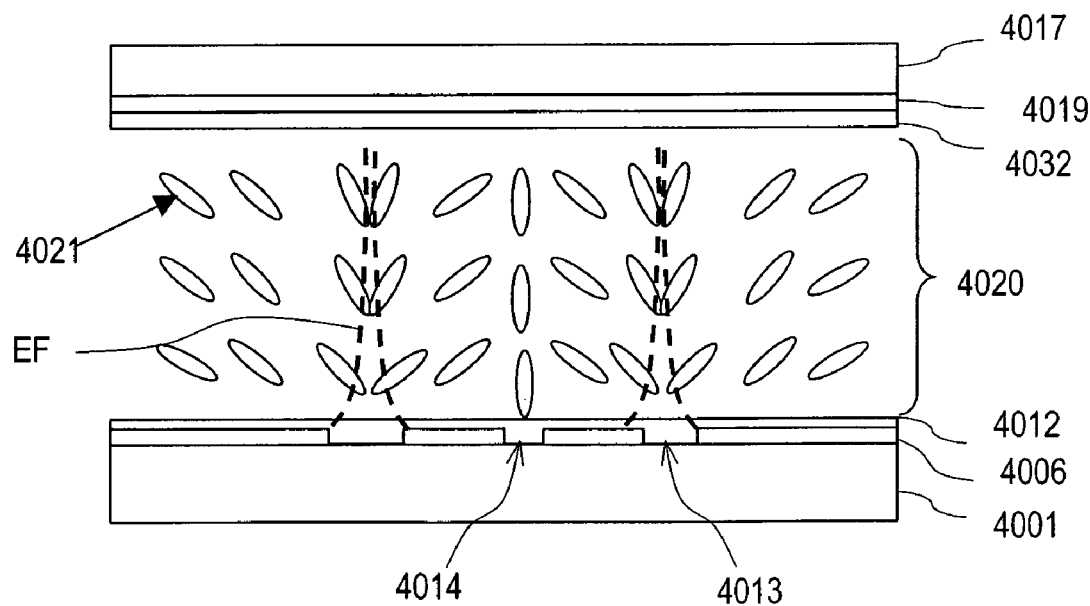
Figure 32:
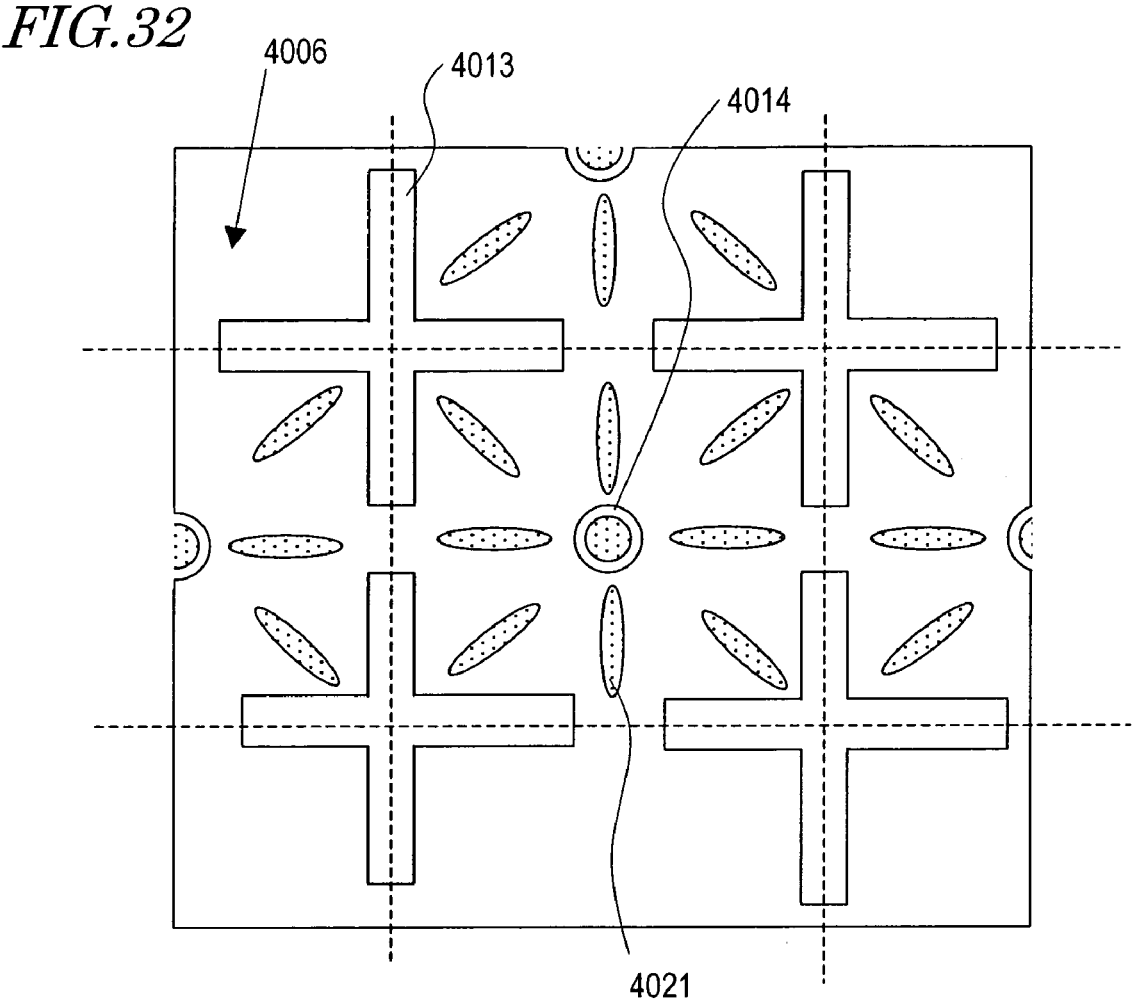
FIG. 32 is a plan view diagrammatically showing the aligned state of liquid crystal molecules during voltage application, for demonstrating the operation principle of the LCD devices according to the fourth aspect of the present invention.

FIGS. 31A and 31B are views for demonstrating the action of the alignment regulating force of first and second openings 4014 and 4013 formed in a pixel electrode 4006, in which the aligned states of liquid crystal molecules during non-voltage application (FIG. 31A) and during voltage application (FIG. 31B) are diagrammatically shown. The state shown in FIG. 31B is for display of a grayscale level. FIG. 32 is a diagrammatic view, observed in the direction normal to the substrate plane (plan view), of the aligned state of liquid crystal molecules in grayscale display, representing part of one pixel.

The LCD device shown in FIGS. 31A and 31B includes the pixel electrode 4006 having the first openings 4014 and the second openings 4013 and an alignment film 4012 formed in this order on a transparent substrate 4001. The LCD device also includes a counter electrode 4019 and an alignment film 4032 formed in this order on another transparent substrate 4017. A liquid crystal layer 4020 interposed between the two substrates includes liquid crystal molecules 4021 having negative dielectric anisotropy.

As shown in FIG. 31A, during non-voltage application, the liquid crystal molecules 4021 are aligned roughly vertical to the substrate surface with the alignment regulating force of the vertical alignment films 4012 and 4032. Although omitted in FIG. 31A for simplification, the vertical alignment film 4012 are depressed at portions located above the first and second openings 4014 and 4013, and the liquid crystal molecules 4021 existing near the depressions of the vertical alignment film 4012 are aligned roughly vertical to the side faces of the depressions. In the illustrated example, as shown in FIG. 32, four second openings 4013 each composed of rectangular portions arranged in the shape of a cross are provided, and one first opening 4014 in the shape of a circle is provided roughly in the center of the four second openings 4013. In other words, the four second openings 4013 are arranged roughly point-symmetrically with respect to the first opening 4014. A plurality of such combinations, each composed of one first opening 4014 and four second openings 4013, are formed in the pixel electrode 4006.

As shown in FIG. 31B, during voltage application, since the liquid crystal molecules 4021 having negative dielectric anisotropy attempt to make their major axes vertical to electric lines of force EF, the directions in which the liquid crystal molecules 4021 fall are defined with a tilt electric field generated around the first and second openings 4014 and 4013. With the cross-shaped second openings 4013 placed as shown in FIG. 32, an axisymmetrically aligned (also called a "radially inclined alignment") liquid crystal domain is formed in the region substantially surrounded with the four openings 4013. In the axisymmetrically aligned liquid crystal domain, liquid crystal directors point in all directions (directions in the substrate plane), and thus, excellent viewing angle characteristics are obtained. The first opening 4014 acts to fix/stabilize the center axis of the radial tilt alignment.

Figure 33A:
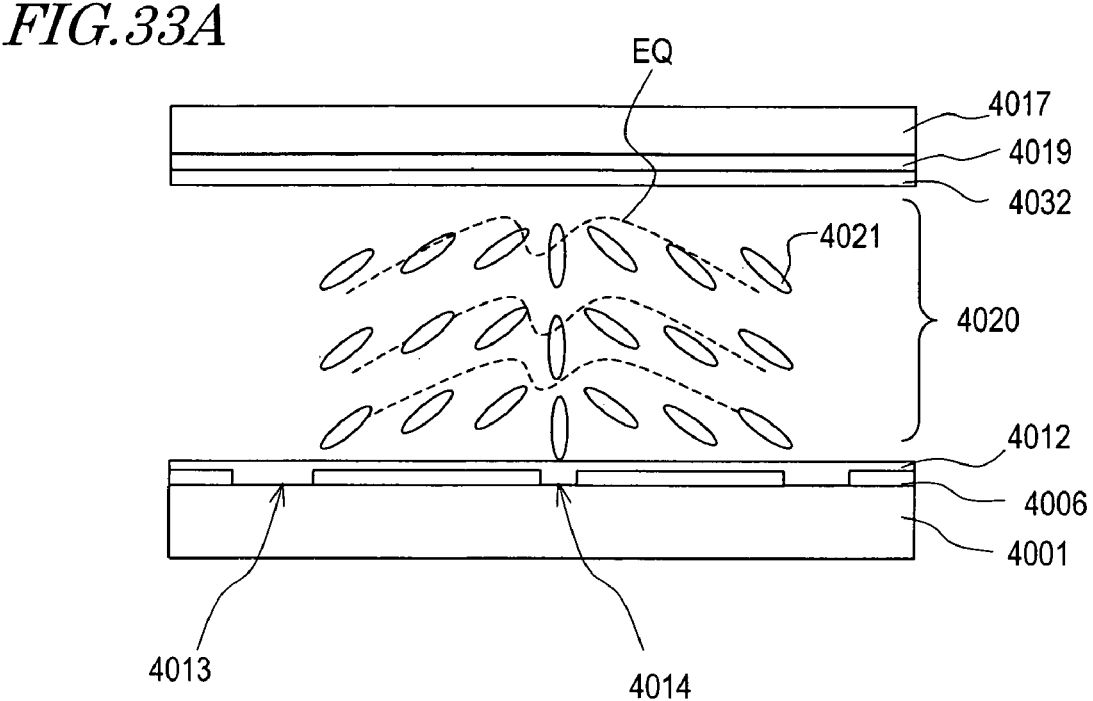
FIGS. 33A and 33B are diagrammatic views for demonstrating the action of a first opening provided in an LCD device of an embodiment in the fourth aspect of the present invention, showing the alignment of liquid crystal molecules observed when a first opening is provided (FIG. 33A) and when no first opening is provided (FIG. 33B).
Figure 33B:
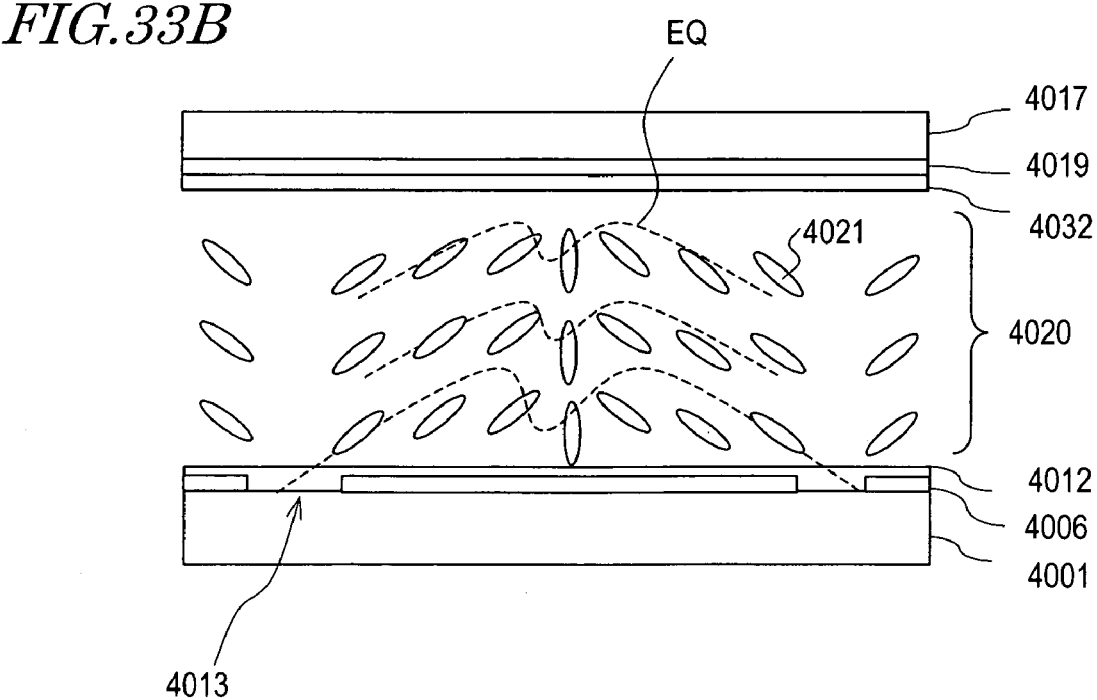

The action of the first opening 4014 will be described with reference to FIGS. 33A and 33B. FIGS. 33A and 33B are views diagrammatically illustrating the aligned states of the liquid crystal molecules 4021 in grayscale display observed when the first opening 4014 is provided in the center of the region surrounded with the second openings 4013 (FIG. 33A) and when no first opening is provided but only the second openings 4013 are formed.

Referring first to FIG. 33B, with a tilt electric field generated around the second openings 4013, the liquid crystal molecules 4021 existing near the four second openings 4013 (only two second openings 4013 are shown in FIG. 33B) first start to tilt. The tilting of the liquid crystal molecules 4021 propagates from the vicinities of the four second openings 4013 toward the center position (position at which the first opening 4014 is formed in FIG. 32), resulting in formation of a region in which the liquid crystal molecules 4021 remain aligned vertically (discontinuous region) near the center position. Since the liquid crystal molecules 4021 have dielectric anisotropy, equipotential lines EQ formed in the liquid crystal layer 4020 are distorted according to the distribution of the alignment of the liquid crystal molecules 4021. Specifically, the equipotential lines EQ have a distortion (depression) in the region of the vertically aligned liquid crystal molecules 4021. However, this depression in the equipotential lines EQ is unstable because the depression is formed from the discontinuity of alignment that occurs due to the competitiveness among the aligned states of the liquid crystal molecules 4021 originating from the tilt electric fields generated near the four second openings 4013. The position at which the region of the vertically aligned liquid crystal molecules 4021 is formed is not fixed.

On the contrary, as shown in FIG. 33A, with placement of the first opening 4014 in the center of the region surrounded with the four second openings 4013 (see FIG. 32), a tilt electric field is also generated near the first opening 4014, allowing formation of the depression of the equipotential lines EQ in the region corresponding to the first opening 4014. Accordingly, the center axis of the axisymmetric alignment is stabilized in or near the first opening 4014.

Figure 34A:
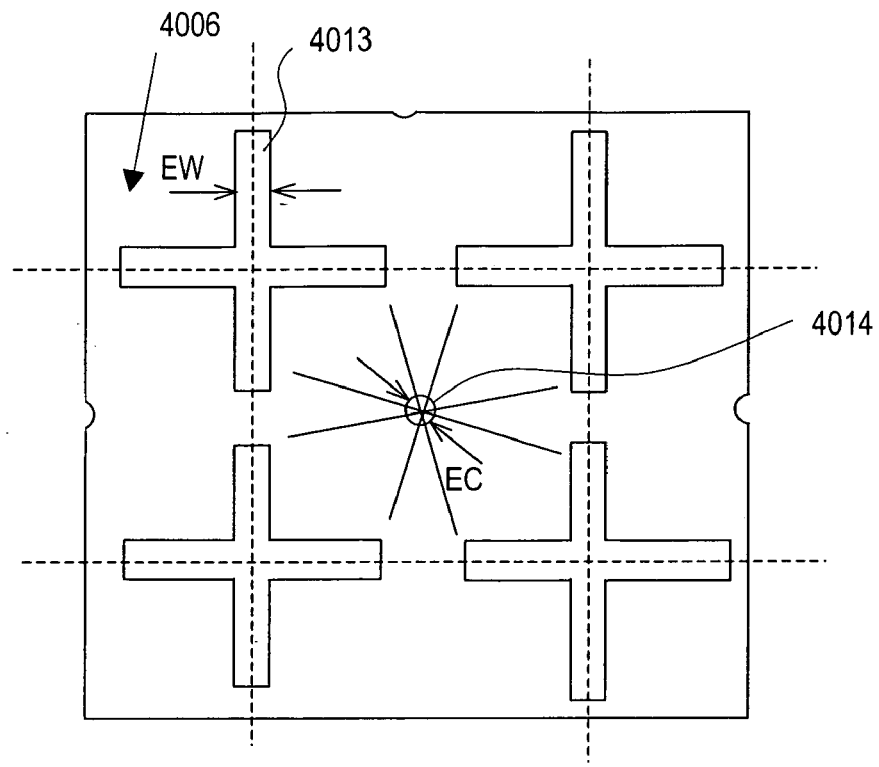
Figure 34B:
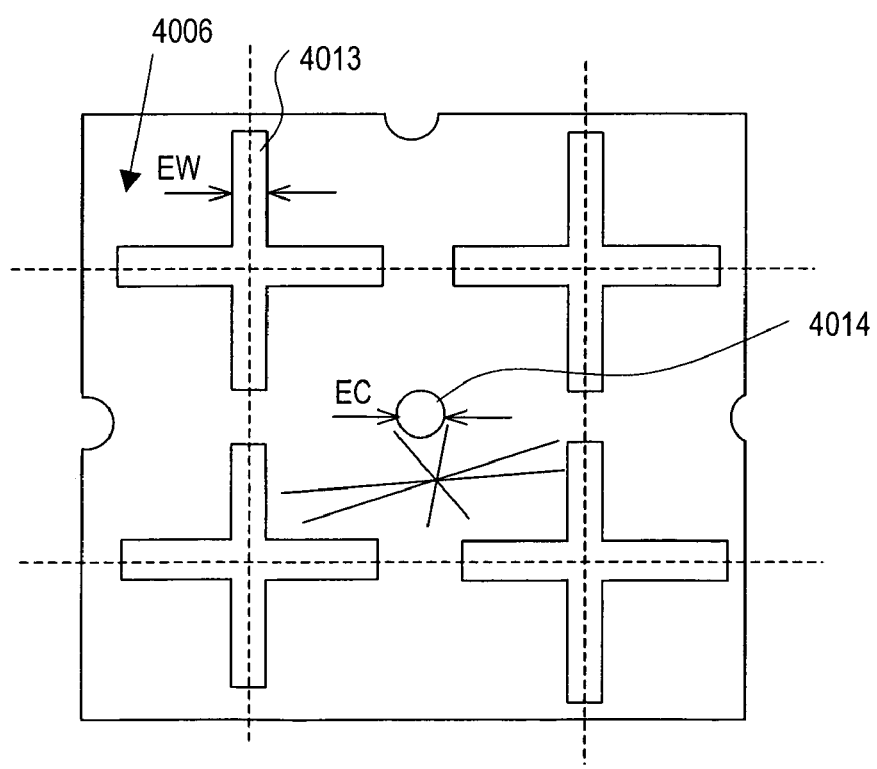

The width EW of the rectangular portions of the second openings 4013 should preferably be made greater than the width EC of the first opening 4014. The reason for this will be described with reference to FIGS. 34A and 34B. The four straight lines intersecting one another at one center in FIGS. 34A and 34B represent an extinction pattern observed when a pixel in a grayscale display state is viewed under crossed nicols. The intersection point of the four straight lines represents the center of the axisymmetric alignment.

When the width EW of the second openings 4013 is equal to the width EC of the first opening 4014 as shown in FIG. 34B, the depth of a depression of the equipotential lines formed with the second openings 4013 is about the same as that of a depression of the equipotential lines formed with the first opening 4014, and this results in formation of the center of the axisymmetric alignment somewhere between any of the second openings 4013 and the first opening 4014. On the contrary, when the width EW of the second openings 4013 is greater than the width EC of the first opening 4014 as shown in FIG. 34A, the depth of a depression of the equipotential lines formed with the second openings 4013 is greater than that of a depression of the equipotential lines formed with the first opening 14, indicating that the alignment regulating force of the second openings 4013 wins superiority over that of the first opening 4014. This results in stable formation of the center of the axisymmetric alignment at the first opening 4014 formed in the center of the region surrounded with the four second openings 4013.

The display characteristics of an LCD device have viewing angle dependence due to the alignment of the liquid crystal molecules. To reduce the viewing angle dependence of the display characteristics, liquid crystal molecules in each pixel are preferably aligned in all directions with equal probabilities. In view of this, the first opening 4014 preferably has such a shape that gives the resultantly formed liquid crystal domain an aligned state in which liquid crystal molecules in each pixel region can be aligned in all directions with equal probabilities. The shape of the first opening 4014 preferably has rotation symmetry as viewed in the direction normal to the substrate plane. Specifically, the shape preferably has two or higher-fold rotation symmetry, more preferably rotation symmetry as high as four or higher-fold rotation symmetry (for example, square and circular shapes). For the same reason, the second openings 4013 are preferably placed point-symmetrically with respect to the first opening 4014.

The width EC of the first opening 4014 is preferably 4 μm or less. If the width EC of the first opening 4014 is greater than 4 μm, a deviation of about 4 μm will be produced in the center position of the axis of the axisymmetrically aligned domain, and thus roughness of display due to the deviation of the center axis will tend to be visually recognized. Such roughness can be made less noticeable by setting the width EC of the first opening 4014 at 4 μm or less.

Figure 35A:
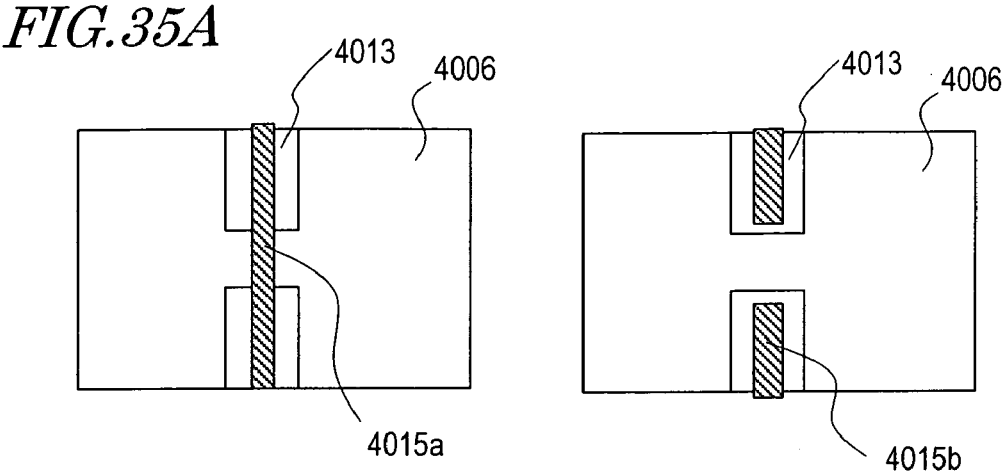
FIGS. 35A to 35C are view for demonstrating preferred placements of cuts 4013 and a wall structure 4015 in LCD devices according to the fourth aspect of the present invention.

In the illustrated example, the second openings 4013 were formed to provide regions free from the electrode film inside the pixel electrode 4096. Alternatively, such regions may be provided in the form of cuts formed in the periphery of the pixel electrode 4006. Since a tilt electric field is also generated in the periphery of the pixel electrode 4006, outer edges of an axisymmetrically aligned domain can be defined by placing such cuts. For example, as shown in FIG. 35A, cuts 4013 may be formed at positions roughly bisecting the pixel electrode 4006 in the length direction. Two axisymmetrically aligned domains are formed in the pixel shown in FIG. 35A with tilt electric fields generated at the pair of cuts 4013 and at the edges of the pixel electrode 4006. In FIG. 35A, the first opening 4014 is omitted for simplification.

Figure 35B:
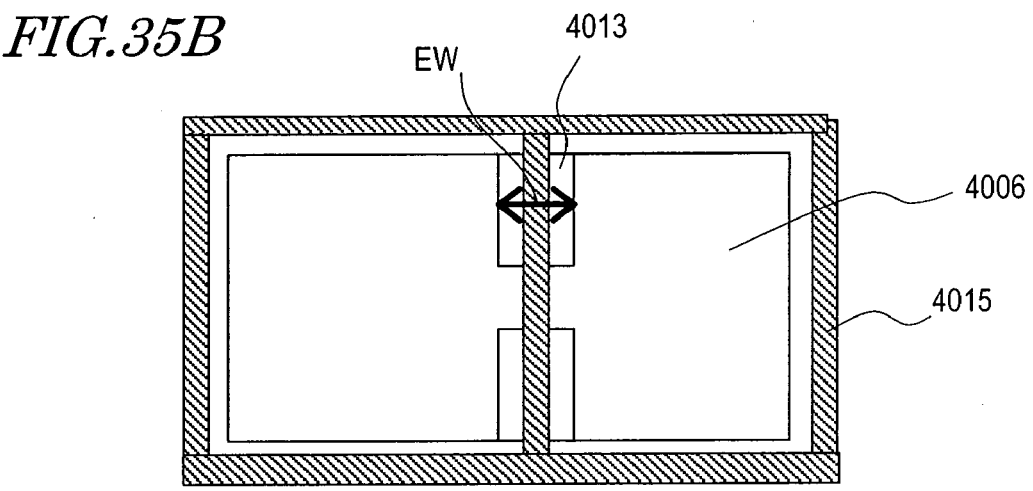

Next, referring to FIGS. 35A to 35C, a case of further providing a wall structure 4015 as an alignment regulating structure will be described. FIGS. 35A and 35B are plan views illustrating examples of placement of the wall structure 4015 (4015a, 4015b) adopted for the case that the pair of rectangular cuts 4013 are formed near the center of the pixel electrode 4006. Note that the following description will also apply for the case of forming the second openings 4013 in the pixel electrode 4006 in place of the cuts 4013 in the illustrated example (see FIG. 32, for example).

Figure 35C:
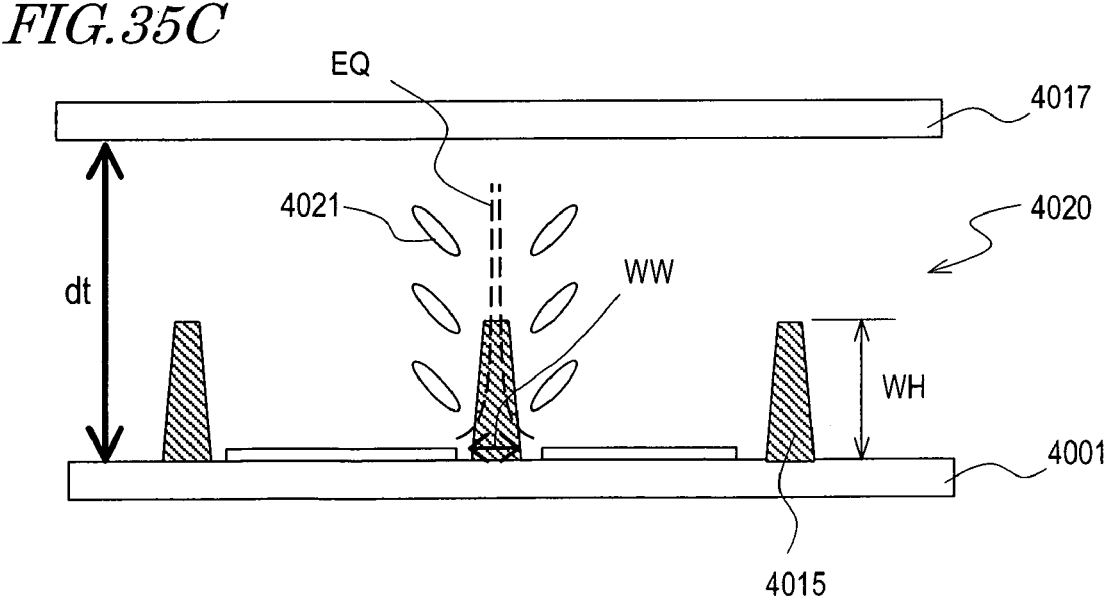

As shown in FIG. 35C, the wall structure 4015 has sloped side faces (wall faces). With the alignment regulating force (anchoring effect) of the side slopes (precisely, a vertical alignment film formed on the side slopes), the directions in which liquid crystal molecules in the vertically aligned liquid crystal layer tilt with an electric field are defined. Therefore, with the formation of the wall structure 4015 together with the cuts 4013 as illustrated, the alignment regulating force with the tilt electric field generated near the cuts 4013 during voltage application and the alignment regulating force of the wall structure 4015 cooperatively define the directions in which liquid crystal molecules tilt, and thus the axisymmetric alignment can be further stabilized. Moreover, while the alignment regulating force with the tilt electric field is weak when the voltage is low, the alignment regulating force of the wall structure 4015 is voltage-independent. The wall structure 4015 therefore exerts its alignment regulating force even in a grayscale display state and thus stably defines the directions of tilt of liquid crystal molecules. As a result, the display quality in grayscale display can be improved.

The wall structure 4015 is preferably formed to have first wall portions located in the rectangular portions of the cuts 4013, to thereby allow the liquid crystal molecules to tilt in the same direction as the direction of the tilt electric field generated around the cuts 4013. For example, the wall structure 4015b may be formed only in the cuts 4013 as shown in the right part of FIG. 35A, or the wall structure 4015a may extend to connect the portions of the wall structure formed in the cuts 4013 as shown in the left part of FIG. 35A. In other words, the wall structure 4015 may be placed like a dotted line or a solid line as viewed in the direction normal to the substrate plane.

A preferred example of placement of the wall structure 4015 in the rectangular cuts 4013 to extend along the length of the cuts 4013 will be described with reference to FIGS. 35B and 35C.

The width EW of the rectangular cuts 4013 (cut width EW) (FIG. 35B) and the width WW of the wall structure 4015 should preferably satisfy the relationship 0.6

EW<WW<0.9 EW. If 0.6 EW>WW, the alignment regulating force of the wall structure 4015 will exert a reduced effect on the liquid crystal domains in the electrode regions, and this will make it difficult to stabilize the liquid crystal domains in the pixel electrode regions. If WW>0.9 EW, failing to place the wall structure 4015 inside the cuts 4013 (misalignment) may occur due to an alignment error in the fabrication process. In such a case, light leakage may occur in the black display state because liquid crystal molecules existing near the side faces of the wall structure 4015 are tilted from their vertically aligned state.

The cut width EW should preferably satisfy the relationship 1.8 dt<EW<2.5 dt with the thickness dt of the liquid crystal layer in the transmission region. To ensure stable alignment for each pixel with a tilt electric field generated during voltage application, the cut width EW should be made large with respect to the thickness dt of the liquid crystal layer, so that the equipotential lines are sufficiently distorted in the region free from an electrode film, to thereby prevent continuation of the aligned state over the pixel.

If the cut width EW is made excessively large, the display portion in one pixel becomes small and thus the region in which the display state changes upon voltage application is disadvantageously reduced. When the thickness dt of the liquid crystal layer is made small, the electric field, that is, the unit V/μm becomes large, and thus the change amount of the electric field per unit thickness increases. This provides substantially the same effect as that obtained by increasing the cut width EW. That is to say, to ensure formation of good axisymmetrically aligned domains for each pixel with a given cell thickness (thickness of the liquid crystal layer) and also to increase the effective aperture ratio (ratio of the area substantially contributable to display to the pixel area) as much as possible, the cut width EW and the thickness dt of the liquid crystal layer in the transmission region preferably satisfy the relationship 1.8 dt<EW<2.5 dt. if 1.8 dt>EW, the electric field per unit thickness is weak, failing to stabilize the axisymmetric alignment of liquid crystal molecules in the pixel and resulting in variations in the center position of the axisymmetric alignment among a plurality of pixels in some cases. If EW>2.5 dt, the cuts 4013 are excessively large with respect to the proper thickness of the liquid crystal layer, resulting in reduction of the effective aperture ratio.

The height WH of the wall structure 4015 should preferably satisfy the relationship 0.25 dt<WH<0.4 dt with the thickness dt of the liquid crystal layer in the transmission region. If WH<0.25 dt, the alignment regulating force of the wall structure 4015 is weak, failing to obtain a stable aligned state. If WH>0.4 dt, the wall structure 4015 placed regularly on the pixel electrode may block smooth injection of a liquid crystal material into the space between the substrate (active matrix substrate) 4001 and the substrate (counter substrate) 4017, causing longer time to be taken to inject the liquid crystal material. This also increases the possibility of having regions incomplete in injection. In particular, in a transflective LCD device, in which the thickness dr of the liquid crystal layer in the reflection region (see FIGS. 36A and 36B or FIGS. 38A and 38B, for example) is set at roughly a half of the thickness dt of the liquid crystal layer in the transmission region for optimum optical design, injection of a liquid crystal material into the reflection region may hardly be allowed. In view of the above, the relationship 0.25 dt<WH<0.4 dt should preferably be satisfied.

In the example described above, the wall structure 4015 was placed to correspond to the cuts 4013. Alternatively, as shown in FIG. 35B, the wall structure 4015 may be placed to extend in the region surrounding the pixel electrode 4006. The region surrounding the pixel electrode 4006 is a shading region non-contributable to display in which a TFT, gate and source signal lines, for example, are formed, or a black matrix is formed on the counter substrate. Therefore, the wall structure 4015 formed in this region is free from affecting display.

The wall structure 4015 may be formed to substantially surround a region including each liquid crystal domain (this region is also called a "sub-pixel"). If the wall structure 4015 is not formed for each sub-pixel, the center position of the axisymmetric alignment of the liquid crystal domain will not be maintained stably and may vary among the plurality of pixels because the alignment regulating force of the cuts 4013 is not sufficient when the voltage is low. In particular, in a transflective LCD device, cuts (or second openings) should preferably be formed at least between the transmission region and the reflection region. In addition, the wall structure 4015 should preferably be formed. If the wall structure 4015 is not formed between the transmission region and the reflection region, the alignment regulating force on the side of a region having the wall structure 4015 is stronger than that on the side of the other region, resulting in that the center position of the axisymmetric alignment may be deviated from the center of the sub-pixel region in the transmission region or the reflection region.

Figure 38A:
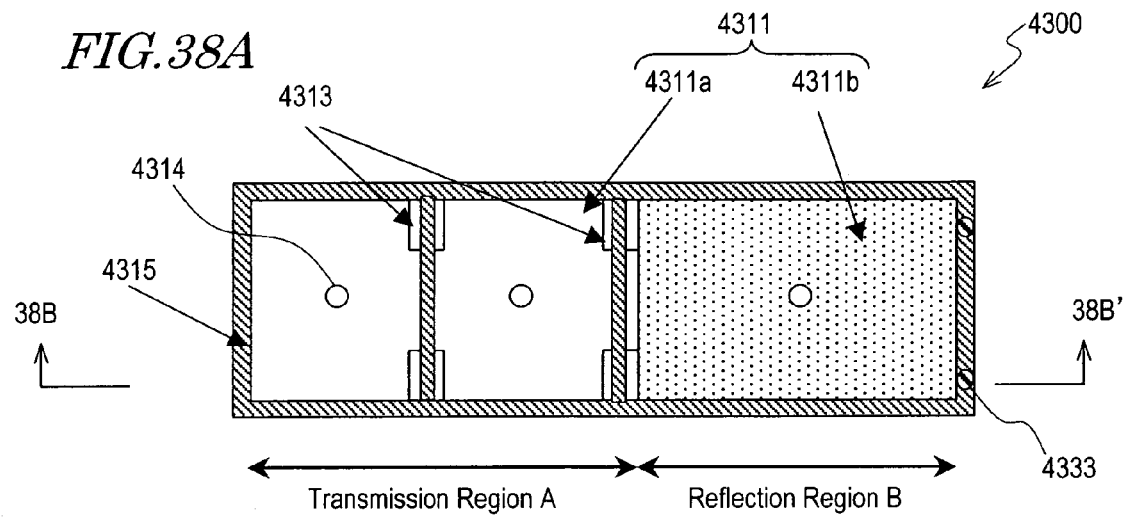
Figure 38B:
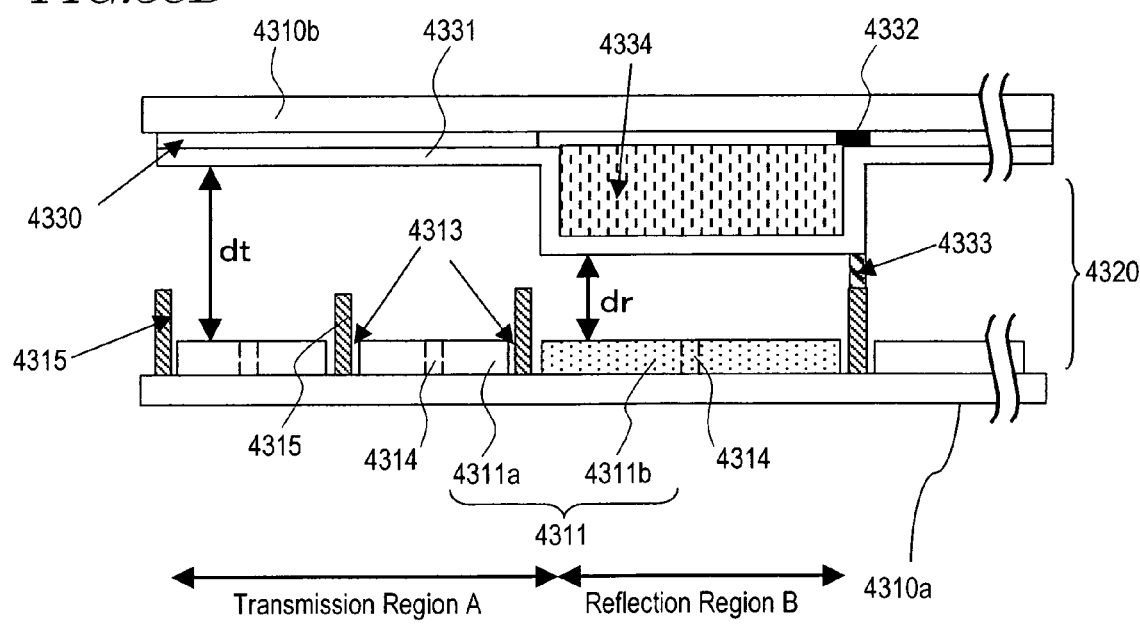

The LCD device of an embodiment in the fourth aspect of the present invention has the construction shown in FIG. 9, for example. As the liquid crystal panel 1050, one having the same construction as that of an LCD device 4200 to be described later with reference to FIG. 38A and 38B is used.

Transmissive LCD Device

Figure 36A:
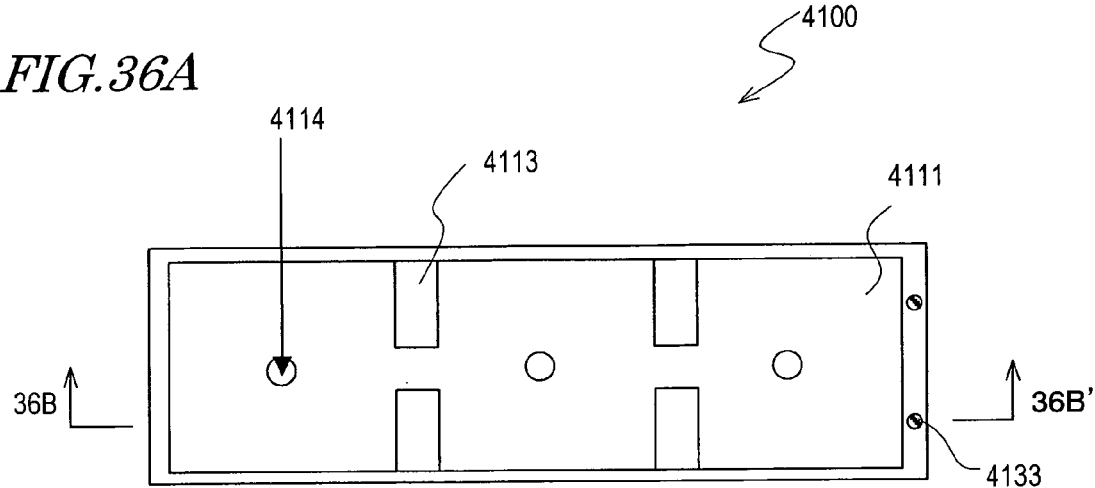
Figure 36B:
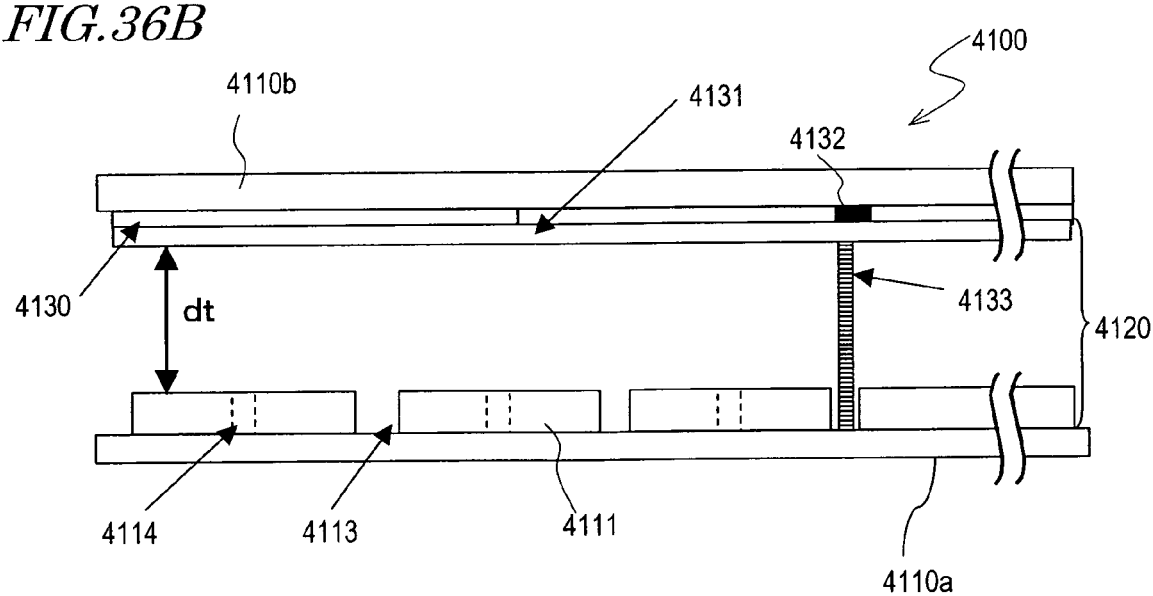

A transmissive LCD device 4100 of an embodiment in the fourth aspect of the present invention will be described with reference to FIGS. 36A and 36B. FIGS. 36A and 36B diagrammatically show one pixel of the transmissive LCD device 4100, in which FIG. 36A is a plan view and FIG. 36B is a cross-sectional view taken along line 36B-36B' in FIG. 36A.

The LCD device 4100 includes a transparent substrate (for example, a glass substrate) 4110a, a transparent substrate 4110b placed to face the transparent substrate 4110a, and a vertically aligned liquid crystal layer 4120 interposed between the transparent substrates 4110a and 4110b. Vertical alignment films (not shown) are formed on the surfaces of the substrates 4110a and 4110b facing the liquid crystal layer 4120. During non-voltage application, therefore, liquid crystal molecules in the liquid crystal layer 4120 are aligned roughly vertical to the surfaces of the vertical alignment films. The liquid crystal layer 4120 includes a nematic liquid crystal material having negative dielectric anisotropy and also includes a chiral agent as required.

The LCD device 4100 further includes pixel electrodes 4111 formed on the transparent substrate 4110a and a counter electrode 4131 formed on the transparent substrate 4110b. Each pixel electrode 4111, the counter electrode 4131 and the liquid crystal layer 4120 interposed between these electrodes define a pixel. In the illustrated example, both the pixel electrodes 4111 and the counter electrode 4131 are formed of a transparent conductive layer (for example, an ITO layer). Typically, color filters 4130 (the entire of the plurality of color filters may also be called a color filter layer 4130) provided for the respective pixels, as well as a black matrix (shading layer) 4132 formed in the gaps between the adjacent color filters 4130, are formed on the surface of the transparent substrate 4110b facing the liquid crystal layer

4120, and the counter electrode 4131 is formed on the color filters 4130 and the black matrix 4132. Alternatively, the color filters 4130 and the black matrix 4132 may be formed on the counter electrode 4131 (on the surface thereof facing the liquid crystal layer 4120).

The pixel electrode 4111 has four cuts 4113 formed at predetermined positions, which are in the form of two pairs of cuts 4113 dividing the pixel electrode 4111 into three roughly equal parts. A first opening 4114 is formed roughly in the center of each of the three regions nearly separated from one another with the two pairs of cuts 4113.

When a predetermined voltage is applied across the liquid crystal layer, three liquid crystal domains each having axisymmetric alignment are formed in the three regions nearly separated with the two pairs of cuts (four cuts) 4113, with the center axes of the axisymmetric alignment of the three liquid crystal domains being fixed/stabilized with the respective first openings 4114.

Supports 4133 for defining the thickness dt of the liquid crystal layer 4120 (also called the cell gap) are preferably formed in the shading region, to suppress/prevent degradation in display quality that may otherwise occur due to existence of the supports 4133. The supports 4133 can be formed by photolithography using a photosensitive resin, for example, and may be formed on either the transparent substrate 4110*a* or 4110*b*.

On the surface of the transparent substrate 4110*a* facing the liquid crystal layer 120, provided are active elements such as TFTs and circuit elements such as gate signal lines and source signal lines connected to TFTs (all of these elements are not shown). Herein, the transparent substrate 4110*a*, together with the circuit elements and the pixel electrodes 4111, the supports 4133, the alignment film and the like described above formed on the transparent substrate 4110*a*, are collectively called an active matrix substrate in some cases. Likewise, the transparent substrate 4110*b*, together with the color filter layer 4130, the black matrix 4132, the counter electrode 4131, the alignment film and the like formed on the transparent substrate 4110*b*, are collectively called a counter substrate or a color filter substrate in some cases.

Although omitted in the above description, the LCD device 4100 further includes a pair of polarizing plates placed to face each other via the transparent substrates 4110*a* and 4110*b*. The polarizing plates are typically placed so that their transmission axes are orthogonal to each other. The LCD device 4100 may further include a biaxial optical anisotropic medium layer and/or a uniaxial optical anisotropic medium layer as described above.

Figure 37A:
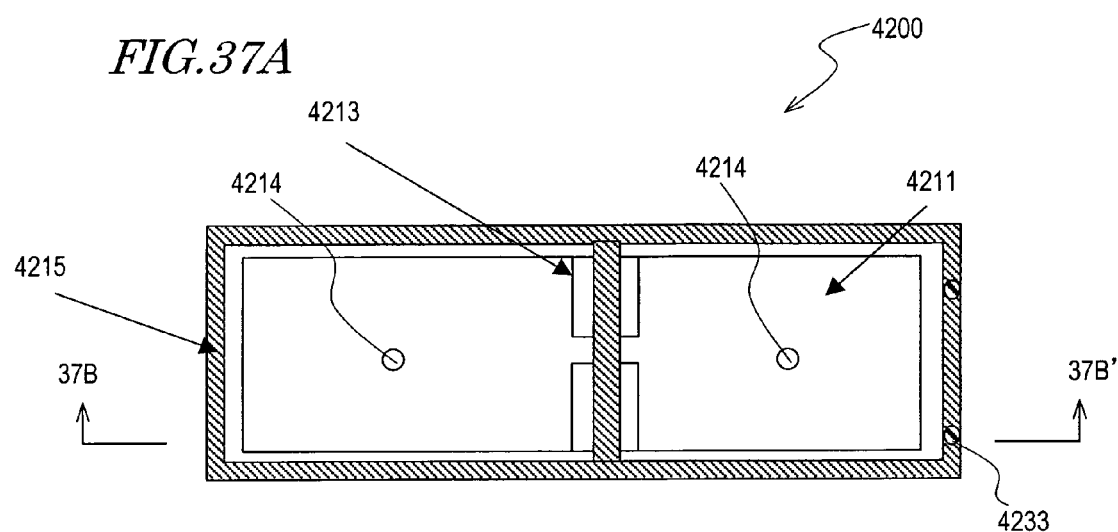
Figure 37B:
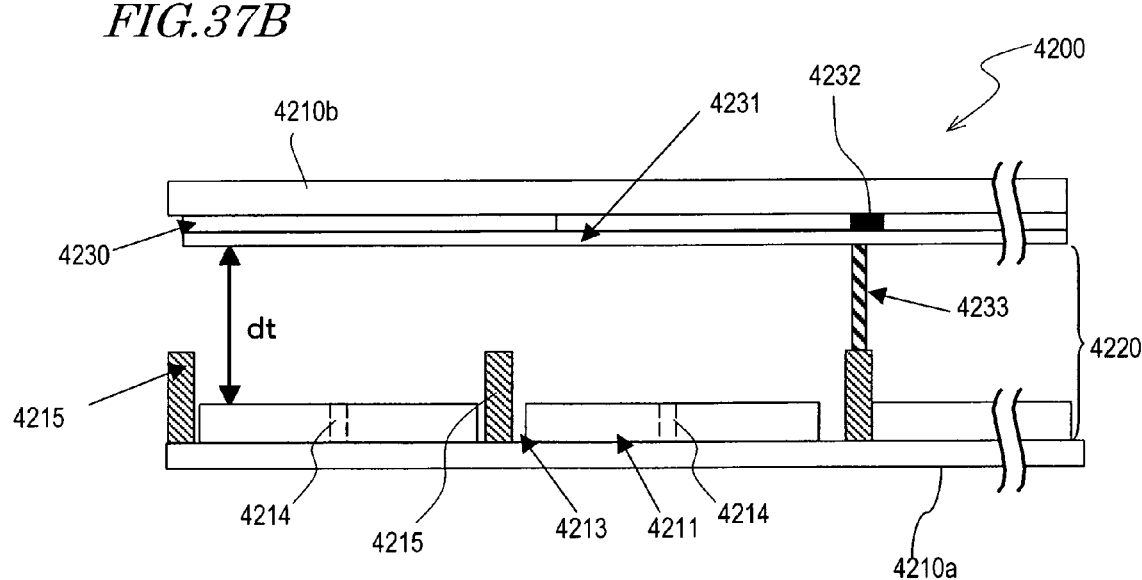

Another transmissive LCD device 4200 of this embodiment of the present invention will be described with reference to FIGS. 37A and 37B.

The LCD device 4200 includes pixel electrodes 4211 formed on a transparent substrate 4210*a* and a counter electrode 4231 formed on a transparent substrate 4210*b*. Each pixel electrode 4211, the counter electrode 4231 and a liquid crystal layer 4220 interposed between these electrodes define a pixel. In the illustrated example, both the pixel electrodes 4211 and the counter electrode 4231 are formed of a transparent conductive layer (for example, an ITO layer). Typically, color filters 4230 (the entire of the plurality of color filters may also be called a color filter layer 4230) provided for the respective pixels, as well as a black matrix (shading layer) 4232 formed in the gaps between the adjacent color filters 4230, that is, between the adjacent pixels are formed on the surface of the transparent substrate 4210*b* facing the liquid crystal layer 4220, and the counter electrode 4231 is formed on the color filters 4230 and the black matrix 4232. Alternatively, the color filters 4230 and the black matrix 4232 may be formed on the counter electrode 4231.

The pixel electrode 4211 has two cuts 4213 formed at predetermined positions, which are in the form of one pair of cuts 4213 dividing the pixel electrode 4211 into roughly equal two parts. A first opening 4214 is formed roughly in the center of each of the two regions nearly separated from each other with the pair of cuts 4213. Also, a wall structure 4215 is provided on the surface of the transparent substrate 4210*a* facing the liquid crystal layer 4220. The wall structure 4215 includes a wall portion surrounding the pixel electrode 4211, wall portions extending in the rectangular cuts 4213 along the length of the cuts, and a wall portion extending to connect the wall portions in the cuts 4213.

When a predetermined voltage is applied across the liquid crystal layer, two liquid crystal domains each having axisymmetric alignment are formed in the regions surrounded with the wall structure 4215. Although the wall structure 4215 is formed as a continuous wall in the illustrated example, it may otherwise be composed of a plurality of separate walls. The wall structure 4215, which serves to define the boundaries of the liquid crystal domains, should preferably have a length of some extent. For example, when the wall structure is composed of a plurality of walls, each wall is preferably longer than the gap between the adjacent walls.

Supports 4233 for defining the thickness dt of the liquid crystal layer 4220 (also called the cell gap) are preferably formed in the shading region, to suppress/prevent degradation in display quality that may otherwise occur due to existence of the supports. Although the supports 4233 are formed on the wall structure 4215 provided in the shading region in the illustrated example, the supports 4233 may be formed on either the transparent substrate 4210*a* or 4210*b*. In the case of forming the supports 4233 on the wall structure 4215, setting is made so that the sum of the height of the wall structure 4215 and the height of the supports 4233 is equal to the thickness dt of the liquid crystal layer 4220. If the supports 4233 are formed in a region having no wall structure 4215, setting is made so that the height of the supports 4233 is equal to the thickness dt of the liquid crystal layer 4220.

Transflective LCD Device

Next, a transflective LCD device 4300 of an embodiment in the fourth aspect of the present invention will be described with reference to FIGS. 38A and 38B. FIGS. 38A and 38B diagrammatically show one pixel of the transflective LCD device 4300, in which FIG. 38A is a plan view and FIG. 38B is a cross-sectional view taken along line 38B-38B' in FIG. 38A.

The LCD device 4300 includes a transparent substrate (for example, a glass substrate) 4310*a*, a transparent substrate 4310*b* placed to face the transparent substrate 4310*a*, and a vertically aligned liquid crystal layer 4320 interposed between the transparent substrates 4310*a* and 4310*b*. Vertical alignment films (not shown) are formed on the surfaces of the substrates 4310*a* and 4310*b* facing the liquid crystal layer 4320. During non-voltage application, therefore, liquid crystal molecules in the liquid crystal layer 4320 are aligned roughly vertical to the surfaces of the vertical alignment films. The liquid crystal layer 4320 includes a nematic liquid crystal material having negative dielectric anisotropy and also includes a chiral agent as required.

The LCD device 4300 further includes pixel electrodes 4311 formed on the transparent substrate 4310*a* and a counter electrode 4331 formed on the transparent substrate 4310*b*. Each pixel electrode 4311, the counter electrode 4331 and the liquid crystal layer 4320 interposed between these electrodes define a pixel. Circuit elements such as TFTs are formed on the transparent substrate 4310*a*. Herein, the transparent substrate 4310*a* and the components formed thereon are collectively called an active matrix substrate 4310*a* in some cases.

Typically, color filters 4330 (the entire of the plurality of color filters may also be referred to as a color filter layer 4330) provided for the respective pixels, as well as a black matrix (shading layer) 4332 provided in the gaps between the adjacent color filters 4330, are formed on the surface of the transparent substrate 4310*b* facing the liquid crystal layer 4320, and the counter electrode 4331 is formed on the color filters 4330 and the black matrix 4332. Alternatively, the color filters 4230 and the black matrix 4232 may be formed on the counter electrode 4331 (on the surface thereof facing the liquid crystal layer 4320). Herein, the transparent substrate 4310*b* and the components formed thereon are collectively called a counter substrate (color filter substrate) 4310*b* in some cases.

Each pixel electrode 4311 includes a transparent electrode 4311*a* formed of a transparent conductive layer (for example, an ITO layer) and a reflective electrode 4311*b* formed of a metal layer (for example, an Al layer, an Al-including alloy layer, and a multilayer film including any of these layers). Having such a pixel electrode, each pixel includes a transmission region A defined by the transparent electrode 4311*a* and a reflection region B defined by the reflective electrode 4311*b*, to provide display in the transmission mode and display in the reflection mode, respectively.

The pixel electrode 4311 has four cuts 4313 formed at predetermined positions, which are in the form of two pairs of cuts 4313 dividing the pixel electrode 4311 into three roughly equal parts. A first opening 4314 is formed roughly in the center of each of the three regions nearly separated from one another with the two pairs of cuts 4313.

A wall structure 4315 is formed on the surface of the transparent substrate 4310*a* facing the liquid crystal layer 4320. The wall structure 4315 includes a wall portion surrounding each pixel electrode 4311, wall portions extending in the rectangular cuts 4313 along the length of the cuts, and a wall portion extending to connect the wall portions in the cuts 4313. Therefore, the pixel electrode 4311, which is surrounded with the wall structure 4315, is also divided into three regions with the wall structure 4315.

When a predetermined voltage is applied across the liquid crystal layer, three liquid crystal domains (two in the transmission region A and one in the reflection region B) each having axisymmetric alignment are formed in the three regions divided with the two pairs of cuts (four cuts) 4313 and the wall structure 4315. The cuts 4313 and the wall structure 4315 act to define the outer edges of the liquid crystal domains, and the centers of the axisymmetric alignment of the three liquid crystal domains are fixed/stabilized with the corresponding first openings 4314.

Although the wall structure 4315 is formed as a continuous wall in the illustrated example, it may otherwise be composed of a plurality of separate walls. The wall structure 4315, which serves to define the boundaries of the liquid crystal domains, should preferably have a length of some extent. For example, when the wall structure is composed of a plurality of walls, each wall is preferably longer than the gap between the adjacent walls.

In the example illustrated in FIGS. 38A and 38B, the transmission region A has two liquid crystal domains and the reflection region B has one liquid crystal domain. However, the arrangement is not limited to this. Each liquid crystal domain is preferably roughly square in shape from the standpoint of the viewing angle characteristics and the stability of alignment.

Supports 4333 for defining the thickness of the liquid crystal layer 4320 (also called the cell gap) are preferably formed in the shading region, to suppress/prevent degradation in display quality that may otherwise occur due to existence of the supports. The supports 4333 can be formed by photolithography using a photosensitive resin, for example. Although the supports 4333 are formed on the wall structure 4315 provided in the shading region in the illustrated example, the supports 4333 may be formed on either the transparent substrate 4310*a* or 4310*b*. In the case of forming the supports 4333 on the wall structure 4315, setting is made so that the sum of the height of the wall structure 4315 and the height of the supports 4333 is equal to the thickness dt of the liquid crystal layer 4320. If the supports 4333 are formed in a region having no wall structure 4315, setting is made so that the height of the supports 333 is equal to the thickness dt of the liquid crystal layer 320.

A preferred construction specific to the transflective LCD device 300 permitting both the transmission-mode display and the reflection-mode display will be described.

While light used for display passes through the liquid crystal layer 320 once in the transmission-mode display, it passes through the liquid crystal layer 320 twice in the reflection-mode display. Accordingly, as diagrammatically shown in FIG. 38B, the thickness dt of the liquid crystal layer 320 in the transmission region A is preferably set roughly double the thickness dr of the liquid crystal layer 320 in the reflection region B. By setting in this way, the retardation given to the light by the liquid crystal layer 4320 can be roughly the same in both display modes. Most preferably, dr=0.5 dt should be satisfied, but good display is secured in both display modes as long as 0.3 dt<dr<0.7 dt is satisfied. Naturally, dt=dr may be satisfied depending on the use.

In the LCD device 4300, a transparent dielectric layer 4334 is provided on the glass substrate 4310*b* only in the reflection region B to make the thickness of the liquid crystal layer 4320 in the reflection region B smaller than that in the transmission region A. This construction eliminates the necessity of providing a step by forming an insulating film and the like under the reflective electrode 4311*b*, and thus has an advantage of simplifying the fabrication of the active matrix substrate 4310*a*. If the reflective electrode 4311*b* is formed on such an insulting film provided to give a step for adjusting the thickness of the liquid crystal layer 4320, light used for transmission display will be shaded with the reflective electrode covering a slope (tapered face) of the insulating film, or light reflected from the reflective electrode formed on a slope of the insulating film will repeat internal reflection, failing to be effectively used even for reflection display. By adopting the construction described above, occurrence of such problems is prevented, and thus the light use efficiency can be improved.

If the transparent dielectric layer 4334 is provided with a function of scattering light (diffuse reflection function), white display close to good paper white can be realized without the necessity of providing the reflective electrode 4311*b* with the diffuse reflection function. Such white display close to paper white can also be realized by making the surface of the reflective electrode 4311*b* uneven, and in this case, no light scattering function is necessary for the transparent dielectric layer 4334. However, the uneven surface may fail to stabilize the position of the center axis of the axisymmetric alignment depending on the shape of the uneven surface. On the contrary, by combining the transparent dielectric layer 4334 having the light scattering function and the reflective electrode 4311*b* having a flat surface, the position of the center axis can be stabilized with the first opening 4314 formed in the reflective electrode 4311*b* more reliably. Note that in the case of making the surface of the reflective electrode 4311*b* uneven to provide the reflective electrode 4311*b* with the diffuse reflection function, the uneven shape is preferably a continuous wave shape to prevent occurrence of an interference color, and such a shape is preferably set to allow stabilization of the center axis of the axisymmetric alignment.

While light used for display passes through the color filter layer 4330 once in the transmission mode, it passes through the color filter layer 4330 twice in the reflection mode. Accordingly, if the color filter layer 4330 has the same optical density both in the transmission region A and the reflection region B, the color purity and/or the luminance may decrease in the reflection mode. To suppress occurrence of this problem, the optical density of the color filter layer in the reflection region is preferably made lower than that in the transmission region. The optical density as used herein is a characteristic value characterizing the color filter layer. For example, the optical density can be reduced by reducing the thickness of the color filter layer. Otherwise, the optical density can be reduced by reducing the density of a pigment added, for example, while keeping the thickness of the color filter layer unchanged.

Hereinafter, display characteristics of prototyped LCD devices will be described specifically.

EXAMPLE 3

Figure 39A:
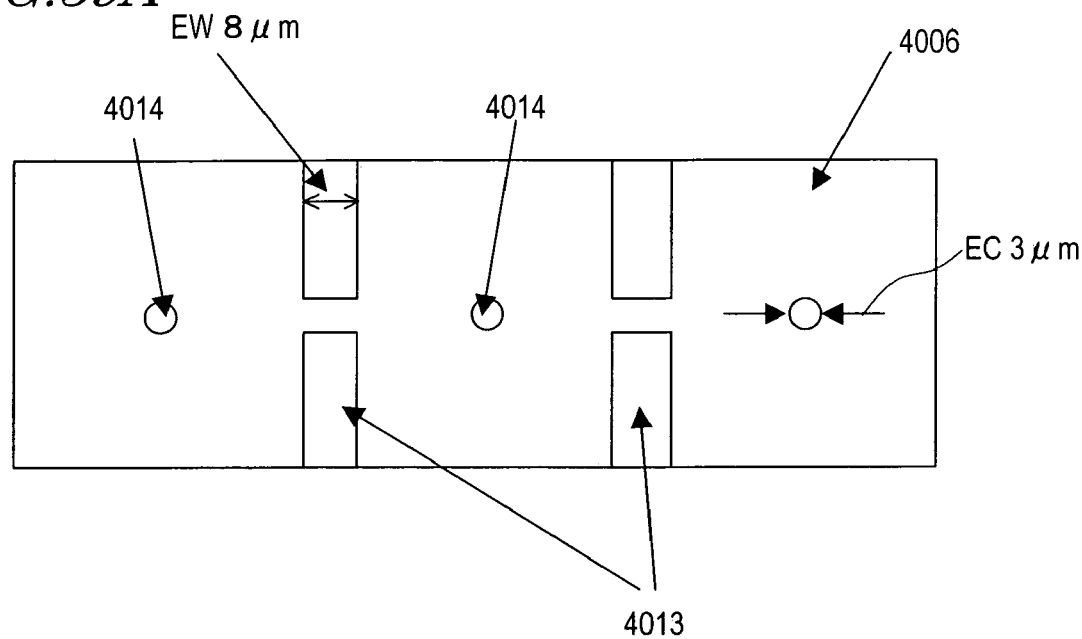
FIG. 39A is a plan view showing the placement of cuts and first openings in a pixel electrode in an LCD device of Example 3.

Pixel electrodes (ITO layer, transparent electrodes) 4006 as shown in FIG. 39A were formed on an active matrix substrate having signal lines and TFTs. First openings 4014 had the shape of a perfect circle having a width (inner diameter) EC of 3 µm, and rectangular cuts 4013 had a width EW of 8 µm. The space between the adjacent pixel electrodes 4006 was also set at 8 µm. Each of the first openings 4014 was placed roughly in the center of a region (sub-pixel) nearly-separated from one another with the cuts 4013. Supports for defining the cell thickness were placed at positions in the region surrounding the pixel electrodes 4006. The height of the supports was set at 3.6 µm.

A vertical alignment agent was applied to the thus-fabricated active matrix substrate and a counter substrate (color filter substrate) having a color filter layer and an electrode layer, and sintered, to form vertical alignment films on these substrates. The active matrix substrate and the counter substrate were then bonded together, and a liquid crystal material having negative dielectric anisotropy ($\Delta n=0.101$, $\Delta\varepsilon=-5.0$) was injected and sealed in the space between the substrates, to obtain an LCD element. Optical films were placed on the outer surfaces of the substrates of the LCD element, to thereby obtain an LCD device.

The LCD device of this example had a multilayer structure composed of a polarizing plate (observer side), a quarter wave plate (phase plate 1), a phase plate having negative optical anisotropy (phase plate 2 (NR plate)), the liquid crystal layer (on the upper and lower sides thereof, the color filter substrate and the active matrix substrate were respectively placed), a phase plate having negative optical anisotropy (phase plate 3 (NR plate)), a quarter wave plate (phase plate 4), and a polarizing plate (backlight side) in the order from the observer side. The upper and lower quarter wave plates (phase plates 1 and 4) were placed so that the slower axes thereof were orthogonal to each other, and had a phase difference of 140 nm (a quarter of visible light (560 nm)).

The phase plates having negative optical anisotropy (phase plates 2 and 3) had a phase difference of 135 nm in the direction of the optical axis (vertical to the film plane) and the direction parallel to the film plane. The two polarizing plates were placed so that the absorption axes thereof were orthogonal to each other.

Figure 40:
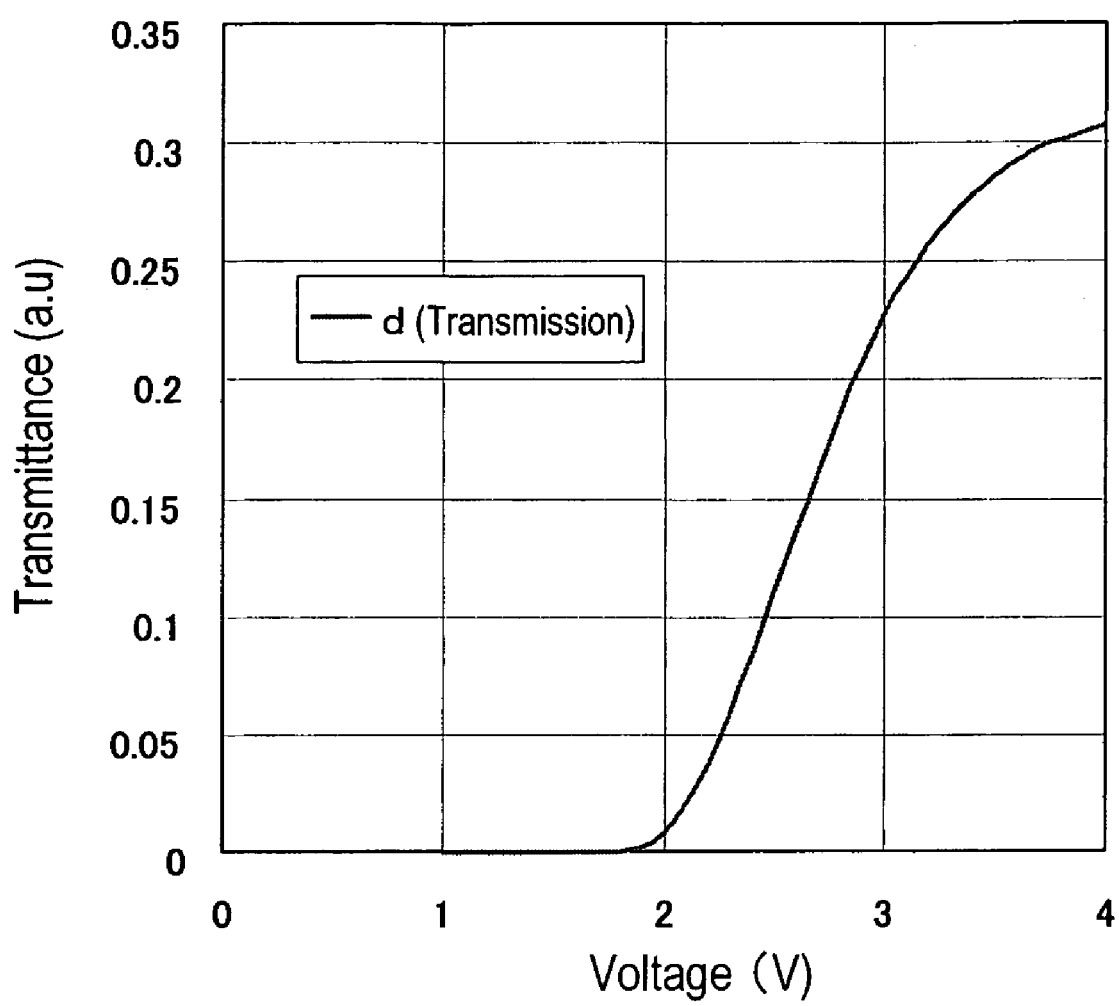
FIG. 40 is a voltage-transmittance characteristic diagram in Example 3.

A drive signal was applied to the thus-obtained LCD device (4V was applied across the liquid crystal layer) to evaluate the display characteristics. It was found that the LCD device of Example 3 had good voltage-transmittance characteristics as shown in FIG. 40. The results of the visual angle—contrast characteristics in transmission display were substantially the same as those shown in FIG. 11. It was found from the results that the viewing angle characteristics in transmission display were roughly symmetric in all directions, the range CR>10 (within the bold lines) was as large as up to ±80°, and the transmission contrast was as high as 300:1 or more at the front. As for the response speed in grayscale display, the response time was 40 msec in response from 6 to 7 grayscale level (low voltage close to black) in the eight levels of grayscale, which causes practically no problem.

EXAMPLE 4

Figure 39B:
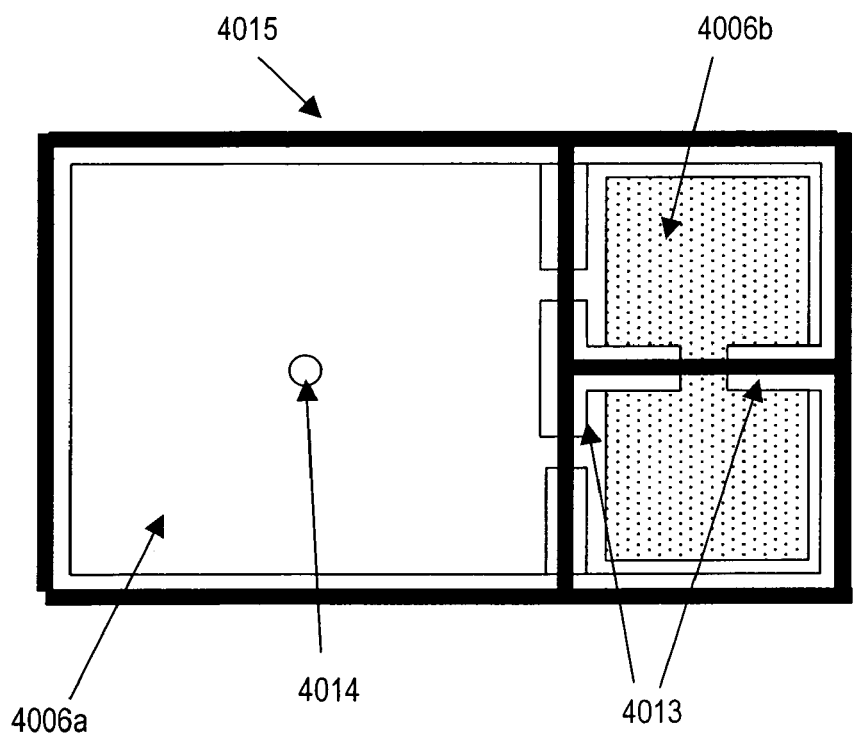
FIG. 39B is a plan view showing the placement of cuts/second openings and a first opening in the pixel electrode, as well as a wall structure, in an LCD device of Example 4.

Transparent electrodes (ITO pattern) 4006*a* and reflective electrodes (Al pattern) 4006*b* as shown in FIG. 39B were formed on an active matrix substrate. The transparent electrodes 4006*a* define transmission regions, and the reflection regions 4006*b* define reflection regions. The width (inner diameter) of a first opening 4014 was 3 µm, and the width of cuts or rectangular portions of second openings 4013 was 8 µm. The space between the adjacent pixel electrodes 4006 was set at 8 µm, and the width of a wall structure 4015 was 6 µm. Supports for defining the cell gap thickness were placed at positions in the regions surrounding the pixel electrodes 4006. The height of the supports was set at 3.6 µm.

Figure 41:
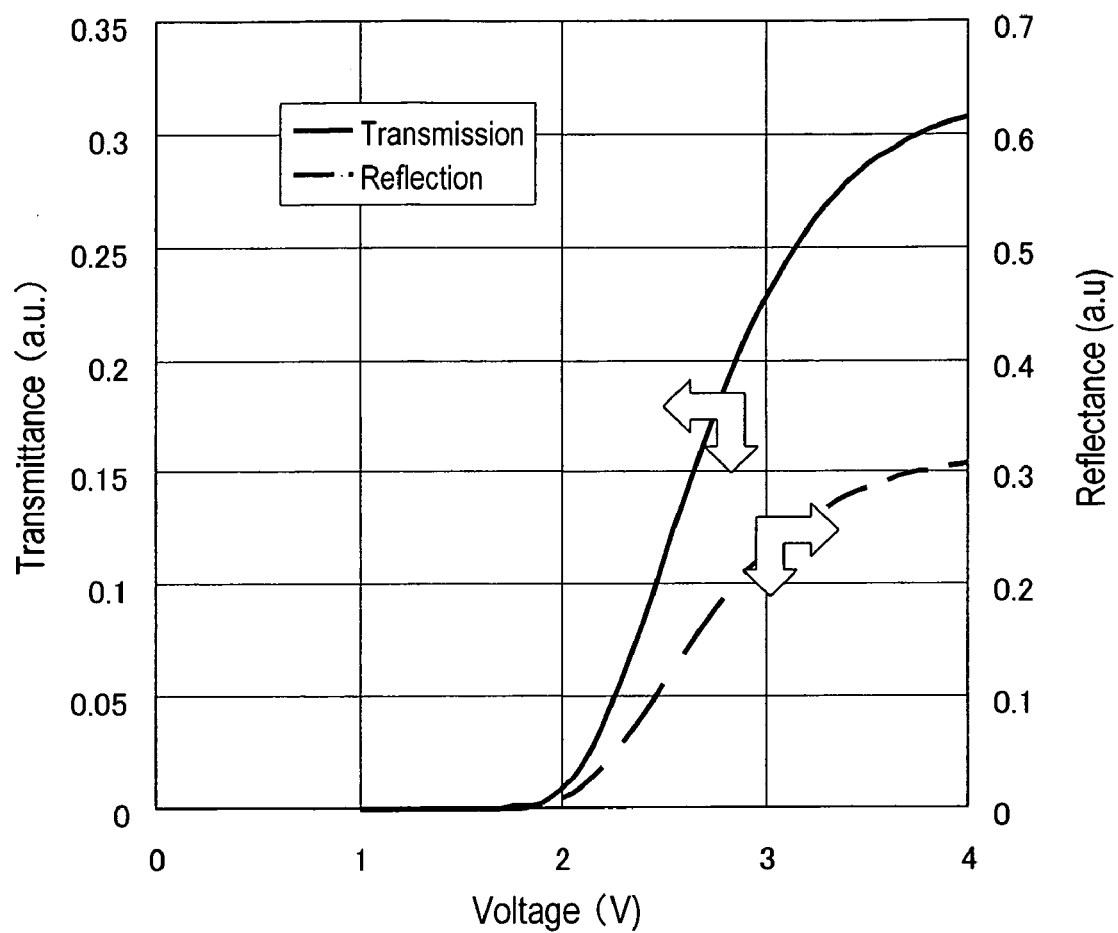
FIG. 41 is a voltage-reflectance/transmittance characteristic diagram in Example 4.

As a counter substrate (color filter substrate) to face the active matrix substrate, after formation of a color filter layer, a layer having a thickness of about 1.8 µm was formed in the reflection region to give a step, and then an ITO electrode layer was formed. A vertical alignment agent was applied to the thus-fabricated active matrix substrate and counter substrate, and sintered at 180° C. for 1.5 hours, to form vertical alignment films on the substrates. The resultant substrates were bonded together, and a liquid crystal material having negative dielectric anisotropy was injected and sealed in the space between the substrates, to obtain an LCD element. Since the step of 1.8 µm was formed on the color filter substrate and the supports had a height of 3.6 µm, the thicknesses of the liquid crystal layer in the transmission layer and in the reflection region were 3.6 µm and 1.8 µm, respectively. Films were then placed on the outer surfaces of the resultant substrates of the LCD element according to the optical film setting, as in Example 3, to obtain an LCD device. The resultant LCD device had good voltage-transmittance characteristics and voltage-reflectance characteristics as shown in FIG. 41. The transmission region exhibited roughly as good display characteristics as those obtained in Example 3. The reflection region had a reflectance of about 8.5% (value in terms of the aperture ratio of 100%) with respect to a standard diffuse plate as the reference, and a contrast of 20.

EXAMPLE 5

Figure 42:
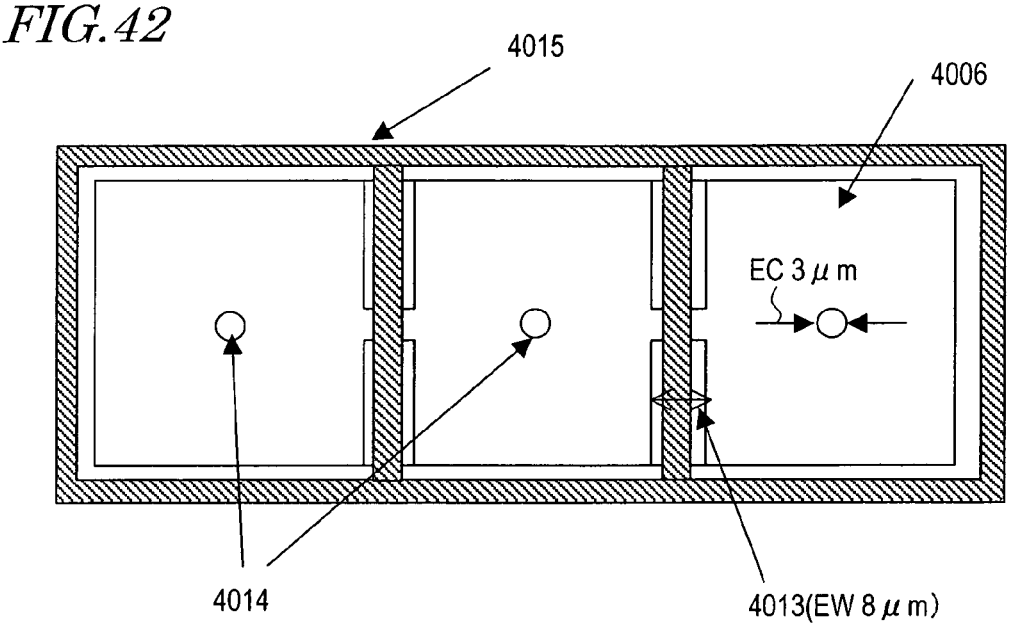
FIG. 42 is a plan view showing the placement of cuts and first openings in a pixel electrode, as well as a wall structure, in an LCD device of Example 3.

Pixel electrodes (ITO electrodes) 4006 as those in Example 3 were formed on an active matrix substrate as shown in FIG. 42. A wall structure 4015 was also formed in addition to cuts 4013 and first openings 4014. The first openings 4014 had the shape of a perfect circle having a width (inner diameter) EC of 3 μm, and the rectangular cuts 4013 had a width EW of 8 μm. The space between the adjacent pixel electrodes 4006 was also set at 8 μm. The width of the wall structure 4015 was 6 μm. Supports for defining the cell thickness were placed at positions (in the shading portion) different from the positions of the wall structure 4015. The height of the supports was set at 4.0 μm. The same steps as those in Example 3 were then followed, to fabricate an LCD device.

The viewing angle characteristics of the LCD device of this example were symmetric in all directions as in Example 3, and the range CR>10 was as large as up to a polar angle of 80°. As for the response characteristics, the response time was 25 msec in response from 6 to 7 grayscale level (low voltage close to black) in the eight levels of grayscale. The response was therefore slightly higher than that in Example 3 having no such a wall structure, because the wall structure 4015 exerted alignment regulating force even in grayscale display in which the alignment regulating force with the electric line of force was low.

COMPARATIVE EXAMPLE 2

Figure 43:
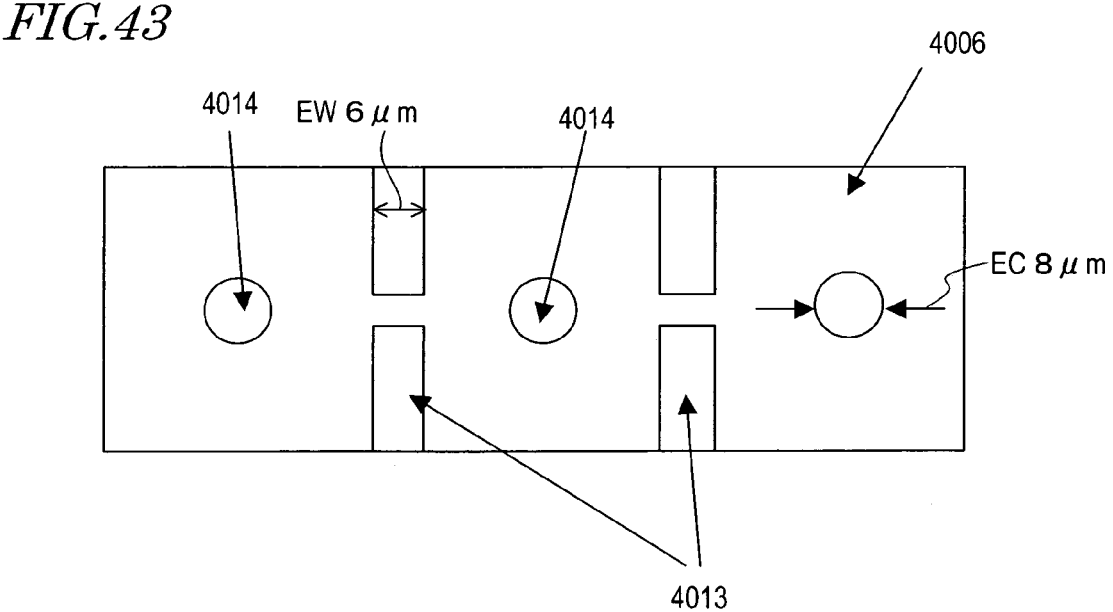
FIG. 43 is a plan view showing the placement of cuts and first openings in a pixel electrode in an LCD device of Comparative Example 1.

Pixel electrodes (ITO layer, transparent electrodes) 4006 as shown in FIG. 43 were formed on an active matrix substrate. First openings 4014 had the shape of a perfect circle having a width (inner diameter) EC of 8 μm, and rectangular cuts 4013 had a width EW of 6 μm. The space between the adjacent pixel electrodes 4006 was set at 8 μm as in Example 3. The same steps as those in Example 3 were then followed, to fabricate an LCD device. Films were formed according to the optical film setting as in Example 3, to obtain an LCD device.

A predetermined drive signal was applied to the thus-obtained LCD device. Ask a result, although no problem arose in the view from the front, roughness (display unevenness) was observed in the view at a wide viewing angle when the display was uniform over the entire screen (in solid screen display). In observation of the aligned state of pixels with a polarizing microscope under crossed nicols, the position of the center axis of the axisymmetric alignment was deviated from the position at which the first opening 4014 was formed (the center of the sub-pixel) in white to bright gray displays, and the position varied with the pixels. The reason is as follows. The depression of equipotential lines caused by the first opening 4014 is deeper than the depression of equipotential lines caused by the cuts 4013. Therefore, the ends (boundary) of the axisymmetrically aligned domain are determined based on the first opening 4014 placed in the center of the sub-pixel, and thus the position of the center axis of the axisymmetric alignment is deviated from the center of the sub-pixel.

REFERENCE EXAMPLE 1

Figure 44:
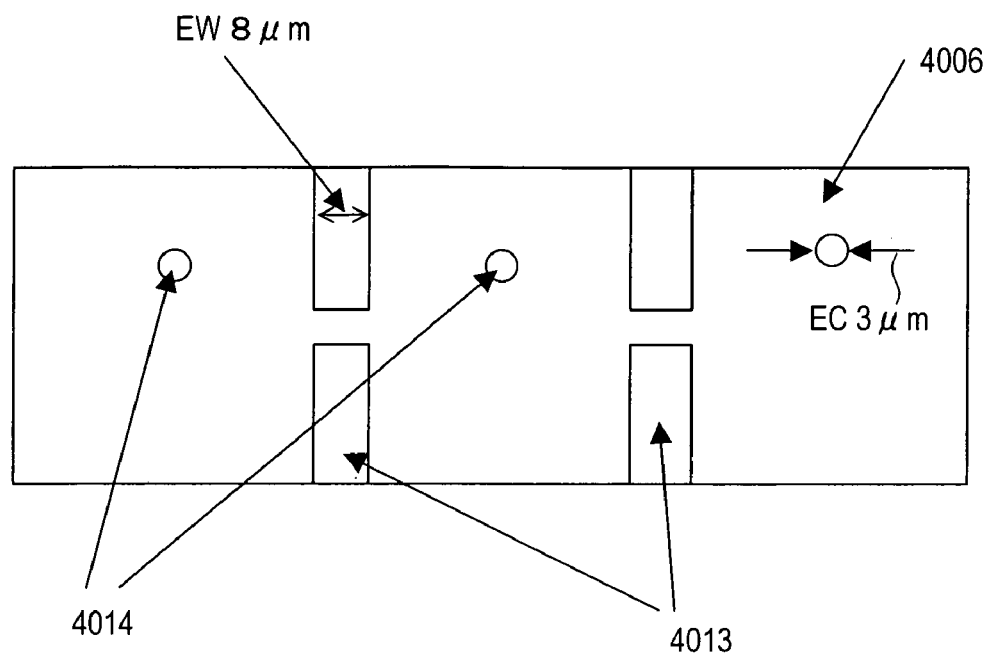
FIG. 44 is a plan view showing the placement of cuts and first openings in a pixel electrode in an LCD device of Reference Example 1.

Pixel electrodes (ITO layer, transparent electrodes) 4006 as shown in FIG. 44 were formed on an active matrix substrate. First openings 4014 had the shape of a perfect circle having a width (inner diameter) EC of 3 μm, and rectangular cuts 4013 had a width EW of 8 μm. The space between the adjacent pixel electrodes 4006 was set at 8 μm as in Example 3. Unlike Example 3, the first openings 4014 were formed at positions deviated from the center of the sub-pixels separated from one another with the cuts 4013. The same steps as those in Example 3 were then followed for the resultant active matrix substrate, to fabricate an LCD device.

Figure 45:
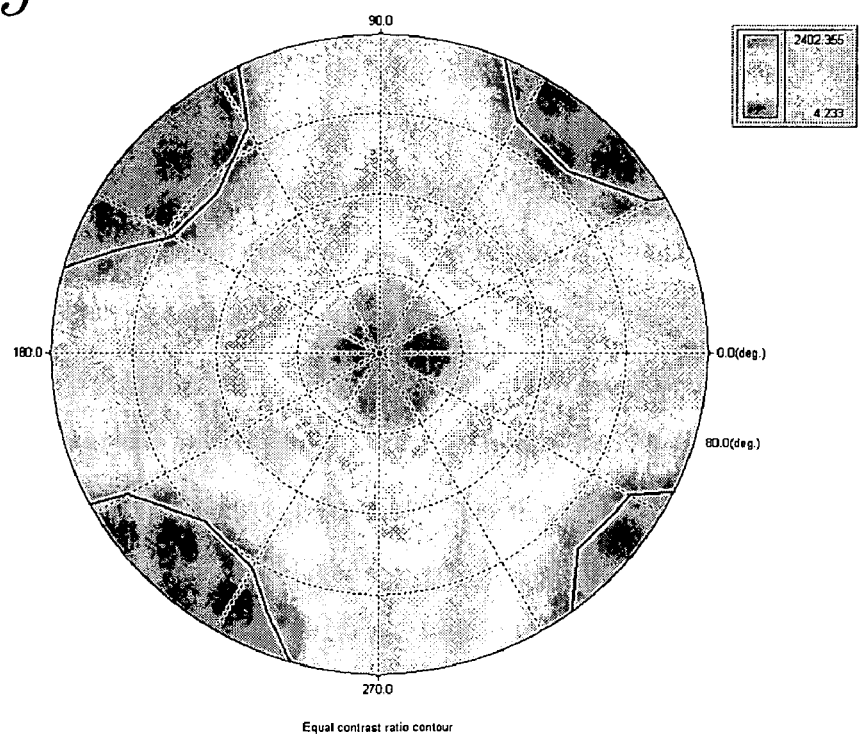
FIG. 45 is an isocontrast characteristic diagram in Reference Example 1.

A predetermined drive voltage signal was applied to the thus-obtained LCD device. As a result of evaluation of the viewing angle characteristics, the contrast ratio was high only in given directions, not in all directions, as shown in FIG. 45. The reason is that there were formed axisymmetrically aligned domains having their center axes located in the first openings 4014 formed at positions deviated from the centers of the sub-pixels. Good viewing angle characteristics are therefore exhibited only in given directions. In some uses of LCD devices, good viewing angle characteristics may be required, but it is generally preferred to provide viewing angle characteristics symmetric in all directions as in Example 3.

As described above, according to the present invention, it is possible to provide an LCD device that can sufficiently stabilize the alignment of liquid crystal molecules with a comparatively simple construction having an alignment regulating structure for the axisymmetric alignment only on one substrate of the device, and can provide display quality equal to or higher than that conventionally obtained.

As described above, according to the present invention, an LCD device with excellent display quality can be implemented with a comparatively simple construction. The present invention is suitably applied to transmissive LCD devices and transflective (transmissive/reflective) LCD devices. In particular, transflective LCD devices are suitably used as display devices for mobile equipment such as mobile phones.

While the present invention has been described in preferred embodiments, it will be apparent to those skilled in the art that the disclosed invention may be modified in numerous ways and may assume many embodiments other than that specifically set out and described above. Accordingly, it is intended by the appended claims to cover all modifications of the invention that fall within the true spirit and scope of the invention.

This non-provisional application claims priority under 35 USC §119(a) on Patent Applications No. 2003-409400 filed in Japan on Dec. 8, 2003, No. 2003-409401 filed in Japan on Dec. 8, 2003, No. 2004-053745 filed in Japan on Feb. 27, 2004, and No. 2004-091227 filed in Japan on Mar. 26, 2004 the entire contents of which are hereby incorporated by reference.

What is claimed is:

1. A liquid crystal display device comprising
a first substrate, a second substrate placed to face the first substrate, and a liquid crystal layer interposed between the first substrate and the second substrate,
wherein the liquid crystal display device has a plurality of pixels each including a first electrode formed on the first substrate, a second electrode formed on the second substrate, and the liquid crystal layer interposed between the first electrode and the second electrode, the second electrode has at least one opening formed at a predetermined position in the pixel, the first substrate has a shading region in gaps between the plurality of pixels, and a wall structure is placed regularly on the surface of the first substrate facing the liquid crystal layer in the shading region, the liquid crystal layer has at least one liquid crystal domain having axisymmetric alignment formed when at least a predetermined voltage is applied, and the center axis of the axisymmetric alignment of the at least one liquid crystal domain is formed in or near the at least one opening, and wherein the second electrode comprises the at least one opening defined therein at approximately a center axis of a first one of the domains, and the first electrode has cut-out portions and/or openings defined therein at at least first and second corners of the first domain.

2. The liquid crystal display device of claim 1, wherein when a voltage giving a relative transmittance of 10% is applied across the liquid crystal layer interposed between the first electrode and the second electrode, the potential at the at least one opening in the second electrode is lower than a threshold voltage of the liquid crystal layer.

3. The liquid crystal display device of claim 1, wherein the size Wh of the at least one opening satisfies the condition 2 µm≦Wh≦20 µm.

4. The liquid crystal display device of claim 1, wherein a support for defining the thickness of the liquid crystal layer is formed in the shading region located in gaps between the plurality of pixels.

5. The liquid crystal display device of claim 1, wherein the first electrode includes a transparent electrode defining a transmission region and a reflective electrode defining a reflection region, and the thickness dt of the liquid crystal layer in the transmission region and the thickness dr of the liquid crystal layer in the reflection region satisfy the relationship 0.3 dt<dr<0.7 dt.

6. The liquid crystal display device of claim 1, wherein the first electrode includes a transparent electrode defining a transmission region and a reflective electrode defining a reflection region, the at least one liquid crystal domain includes a liquid crystal domain formed in the transmission region, and
the first electrode has a plurality of cuts formed point-symmetrically with respect to the opening.

7. The liquid crystal display device of claim 5, wherein a transparent dielectric layer is selectively formed on the second substrate in the reflection region.

8. The liquid crystal display device of claim 7, wherein the transparent dielectric layer has a function of scattering light.

9. The liquid crystal display device of claim 5, further comprising a color filter layer formed on the second substrate, wherein the optical density of the color filter layer in the reflection region is lower than that in the transmission region.

10. The liquid crystal display device of claim 1, further comprising: a pair of polarizing plates placed to face each other via the first substrate and the second substrate; and at least one biaxial optical anisotropic medium layer placed between the first substrate and one of the pair of polarizing plates and/or between the second substrate and the other polarizing plate.

11. The liquid crystal display device of claim 1, further comprising: a pair of polarizing plates placed to face each other via the first substrate and the second substrate; and at least one uniaxial optical anisotropic medium layer placed between the first substrate and one of the pair of polarizing plates and/or between the second substrate and the other polarizing plate.

12. A liquid crystal display device comprising
a first substrate, a second substrate placed to face the first substrate, and a liquid crystal layer interposed between the first substrate and the second substrate,
wherein the liquid crystal display device has a plurality of pixels each including a first electrode formed on the first substrate, a second electrode formed on the second substrate, and the liquid crystal layer interposed between the first electrode and the second electrode,
the first substrate has a shading region in gaps between the plurality of pixels, and a wall structure is placed regularly on the surface of the first substrate facing the liquid crystal layer in the shading region,
the first electrode has at least one first opening formed at a predetermined position in the pixel,
the second electrode has at least one second opening formed at a predetermined position in the pixel,
the liquid crystal layer has at least one liquid crystal domain having axisymmetric alignment formed when at least a predetermined voltage is applied, and the center axis of the axisymmetric alignment of the at least one liquid crystal domain is formed in or near at least one of the at least one first opening and the at least one second opening, and
wherein the second electrode comprises the at least one second opening defined therein at approximately a center axis of a first one of the domains, and the first electrode has cut-out portions and/or openings defined therein at at least first and second corners of the first domain.

13. The liquid crystal display device of claim 12, wherein one end of the center axis of axisymmetric alignment of the at least one liquid crystal domain is in or near the at least one first opening, and the other end is in or near the at least one second opening.

14. The liquid crystal display device of claim 12, wherein the at least one first opening and the at least one second opening are placed to at least overlap each other via the liquid crystal layer.

15. The liquid crystal display device of claim 12, wherein when a voltage giving a relative transmittance of 10% is applied across the liquid crystal layer interposed between the first electrode and the second electrode, the potential at at least one of the at least one first opening and the at least one second opening is lower than a threshold voltage of the liquid crystal layer.

16. The liquid crystal display device of claim 15, wherein when a voltage giving a relative transmittance of 10% is applied across the liquid crystal layer interposed between the first electrode and the second electrode, the potentials at the at least one first opening and the at least one second opening are lower than the threshold voltage of the liquid crystal layer.

17. The liquid crystal display device of claim 12, wherein the size Wh' of the at least one first opening and the at least one second opening satisfies the condition 1 µm≦Wh'≦18 µm.

18. The liquid crystal display device of claim 12, wherein a support for defining the thickness of the liquid crystal layer is formed in the shading region located in gaps between the plurality of pixels.

19. The liquid crystal display device of claim 12, wherein the first electrode includes a transparent electrode defining a transmission region and a reflective electrode defining a reflection region, and the thickness dt of the liquid crystal layer in the transmission region and the thickness dr of the liquid crystal layer in the reflection region satisfy the relationship 0.3 dt<dr<0.7 dt.

20. The liquid crystal display device of claim 12, wherein the first electrode includes a transparent electrode defining a transmission region and a reflective electrode defining a reflection region, the at least one liquid crystal domain includes a liquid crystal domain formed in the transmission region, the at least one first opening and/or the at least one second opening include an opening corresponding to the center axis of the liquid crystal domain formed in the transmission region, and the first electrode has a plurality of cuts formed point-symmetrically with respect to the opening.

21. The liquid crystal display device of claim 19, wherein a transparent dielectric layer is selectively formed on the second substrate in the reflection region.

22. The liquid crystal display device of claim 21, wherein the transparent dielectric layer has a function of scattering light.

23. The liquid crystal display device of claim 19, further comprising a color filter layer formed on the second substrate, wherein the optical density of the color filter layer in the reflection region is lower than that in the transmission region.

24. The liquid crystal display device of claim 12, further comprising: a pair of polarizing plates placed to face each other via the first substrate and the second substrate; and at least one biaxial optical anisotropic medium layer placed between the first substrate and one of the pair of polarizing plates and/or between the second substrate and the other polarizing plate.

25. The liquid crystal display device of claim 12, further comprising: a pair of polarizing plates placed to face each other via the first substrate and the second substrate; and at least one uniaxial optical anisotropic medium layer placed between the first substrate and one of the pair of polarizing plates and/or between the second substrate and the other polarizing plate.

* * * * *